(12) United States Patent
Yoshimine et al.

(10) Patent No.: US 7,366,687 B2
(45) Date of Patent: Apr. 29, 2008

(54) DONATION PROCESSING SYSTEM

(75) Inventors: Takao Yoshimine, Kanagawa (JP);
Mototsugu Tsutsui, Kanagawa (JP);
Takahiko Sueyoshi, Tokyo (JP);
Toshinori Nakamura, Kanagawa (JP);
Hiroyuki Hanaya, Kanagawa (JP);
Nobuyuki Uchiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 671 days.

(21) Appl. No.: 09/980,301

(22) PCT Filed: Mar. 26, 2001

(86) PCT No.: PCT/JP01/02407

§ 371 (c)(1),
(2), (4) Date: Nov. 28, 2001

(87) PCT Pub. No.: WO01/75714

PCT Pub. Date: Oct. 11, 2001

(65) Prior Publication Data
US 2002/0138827 A1 Sep. 26, 2002

(30) Foreign Application Priority Data
Mar. 30, 2000 (JP) ................................ 2000-97884

(51) Int. Cl.
*G06Q 30/00* (2006.01)
(52) U.S. Cl. .................... 705/26; 705/35; 705/36 R; 705/37; 705/41; 709/206; 709/217; 709/223; 725/10
(58) Field of Classification Search ................ 705/26, 705/35, 36 R, 37, 41, 27; 709/206, 217, 709/223; 725/10
See application file for complete search history.

(56) References Cited

U.S. PATENT DOCUMENTS

| | | | | |
|---|---|---|---|---|
| 5,721,827 A | * | 2/1998 | Logan et al. | 709/217 |
| 5,794,217 A | | 8/1998 | Allen | |
| 5,826,241 A | | 10/1998 | Stein et al. | |
| 5,848,352 A | * | 12/1998 | Dougherty et al. | 725/110 |
| 5,960,411 A | * | 9/1999 | Hartman et al. | 705/26 |
| 5,963,916 A | | 10/1999 | Kaplan | |
| 6,016,509 A | | 1/2000 | Dedrick | |
| 6,029,151 A | * | 2/2000 | Nikander | 705/39 |
| 6,112,191 A | * | 8/2000 | Burke | 705/41 |

(Continued)

FOREIGN PATENT DOCUMENTS

EP 0 809 221 11/1997

(Continued)

OTHER PUBLICATIONS

Patent Abstract of Australia, AU9536309, Mar. 29, 1996.

(Continued)

*Primary Examiner*—Yogesh Garg
(74) *Attorney, Agent, or Firm*—Oblon, Spivak, McClelland, Maier & Neustadt, P.C.

(57) ABSTRACT

The present invention realizes that a contribution is indirectly made to a content creator in the form of contribution data via a management server of an ASP in such a manner that contribution data equivalent to a given amount corresponding to a contribution button selected on a content display screen is created and transmitted to the management server of the ASP via the Internet.

18 Claims, 34 Drawing Sheets

U.S. PATENT DOCUMENTS

| | | | |
|---|---|---|---|
| 6,473,794 B1 * | 10/2002 | Guheen et al. | 709/223 |
| 6,850,901 B1 * | 2/2005 | Hunter et al. | 705/26 |
| 2001/0001855 A1 * | 5/2001 | Ziarno | 705/39 |
| 2001/0051875 A1 * | 12/2001 | Miller et al. | 705/1 |
| 2002/0029179 A1 * | 3/2002 | Gruber et al. | 705/35 |
| 2002/0049816 A1 * | 4/2002 | Costlin et al. | 709/206 |

FOREIGN PATENT DOCUMENTS

| | | |
|---|---|---|
| JP | 408339464 A * | 12/1996 |
| JP | 09-171504 | 6/1997 |
| JP | 10-222579 | 8/1998 |
| JP | 10-508708 | 8/1998 |
| WO | WO 92 12488 | 7/1992 |
| WO | WO 96/08783 | 3/1996 |
| WO | WO 96 11449 | 4/1996 |

OTHER PUBLICATIONS

Patent Abstract of New Zealand, 293783, Sep. 14, 1995.

"PNN Online: Technology: Online foundations funnels grants to nonprofits" Philanthropy News Network, Oct. 15, 1999.

"Millions Can Go Online this Holiday Season to Feed the World's Hungry" PR Newswire Dec. 16, 1999.

Whalen W A et al: "Analysis of an AVTA: MU D1 (AP LAC) Mutant: Metabolic Role of Transaminase C" Journal of Bacteriology, Washington, DC, US, vol. 150, No. 2, May 1982, pp. 739-746, XP002939726 ISSN: 0021-9193.

* cited by examiner

21

```
┌─────────────────────────────────────────────────────────────┐
│         ┌───────────────────────────────────────┐           │
│         │  APPLICATION FOR PERSONAL CASTING SERVICE │        │
│         │      USER INFORMATION REGISTRATION    │           │
│         └───────────────────────────────────────┘           │
│  ┌──────────────────────────┬────────────────────────────┐  │
│  │ NAME                     │ KIMURA TAROU               │  │
│  │ ADDRESS                  │ KITASHINAGAWA SHINAGAWA WARD TOKYO... │
│  │ TELEPHONE NUMBER         │ 03-5448-XXXX               │  │
│  │ E-MAIL ADDRESS           │ Kim@....                   │  │
│  │ DATE OF BIRTH            │ DEC. 18. 1985              │  │
│  │ CREDIT CARD NUMBER       │ Xxxx xxxx xxxx xxxx        │  │
│  │ FIRST DESIRED USER ID    │ Kimukimu                   │  │
│  │ SECOND DESIRED USER ID   │ Kimura                     │  │
│  │ THIRD DESIRED USER ID    │ Taro                       │  │
│  │ DESIRED CHANNEL NAME     │ KIMURA Ch                  │  │
│  │ PASSWORD                 │ ****                       │  │
│  │ PASSWORD CONFIRMATION    │ ****                       │  │
│  │                          │                            │  │
│  │ SERVICE                  │                            │  │
│  │   AS MUCH AS YOU LIKE    │ O                          │  │
│  │   BEGINNER'S COURSE      │                            │  │
│  └──────────────────────────┴────────────────────────────┘  │
│                                                       ~23   │
│                    22~( CANCEL )    ( APPLICATION )         │
└─────────────────────────────────────────────────────────────┘
```

```
┌─────────────────────────────────────────────────────────────┐
│  NAME                     KIMURA TAROU                      │
│  ADDRESS                  KITASHINAGAWA SHINAGAWA WARD TOKYO... │
│  TELEPHONE NUMBER         03-5448-XXXX                      │
│  E-MAIL ADDRESS           Kim@....                          │
│  DATE OF BIRTH            DEC. 18. 1985                     │
│  CREDIT CARD NUMBER       Xxxx xxxx xxxx xxxx               │
│  FIRST DESIRED USER ID    Kimukimu                          │
│  SECOND DESIRED USER ID   Kimura                            │
│  THIRD DESIRED USER ID    Taro                              │
│  DESIRED CANNEL           KIMURA Ch                         │
│  PASSWORD                 ****                              │
│  PASSWORD CONFIRMATION    ****                              │
│                                                             │
│  SERVICE                                                    │
│     AS MUCH AS YOU LIKE   O                                 │
│     BEGINNER'S COURSE                                       │
└─────────────────────────────────────────────────────────────┘
```

USER INFORMATION DB TABLE

USER ID:KIMUKIMU
CHANNEL NAME:KIMURA CHANNEL
URL:www//xxx.xxx.
PASSWORD:****
NAME:KIMURA TARO
ADDRESS:KITASHINAGAWA, SHINAGAWA WARD, TOKYO
TELEPHONE:03-5448-****
E-MAIL ADDRESS:kim@....
DATE OF BIRTH:DEC.18.1985
CREDIT CARD NUMBER:Xxxx xxxx xxxx xxxx
TYPE OF SERVICE APPLIED FOR:AS MUCH AS I LIKE
ACCUMULATED NUMBER OF POINTS:xxxxP
USER STATUS:STAGE 1
DATE AND TIME OF CONNECTION STARTED:
 ○HOURS×MINUTES△SECONDS, □DAY○MONTH
DATE AND TIME CONNECTION ENDED:
 ×HOURS△MINUTES□SECONDS, ○DAY×MONTH,
INTERNET CONNECTION CHARGE:XXXX¥
SERVICE CHARGE:XXXX¥

FIG. 9

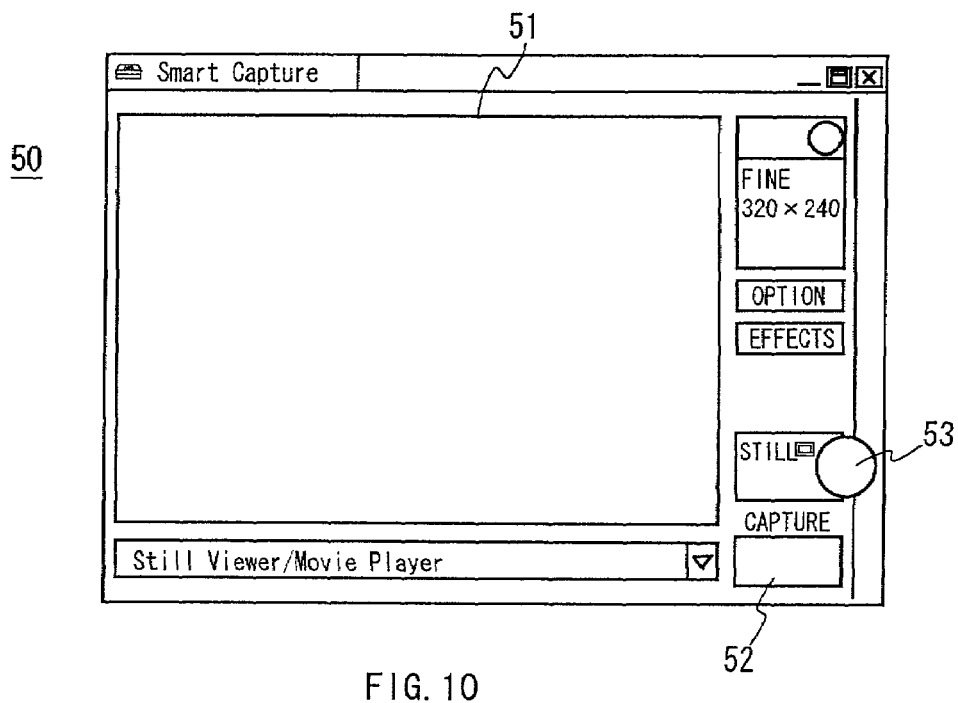

FIG. 10

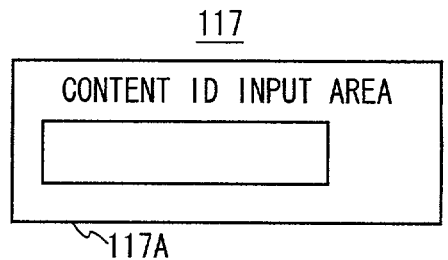
FIG. 20
```
120
ISP CONNECTION POINT : (ISP NAME)
ASP CHANNEL         : MY CHANNEL
URL                 : WWW//XXX.XXX.
CONTENT ID          : ***
CODEC               : MPEG4
IMAGE GENRE         : CARS
PROVIDING SCHEDULE  : START AT 6:00 FEB.19
COMMERCIAL REQUEST  : COMMERCIAL INCLUDED
CM LINK             : COMMERCIAL NOT INCLUDED
USER ID             : KIMUKIMU
PASSWORD            : ***
```
FIG. 21
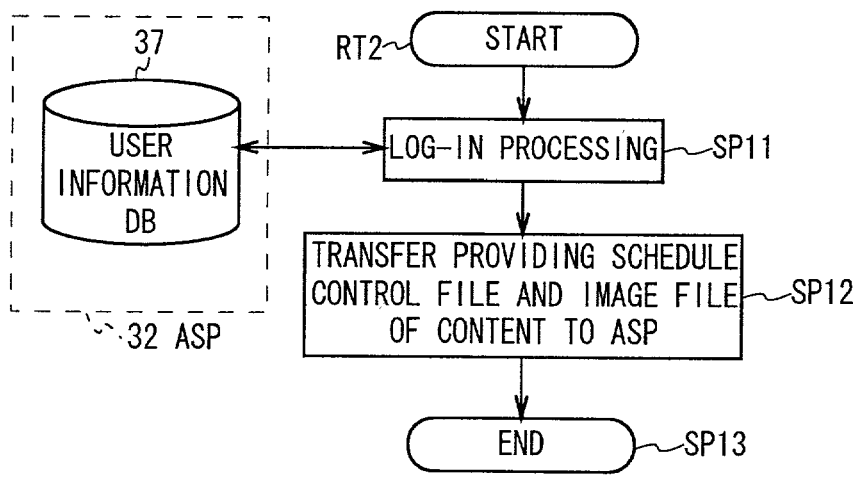
FIG. 22

```
ISP CONNECTION POINT  : *****(ISP NAME)
ASP CHANNEL           : PUBLIC CHANNEL
CONTENT NAME          : XX TOUR
CODEC                 : MPEG4
PUBLIC CHANNEL        : LIVE MUSIC CHANNEL
PROVIDING SCHEDULE    : TO BE PROVIDED FROM
                        10:00 FEB. 19
COMMERCIAL REQUEST    : WITH CM
USER ID               : KIMUKIMU
PASSWORD              : ****
```

189

```
                              210
ISP CONNECTION POINT : *****(ISP NAME)
ASP CHANNEL         : MY CHANNEL
CODEC               : MPEG4
IMAGE GENRE         : MUSIC
PROVIDING SCHEDULE  : TO BE PROVIDED FROM 10:00 FEB.19
COMMERCIAL REQUEST  : COMMERCIALS INCLUDED
USER ID             : kimukimu
PASSWORD            : *****
```

212

YOUR DESIRED TIME SCHEDULE ALREADY FULLY BOOKED. PLEASE SELECT ANOTHER TIME SCHEDULE

| 270 | |
|---|---|
| ¥500 | ~271 |
| ¥1000 | ~272 |
| ¥2000 | ~273 |
| ¥5000 | ~274 |
| ¥8000 | ~275 |
| ¥10000 | ~276 |

DONATION PROCESSING SYSTEM

TECHNICAL FIELD

The present invention relates to a contribution processing device, a contribution processing method, a contribution accepting device, a contribution accepting method, a program storage medium, and a contribution processing system, and is suitably applied to a computer network system for providing content over the Internet for example.

BACKGROUND ART

In the case that content being images and/or sounds created individually by a user is provided over the Internet in a computer network system, a user generally opens his/her own homepages created by using a personal computer.

In such a case where a user intends to open a homepage, a user acquires a homepage creation program by using a personal computer, creates a homepage which is hyper-linked with a plurality of content according to the homepage creation program, and stores it in the server of an internet service provider (this is referred to as "ISP" hereinafter).

Then, the ISP provides a homepage from the server to a client accessing the ISP over the Internet, and when an anchor on the homepage is clicked, the hyper-linked content is provided subsequently.

In such a computer network system, when a client who gets content and is impressed by or sympathizes with the content, or feels the content excellent, he or she can transmit his or her opinions to the creator by e-mail. However, it is hard for the client to contribute to the content creator.

DESCRIPTION OF THE INVENTION

The present invention is made in consideration of such problems, and is intended to propose a contribution processing device, a contribution processing method, a contribution accepting device, a contribution accepting method, a program storage medium, and a contribution processing system that can make it easier to make a contribution for the interests of a content creator.

In order to solve such problems, the present invention is designed such that image data of content supplied from a content providing device over a network is received, a content display screen having a specific contribution button provided thereon is displayed based on the image data, and when the contribution button is selected on the content display screen, the contribution data for a specific amount for a contribution is generated, and the contribution data is transmitted to the content providing device over the network.

By generating the contribution data of a specific amount corresponding to the contribution button selected on the content display screen and by transmitting the contribution data to the content providing device over the network, it is possible to indirectly make a contribution in the form of the contribution data for the content to the content creator via the content providing device.

In addition, in the present invention, contribution data of a given amount decided by a user as evaluation of supplied content is received from the user's terminal device and is stored in connection with the content, and then the amount according to the contribution data is charged to the user.

According to the present invention, contribution data of an amount decided by a user as evaluation of supplied content is received from a user's terminal device and is stored in connection with the content and also the amount according to the contribution data is charged to the user, which means that the contribution processing to a content creator and the charging processing to a user are simultaneously performed, so that the contribution accepting processing can be performed.

Further, according to the present invention, in the content processing system comprising a content providing device for providing content in response to a demand and a contribution processing device for receiving the content supplied from the content providing device over the network and making a contribution to the content creator, the contribution processing device comprises a receiving means for receiving image data of content supplied from the content providing device over the network, a display means for displaying the content display screen having a specific contribution button provided thereon, based on the image data received by the receiving means, a contribution data generating means for generating contribution data of a given amount corresponding a contribution button when the contribution button is selected on the content display screen, and a transmitting means for transmitting the contribution data, which is generated by the contribution data generating means, to the content providing device over the network, and the content providing device comprises a storage means for receiving the contribution data, which is transmitted from the contribution processing device over the network, and for storing the contribution data in connection with the content, and a charging processing means for charging the amount equivalent to the contribution data to the user of the contribution processing device.

According to the present invention, contribution data of a given amount corresponding to a contribution button selected on a content display screen, the contribution data is transmitted to the content providing device over the network, and the contribution data is received and stored in connection with the content and also the amount equivalent to the contribution data is charged to the user, thus making it possible to indirectly make a contribution to the content creator in the form of content data.

BRIEF DESCRIPTION OF THE DRAWINGS

FIG. 5 is a schematic diagram showing a user information registration screen.

FIG. 6 is a schematic diagram showing a user information file.

FIG. 9 is a schematic diagram showing the contents of a user information DB table registered in a user information database.

FIG. 10 is a schematic diagram showing a capture screen.

FIG. 20 is a schematic diagram showing a content ID setting screen.

FIG. 21 is a schematic diagram showing the contents of a on-demand type provision schedule control file.

FIG. 22 is a flowchart showing a processing procedure of connecting to an ASP in the on-demand type.

BEST MODE FOR CARRYING OUT THE INVENTION

A mode of carrying out the present invention will be described in detail with reference to the drawings.

(1) Principle of Electronic Commerce Utilizing the Internet

The Internet is a computer network system structured by connecting a great number of computers to each other with a communication link, in which information can be communicated among the computers with the use of various services such as e-mail, Gopher, and WWW (World Wide Web).

Figure 1:
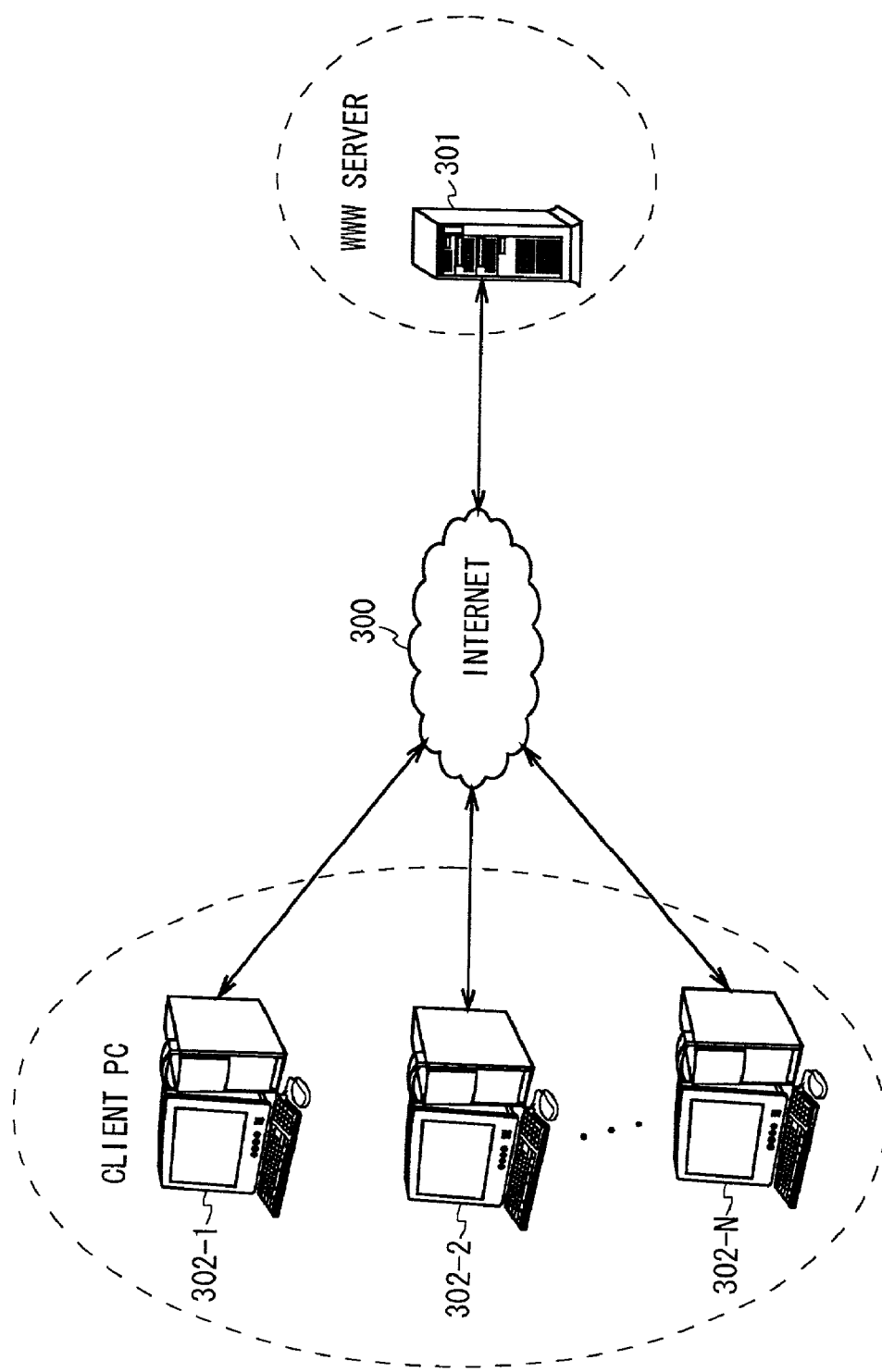
FIG. 1 is a schematic diagram explaining the principle of electronic commerce utilizing the Internet.

As shown in FIG. 1, a WWW server 301 (also called "Web server" or "Web site"), which provides a variety of service including the WWW, to client PCs (Personal Computers) 302-1 to 302-N over the Internet 300, stores Web pages created from graphic information such as figures and images on the internal hard disk.

Each resource used in this WWW server 301 or WWW such as a Web page, can be recognized unmistakably by the URL (Uniform Resource Locator) which is an addressing technique to perform an identification over the Internet 300.

Accordingly, when a user designates the URL of a Web page desired to see, using a specified transfer protocol such as HTTP (Hyper Text Transfer Protocol), a client PC 302-1 to 302-N connected to the Internet 300 makes a request to see the Web page, to the WWW server 301 with the URL.

Upon receiving the Web page transmitted from the WWW server 301 as a result of requesting to the WWW server 301, the client PC 302-1 to 302-N displays the Web page on the display unit by a WWW browser stored in advance on the internal hard disk, thereby the usr can see the Web page.

The typical Web page is defined by the HTML (Hyper Text Markup Language), and an HTML document defining the Web page includes signs called tags (reserved words) regulated by the HTML to specify how the Web page should be displayed.

For additional information, the HTML document includes various tags indicating graphics, control, and other functions, and is capable of designating as a linked page the URL of a Web page that the WWW server 301 or other WWW servers, which requests Web pages, can access.

Accordingly, the Web page is to be displayed on the display unit of the client PC 302-1 to 302-N in a display form desired by the Web page provider.

By the way, in recent years, the foregoing WWWs has come into use in electronic commerce utilizing the Internet 300.

In this case, the WWW server 301 has a Web page which is a commodity catalog electrically listing products for sale, and transmits the Web page to a client PC 302-1 to 302-N owned by a client, in response to his or her request to see it.

Thereby, the client PC 302-1 to 302-N display the Web page received from the WWW server 301 over the Internet 300, on the display unit, in order to let the client see the catalog of commodities for sale.

When the user specifies items to purchase on the Web page showing the commodity catalog displayed on the display unit, the client PC 302-1 to 302-N notifies the WWW server 301 of this intention over the Internet 300.

Upon receiving this intention, the WWW server 301 requests customer information to the client PC 302-1 to 302-N, and receives the customer information including the name of a customer who wants to purchase the items, a credit card number owned by the customer, an address for delivering the items from the client PC 302-1 to 302-N.

Next, upon the receipt of the above customer information, the WWW server 301 transmits a Web page for confirming the order of the items to the client PC 302-1 to 302-N, to let the client confirm the order on the Web page, and then arranges the delivery date of them.

Such electronic commerce utilizing the Internet 300 can realize various kind of electronic commerce, for example, electric content such as music is electrically provided to customers over the Internet 300, or physical items such as personal computers are delivered to customers by a delivery company.

Incidentally there is another method to define Web pages in addition to the HTML, namely that is called the XML (extensible Markup Language), which, as in the case of the HTML, uses tags, but is capable of expressing the structure and meaning of a document, and of designating attributes such as hierarchical structure and data type for tags by the DTD (Document Type Definition).

Accordingly, in the WWW server 301, if a Web page is defined by the XML, data for information processing, such as an order code, item code, unit price, and quantity stored in advance in a database for example, can be recorded in various tags, so that the Web page can be used not only for seeing, but also for automatically carrying out information processing such as calculating orders using the data for information processing recorded in the tags.

(2) Structure of Content Providing System

Figure 2:
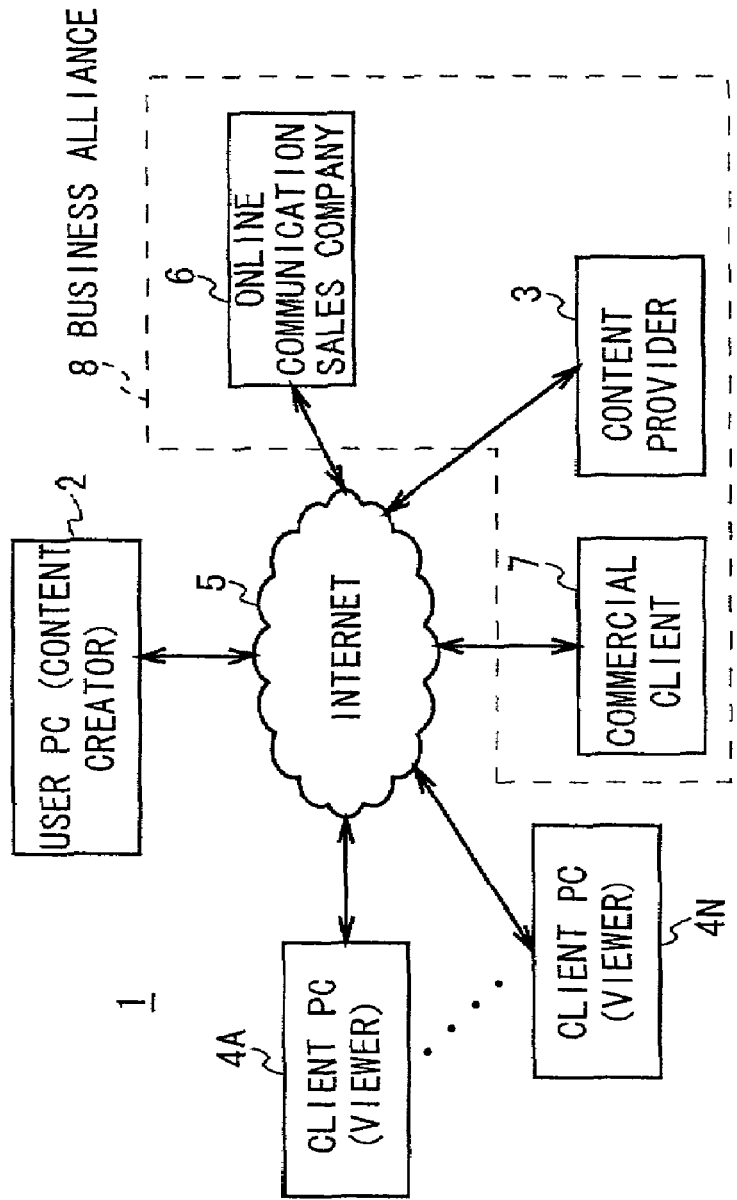
FIG. 2 is a schematic block diagram showing the structure of a content providing system according to a first embodiment.

A reference numeral 1 in FIG. 2 shows a content providing system in the first embodiment according to the present invention, which realizes electronic commerce utilizing the Internet. In the content providing system, a user PC (Personal computer) 2 used by a content creator, a content provider 3 for storing content00000 created by the user PC 2 to be offered as required, a plurality of client PCs 4 (4A to 4N) for receiving the content specified on the Web site from the content provider 3, an online communication sales company 6 from which the content creator does the online shopping with the user PC 2 over the Internet 5, and a commercial client (referred to as a "CM client" hereinafter) 7 for asking the content provider 3 to create a commercial image (referred to as "CM image" hereinafter) and to provide the CM image to the client PCs 4, are connected to each other over the Internet 5.

This content providing system 1 is a system wherein profit the content provider 3 receives are duly given back to content creators (this is called "profit returning" hereinafter) according to how many times the client PCs 4 have accessed each content created with the user PC 2. In addition, it constructs an entirely new business model over the Internet 5, with the aim of making the content creators create more excellent content, and of increasing the number of times that the client PCs 4 access in the Web site.

The content provider 3, the online communication sales company 6, and the CM client 7 enclosed by a broken line compose a business alliance 8 by entering into cooperation with each other, which returns profit to the content creators (user PC 2) by various methods.

Note that, the online communication sales company 6 and the CM client 7 have an online communication management device and a CM providing server, respectively, so as to communicate data with a control server and a management server of the content provider 3 using the online communication sales management device and the CM providing server.

The online communication sales management device is composed of various kinds of hardware concerning the online communication sales, including a network interface for realizing connection over the Internet, a control unit, a storage unit, and a customer management database. And the CM providing server is also composed of hardware concerning CM image, including a network interface for realizing connection over the Internet 5, a control unit, a storage unit, a CM image providing server, a client management database of the content provider 3 which enters into cooperation with the CM client 7.

(3) User Registration Procedure for User PC

In this content providing system 1 the user PC 2 first has to carry out a user registration procedure with the content provider 3, and the user registration procedure will be explained in detail below.

Figure 3:
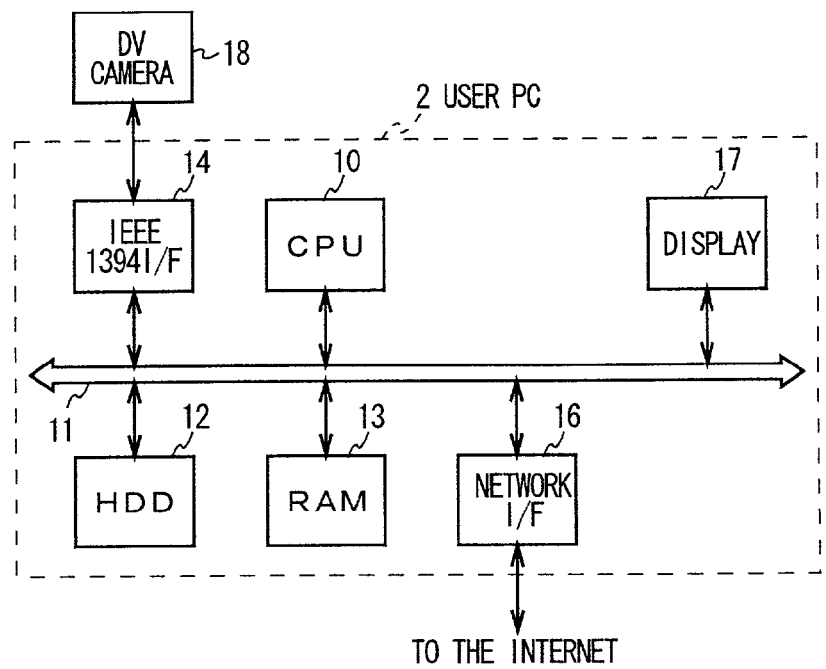
FIG. 3 is a schematic block diagram showing the structure of a user's PC.

As shown in FIG. 3, the user PC 2 comprises a CPU 10, a hard disk drive (HDD) 12, a RAM (Random Access Memory) 13, an IEEE (Institute of Electrical and Electronics Engineers) 1394 interface 14, a network interface 16, and a display unit 17 being a liquid crystal display, all connected to each other with a bus 11.

Such a user PC 2 has various kinds of application software stored in the HDD 12, in addition to the OS (Operating System), which is a basic program, and takes them in the RAM 13 as occasion arises to perform a specific process.

Figure 4:
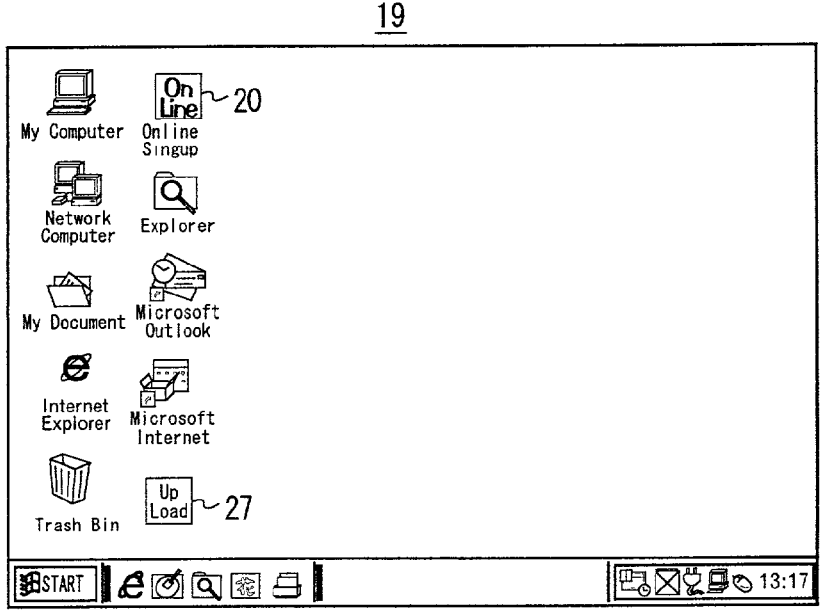
FIG. 4 is a schematic diagram showing a desktop screen.

That is, in the user PC 2, as shown in FIG. 4, when a content creator clicks an online signup icon 20 on a desktop screen 19 (a Windows screen of Microsoft Corp.) which is displayed on the display unit 17 by activating the OS, the CPU 10 starts up an automatic online signup software from the HDD 12 to display a user information registration screen 21 on the display unit 17 as shown in FIG. 5.

This user information registration screen 21 is used to input user information to apply for a personal casting service as indicated by the screen title. On the screen, the content creator enters hi or her name, address, telephone number, e-mail address, date of birth, credit card number, first desired user ID, second desired user ID, third desired user ID, desired channel name, password, and password confirmation, and finally, selects a type from an "as-much-as-you-like course" and "beginner's course".

The personal casting service has a content providing mode newly started in the content providing system 1 of the present invention, including an on-demand type and a live type, of which the contents will be described in detail later.

The user information registration screen 21 has a cancel button 22 for canceling the contents of user information entered by a content creator, and an application button 23 to make an application with the user information entered by the content creator.

Accordingly, when the application button 23 is clicked after the user information is entered, the CPU 10 of the user PC 2 creates a user information file 25 having the same contents as the user information registration screen 21 (FIG. 5) as shown in FIG. 6, transmits it from a network interface 16 (FIG. 3) to the content provider 3 according to a given protocol over the Internet 5 (FIG. 2), and concurrently writes and retains the user information file 25 in the HDD 12.

Figure 7:
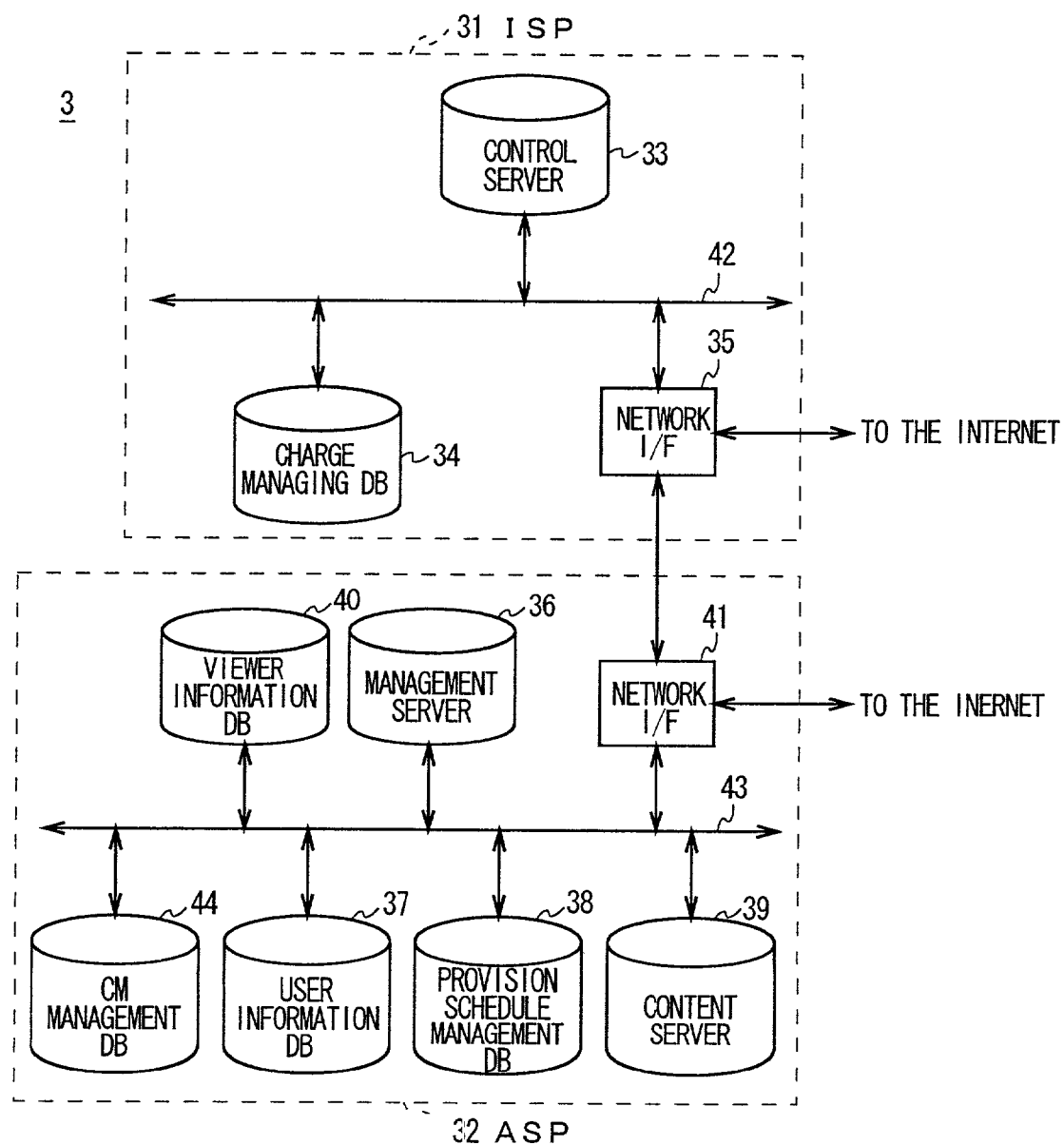
FIG. 7 is a schematic block diagram showing the structure of a content provider.

The content provider 3 consists of an Internet service provider (called "ISP" hereinafter) 31 for connecting the user PC 2 to the Internet 5, and an application service provider (called "ASP" hereinafter) 32 for storing content supplied from the user PC 2 and for providing it in response to the requirements from the client PC 4, as shown in FIG. 7.

In the ISP 31, a control server 33 for controlling the whole operation, a charge management database 34 for managing charges to the user PC 2, and a network interface 35 used for connecting to the user PC 2 over the Internet 5, all connected one another over a LAN (Local Area Network) 42, whereby charge management and network control are performed under control of control server 33.

The ASP comprises a management server 36 for controlling the whole operation, a user information database 37 for managing the user information file 25 of the user PC 2, a provision schedule management database 38 for managing the providing schedule of content, a content server 39 for storing and providing content, a viewer information database 40 for managing viewer information regarding the client PC 4 (viewer) being a viewer of content, and a CM management database 44 for storing and managing CM images supplied from the CM client 7, in correspondence with the CM image ID (Identification), all connected one another over the LAN 43. And user information management, provision schedule management, content storing and providing processing, viewer information management, and commercial providing management are performed under control of management server 36.

The content provider 3 receives the user information file 25 transmitted from the user PC 2 in the user registration, by the management server 36 via the network interface 35 of the ISP 31 and the network interface 41 of the ASP 32.

Figure 8:
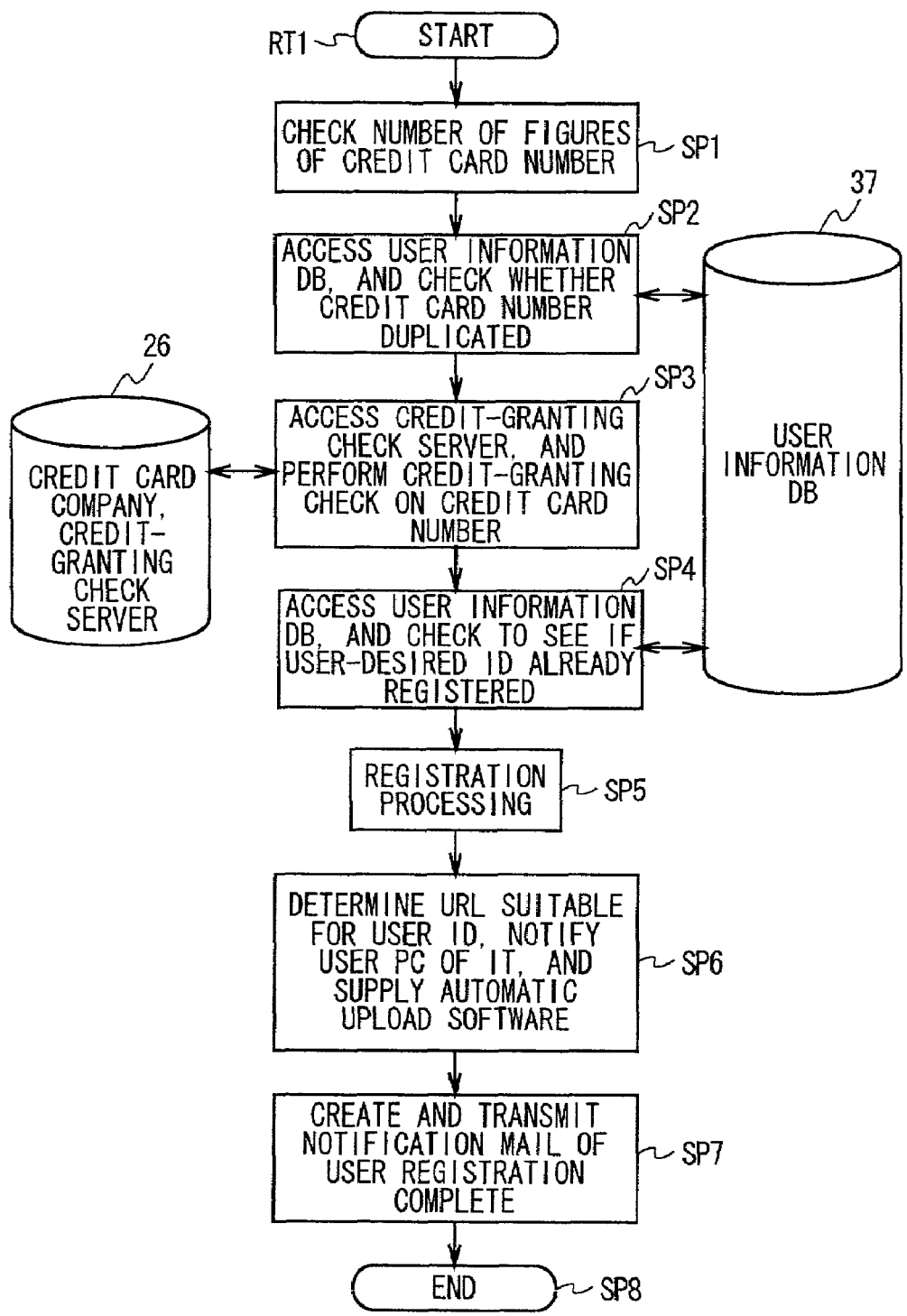
FIG. 8 is a flowchart showing a user registration processing procedure by a management server of an ASP.

Upon receipt of the user information file 25, the management server 36 of the ASP 32 starts a routine RT1 shown in FIG. 8 in the start step and moves to step SP1, according to the user registration procedure program read out of the internal hard disk.

In step SP1, the management server 36 of the ASP 32 reads out the contents of the user information file 25 transmitted from the user PC 2 and checks the number of figures of a credit card number, and, when the number of figures is correct, it proceeds to next step SP2.

If, however, the credit card number has a wrong number of figures, the management server 36 of the ASP 32 notifies the user PC 2 of this error over the Internet 5, and asks the user to enter the credit card number with the correct number of figures.

The management server 36 of the ASP 32 accesses the user information database 37 in step SP2 to check whether the credit a card number of the user information file 25 transmitted is duplicated, and, only in this case of obtaining a negative result, it proceeds to next step SP3.

In step SP3, the management server 36 of the ASP 32 accesses the credit-granting check server 26 of a credit card company via its network interface 41 over the Internet 5, to check whether that credit card number is valid, and only when the credit card number is valid, it proceeds to next step SP4.

In step SP4 the management server 36 of the ASP 32 accesses the user information database 37 again to check whether the first to third desired user IDs have been already used, and only when non of first to third desired user IDs is used, it proceeds to next step SP5.

In step SP5 the management server 36 of the ASP 32 selects a user ID most highly desired out of the desired first to third IDs, from unused user IDs, and after determining a URL (Uniform Resource Locator) corresponding to the user ID, creates a user information DB table 45 as shown in FIG. 9 based on the user information file 25, registers it in the user information database 37. Then, it moves to step SP6.

Written in the user information DB table 45 newly registered in the user information database 37 are, in addition to the contents of the user information file 25, a URL determined corresponding to the user ID, an accumulated point that the content creator has got, which is needed for calculating the profit returning, a user status (stage 1) indicating the rank of the user according to the accumulated points, a connection starting time and date, a connection ending time and date, an Internet connection charge to the ISP 31 for the Internet 5 at the present time, and a service utilization charge for the applied service ("as- much-as-you-like course") for the ASP 32.

In this way, after determining the URL corresponding to the user ID, the management server 36 of the ASP 32 registers them in the user information database 37, whereby granting a content creator the right to write a file of motion pictures of content created by each content creator in the storage area, predetermined in the content server 39, dedicated to the URL.

Also, the management server 36 of the ASP 32 manages the user information data table 45 in the user information database DB 37 for each content creator, for example, it increases and renews the accumulated points of the content creator in accordance with the number of accesses made by the client PCs 4 and changes the user status of the content creator in accordance with the accumulated points, and renews various kinds of data concerning the connection starting time and date, the connection ending time and date, the current Internet connection charge and the service charges for the applied service.

Note that, the user status is the rating of a content creator in accordance with the accumulated points, rising from the lowest stage 1 to the stage 2 and then to the professional stage. Thereby, a content creator with a higher ranked user status can receive more profit.

In step SP6, the management server 36 of the ASP 32 informs the user PC 2 of a determined user ID and the URL corresponding to the user ID over the Internet 5.

At this time, the management server 36 of the ASP 32 is to provide the user PC 2 with automatic upload software so programmed as "to automatically connect to the URL corresponding to the user ID and automatically write the file of motion pictures of the content created by the user PC 2 in the memory area in the content server 39 dedicated to the URL," as shareware.

Thus, the CPU 10 of the user PC 2 downloads the automatic upload software over the Internet 5, and displays the upload icon 27 of the automatic upload software on the desktop screen 19 (FIG. 4) in accordance with the automatic upload software.

Then, when the content creator clicks the upload icon 27 on the desktop screen 19, the CPU 10 of the user PC 2 connects to the ASP 32 via the ISP 31 over the Internet 5 according to the automatic upload software, and gives the management server 36 of the ASP 32 the instructions "to automatically write the file of motion pictures of a content in the memory area in the content server 39 dedicated to the URL."

Thereby, the management server 36 of the ASP 32 can write the file of motion pictures of the content supplied from the user PC 2 in the memory area of the content server 39 dedicated to the URL, and reads out the file of motion pictures of the content from the dedicated memory area of the content server 39 in response to a request from the client PC 4 to provide it to the client PC 4.

As described above, once the user ID is designated and the URL is determined according to the user information registration procedure by the content creator and the automatic upload software is downloaded from the ASP 32, the content creator does not need to enter the URL, so that the CPU 10 of the user PC 2 makes it increasingly easier to upload the file of motion pictures of content into the dedicated memory area of the content server 39 merely by clicking the upload icon 27.

As a result, the content providing system 1 can construct a system as if to open a personal broadcast station offering content on one's own channel (this is called "my channel" hereinafter).

After completing the user registration procedure processing, the management server 36 of the ASP 32 creates a user registration complete notification mail in step SP7, which is transmitted from the network interface 41 to the user PC 2 over the Internet 5, and all the user registration procedure processing is completed in step SP8.

Meanwhile, the management server 36 of the ASP 32 is to transmit the personal user information DB table 45, as required, to the control server 33 of the ISP 31 constructing a business alliance, a telephone company (not shown) for connecting the user PC 2 to an access point of the ISP 31, and an online communication sales management device of the online communication sales company 6.

As a result, the control server 33 of the ISP 31 and the online communication sales device of the online communication sales company 6 both hold the user information DB table 45.

Accordingly, all the user PC 2 is asked to do is just to perform the user registration procedure processing at the very first, and not forced the content creator to follow a troublesome procedure whenever accessing the ISP 31, the telephone company, the online communication management device of the online communication sales company 6, and so on.

Incidentally, the management server 36 of the ASP 32 is to obtain a content creator's agreement in the user registration procedure, for transmitting the contents of the personal information DB table 45 to the control server 33 of the ISP 31, the telephone company, and the online communication sales management device of the online communication sales company 6.

(4) Mode of Personal Casting Service

In the content providing system 1 of the present invention, there are an on-demand type and a live type as content providing modes in the personal casting service as mentioned before.

The on-demand type is a service wherein content is stored in advance in the dedicated memory area of the content server 39 corresponding to the URL that the user PC 2 obtained in the user registration for the personal casting service, and the content is provided to a client PC 4 who makes a request, from the exclusive memory area of the content server 39, as if the content could be provided to the client PC 4 that makes a request, on the own channel (my channel), like a personal broadcast station.

On the other hand, the live type is a service mode wherein many unspecific registered users in the personal casting service share the dedicated storage area of the content server 39 specified by the URL on a time basis for each video channel of a particular genre (for example, wedding channel, live music channel, play live channel and live event channel), the content of live pictures are transmitted to the client PC 4 that made a request, from the dedicated storage area of the content server 39 by the streaming reproduction to provide in real time.

In this way, the live type is designed such that many unspecific registered users can provide content freely by reserving a time frame in the dedicated memory area of the content server 39 designated by URLs for each the video channel of a specific genre, thereby making it possible to provide the content of a live image to a client PC 4 that made a request as if it was provided on a public video channel (this is called "public channel" hereinafter).

(5) Personal Casting Service by On-Demand Type

Next, concrete explanation will be given on the personal casting service by the on-demand type of the content providing system 1.

(5-1) Content Creation Processing of On-Demand Type

The CPU 10 of the user PC 2 (FIG. 3) displays a capture screen 50 as shown in FIG. 10 on the display unit 17 by first starting image capture software from the HDD 12.

In this case, the CPU 10 of the user PC 2 links a digital video camera 18 connected via the IEEE1394 interface 14 and a capture screen 50 by the image capture software, and set to the on-demand mode in response to the click operation of the movie mode switching button 53 by a content creator.

Then the CPU 10 of the user PC 2 lets the content creator confirm an image photographed by the digital video camera 18 displayed on the finder display area 51, and starts recording with the digital video camera 18 by clicking the capture button 52 by the content creator, and finishes recording by re-clicking the capture button 52.

At this time the CPU 10 of the user PC 2 captures motion picture data recorded by the digital video camera 18, via the IEEE1394 interface 14 based on the click operations of the capture button 52, and records it once in the HDD 12.

Figure 11:
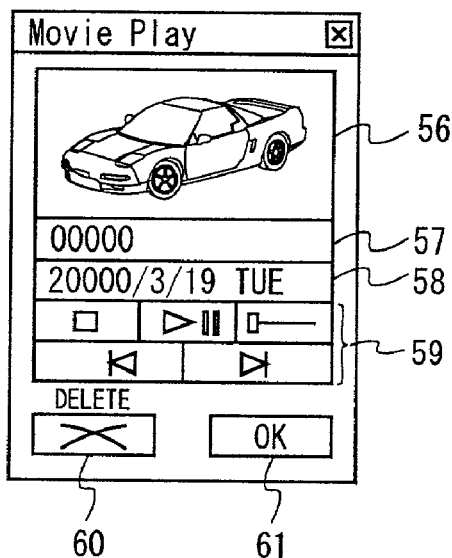
FIG. 11 is a schematic diagram showing a confirmation screen.

Next, the CPU 10 of the user PC 2 displays a confirmation screen 55 on the display 17 according to the image capture software as shown in FIG. 11. This confirmation screen 55 has a video display area 56 for displaying reproduced motion picture data recorded on the HDD 12 once, a time code display area 57 for showing a time code of the motion picture data being reproduced, a date display area 58 for showing the recording date, operation buttons 59 for reproducing, stopping, fast-forwarding, or rewinding the motion picture data, a delete button 60 for deleting a part or the whole of the motion picture data from the HDD 12, and an OK button 61, so that the content creator can confirm the pictures based on the motion picture data recorded and edit them so as to remain the only desired pictures, on the confirmation screen 55.

Figure 12:
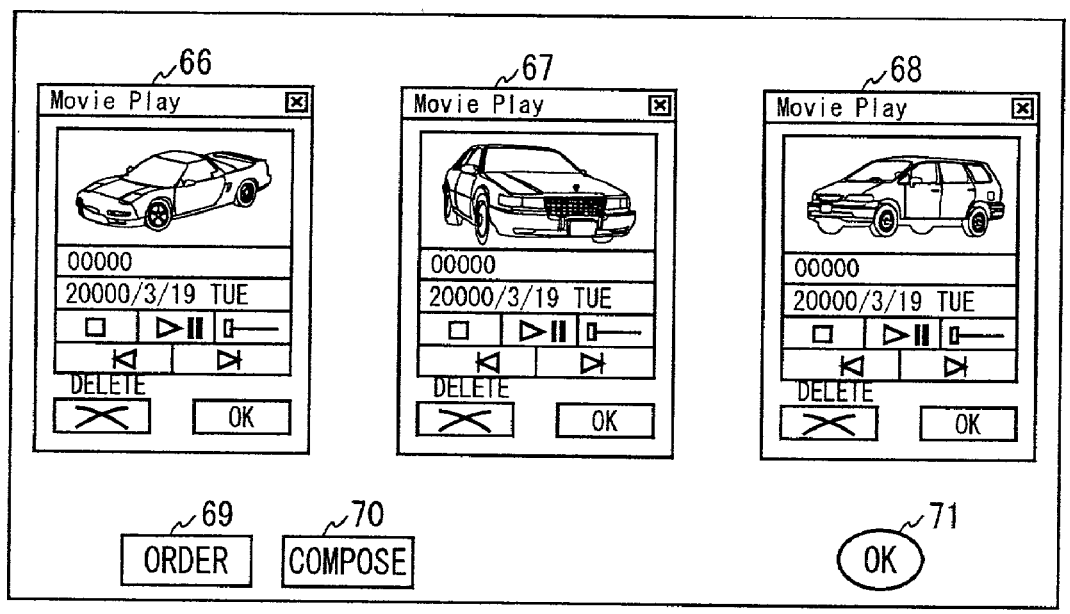
FIG. 12 is a schematic diagram showing an editing screen.

In detail, when the content creator clicks the OK button 61 after confirming and editing the pictures of the recorded motion picture data on the confirmation screen 55, the CPU 10 of the user PC 2 next starts edit software from the HDD 12 to display an edit screen 65 on the display unit 17 as shown in FIG. 12.

This edit screen 65 has three types of confirmation screen display areas 66 to 68 capable of displaying the confirmation screen 55 for the motion picture data recorded with the digital video camera 18, an order button 69 used for determining a composition order for the three pieces of motion picture data, a composition button 70 used for composing the three pieces of motion picture data in a determined composition order, and an OK button 71.

Accordingly, the CPU 10 of the user PC 2 determines a composition order for the three pieces of motion picture data in response to the click operations of the order button 69 by the content creator, and creates a motion picture file by compounding the three pieces of motion picture data in accordance with the determined composition order according to the click operations of the composition button 70, and stores it on the HDD 12 once as content to be stored in the content server 39 of the ASP 32.

(5-2) Schedule Reservation in the On-Demand Type

Figure 13:
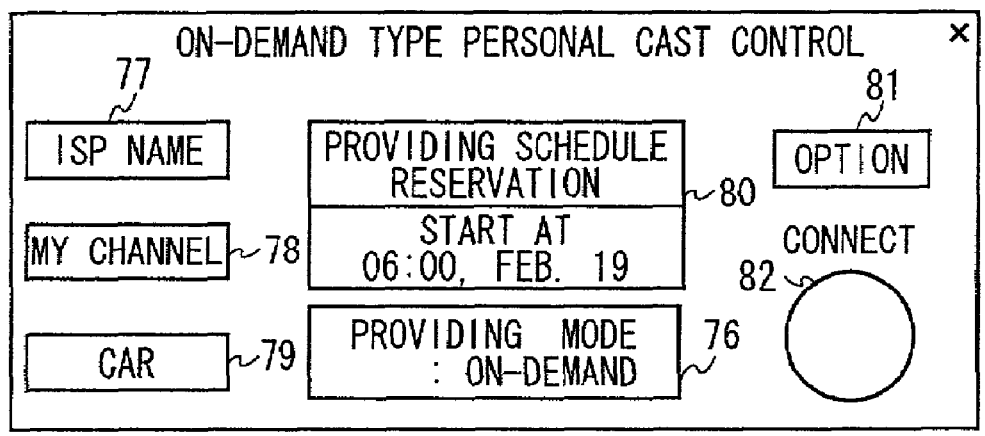
FIG. 13 is a schematic diagram showing an on-demand type personal cast control screen.

After that, when the content creator clicks the OK button 71, or the upload icon 27 on the desktop screen 19 (FIG. 4), the CPU 10 of the user PC 2 starts the automatic upload software which was downloaded in advance from the ASP 32 in the user registration, and displays an on-demand type personal cast control screen 75 on the display unit 17 as shown in FIG. 13.

The on-demand type personal cast control screen 75 shows the letters "On-Demand" in the mode display area 76 indicating that it is in the on-demand mode now, and also displays automatically the company name of the ISP 31 in an ISP name display area 77 and displays the letters "My Channel" in an ASP channel display area 78, which is automatically written in the on-demand mode.

Figure 14:
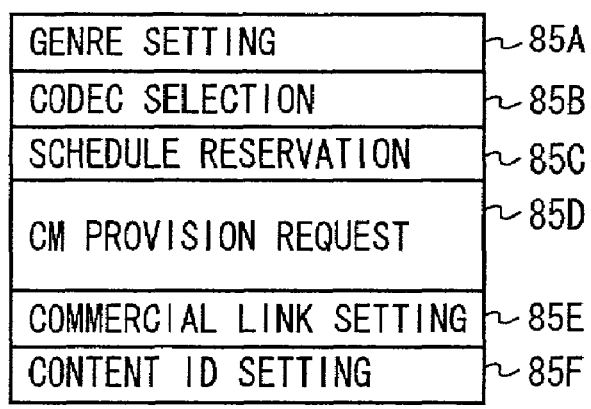
FIG. 14 is a schematic diagram showing a pull-down menu.

An option button 81 is provided on the on-demand type personal cast control screen 75, and when the content creator clicks this option button 81, the CPU 10 of the use PC 2 displays a pull-down menu 85 as shown in FIG. 14 on the on-demand type personal cast control screen 75 in accordance with the automatic upload software.

This pull-down menu 85 has a genre setting button 85A used for designating a video genre of content created by the content creator, a CODEC selection button 85B used for selecting a CODEC when providing content to the client PC 4 that makes a request, a schedule reservation button 85C to enable the content creator to freely determine a content providing schedule, a CM provision request button 85D used for providing a CM image affixed to the beginning of content as desired by the content creator, to the client PC 4, a CM link setting button 85E used for moving to a homepage of, for example, a commercial sponsoring company from a CM image, and a content ID setting button 85F used for setting a content ID corresponding to content.

Figure 15:
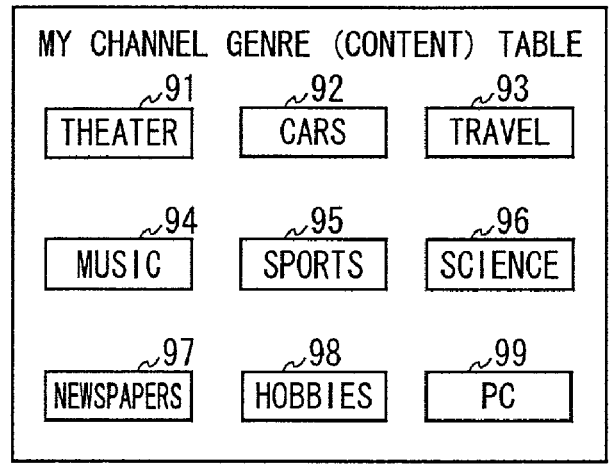
FIG. 15 is a schematic diagram showing my channel genre table screen.

When the content creator clicks the genre setting button 85A in the pull-down menu 85, the CPU 10 of the user PC 2 displays a my channel genre display screen 90 as shown in FIG. 15 on the display unit 17 according to the automatic upload software.

The my channel genre screen 90 has category icons 91 to 99 showing the video categories that the content creator uses to designate a video genre of the content. When the content creator clicks any one ("car" category icon 92 for example) out of them, the CPU 10 of the user PC 2 recognizes the video genre of the content as "car", stores the recognition result as the category data once on the HDD 12.

Figure 16:
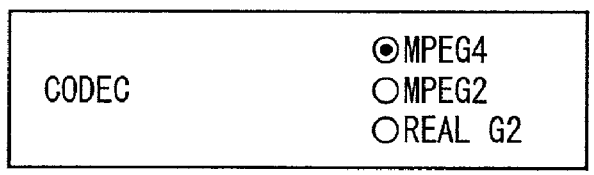
FIG. 16 is a schematic diagram showing a CODEC selection screen.

Also, when the content creator clicks the CODEC selection button 85B in the pull-down menu 85, the CPU 10 of the user PC 2 displays a CODEC selection screen 100 on the display unit 17 as shown in FIG. 16 according to the automatic upload software.

This CODEC selection screen 100 is used for selecting any one of, for example, MPEG (Moving Picture Experts Group) 4, MPEG 2, and Real G2 as a CODEC in providing content to the client PC 4, and so, if a check mark is put on the MPEG 4, for example, by the content creator, the CPU 10 of the user PC 2 recognizes the type of CODEC as MPEG 4, stores the recognition result as the CODEC type data once on the HDD 12.

Figure 17:
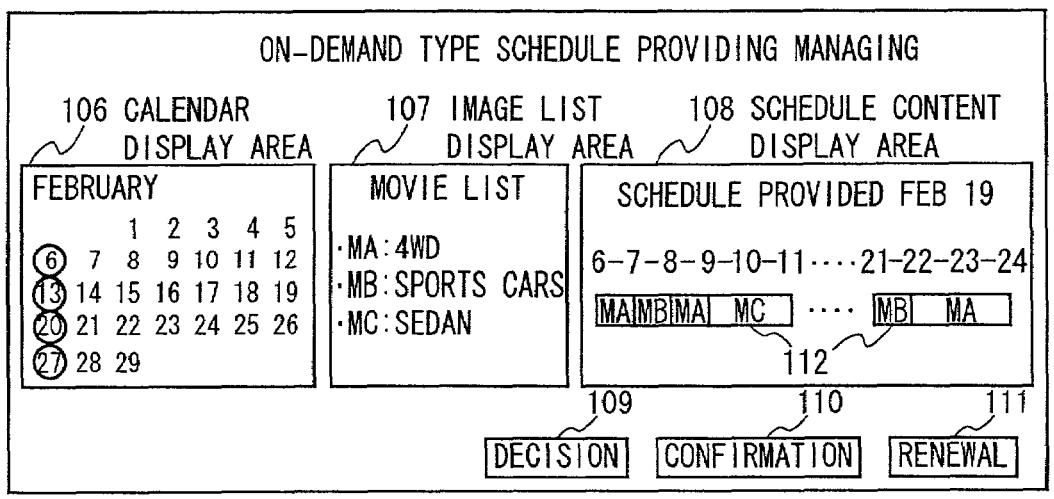
FIG. 17 is a schematic diagram showing an on-demand type provision schedule management screen.

Furthermore, when the content creator clicks the schedule reservation button 85C in the pull-down menu 85, the CPU 10 of the user PC 2 displays an on-demand type provision schedule management screen 105 on the display unit 17 as shown in FIG. 17 in accordance with the automatic upload software.

This on-demand type provision schedule management screen 105 has a calendar display area 106, an image list display area 107, a schedule content display area 108, a decision button 109, a schedule content confirmation button 110, and a schedule content renewal button 111.

When the content creator selects a desired date (e.g., February 19) of providing content in the calendar display area 106 on this on-demand type provision schedule management screen 105 by a click operation, the CPU 10 of the user PC 2 recognizes the providing date desired by the content creator as February 19, and then stores February 19 once on the HDD 12 as the providing date data, and also writes and displays the providing date (February 19) on a title area in the schedule display area 108 automatically.

And, when the content creator designates a time schedule appoint bar 112 by clicking a desired starting time and ending time in the schedule content display area 108 on the on-demand type provision schedule management screen 105, the CPU 10 of the user PC 2 recognizes the time schedule frame from starting time to the ending time, and simultaneously displays the time schedule appoint bar 112 segmented by time schedule frames appointed by the content creator.

That is to say, the time schedule bar 112 in the schedule content display area 108 is divided into; a first time schedule frame from 6:00:00 to 6:59:59, a second time schedule frame from 7:00:00 to 7:59:59, a third time schedule frame from 8:00:00 to 8:59:59, a fourth time schedule frame from 9:00:00 to 10:59:59, . . . , a fifth time schedule frame from 21:00:00 to 21:59:59, and a sixth time schedule frame from 22:00:00 to 23:59:59.

Subsequently, when the content creator selects a desired time schedule frame on the time schedule appoint bar 112 by the click operation and clicks a desired sign (MA, MB, or MC) indicating a desired kind of video (e.g., 4WD, sports car, electric car) in the video table display area 107, the CPU 10 of the user PC 2 recognizes the kinds of images of the content to be offered in the selected first to sixth time schedule frames by the signs (MA, MB, or MC), and displays the recognized signs in the time schedule frames respectively on the time schedule appoint bar 112.

Then, when the decision button 109 is clicked on the on-demand type provision schedule management screen 105, the CPU 10 of the user PC 2 produces a providing schedule program to provide the content of the determined kind reserved for each of the first to sixth time schedule frames on the time schedule appoint bar 112, and stores it once on the HDD 12.

That is, the providing schedule program is programmed to provide the content of "4WD" corresponding to the sign MA in response to a request from the client PC4 within the first time schedule frame on the time schedule appoint bar 112; to provide the content of "sports car" corresponding to the sign MB in response to a request from the client PC 4 within the second time schedule frame; to provide the content of "4WD" corresponding to the sign MA in response to a request from the client PC 4 within the third time schedule frame; to provide the content of "sedan" corresponding to the sign MC in response to a request from the client PC 4 within the fourth time schedule frame; to provide the content of "sports car" corresponding to the sign MB in response to a request from the client PC 4 within the fifth time schedule frame; and to provide the content of "4WD" corresponding to the sign MA in response to a request from the client PC 4 within the sixth time schedule frame.

Figure 18:
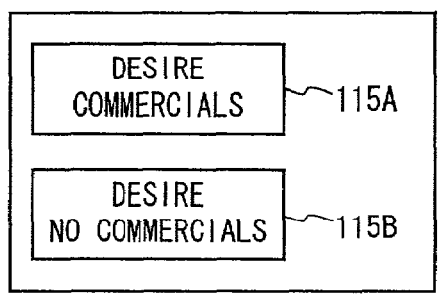
FIG. 18 is a schematic diagram showing a CM provision request screen.

On the other hand, when the content creator clicks the CM provision request button 85D in the pull-down menu 85 (FIG. 14), the CPU 10 of the user PC 2 displays a CM provision request screen 115 on the display unit 17 as shown in FIG. 18 in accordance with the automatic upload software.

This CM provision request screen 115 has a CM desired button 115A and a CM undesired button 115B to ask the content creator whether he or she wishes to provide a client PC 4 with CM videos affixed to the beginning of his or her content, so that only when the CM desired button 115A is clicked by the content creator, the CPU 10 of the user PC 2 creates CM desired data indicating that CM videos are desired to be affixed to the content, and stores it once on the HDD 12.

Figure 19:
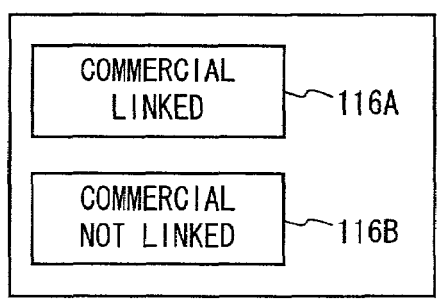
FIG. 19 is a schematic diagram showing a CM link setting screen.

Furthermore, when the content creator clicks the CM link setting button 85E in the pull-down menu 85, the CPU 10 of the user PC 2 displays a CM link setting screen 116 on the display unit 17 as shown in FIG. 19 in accordance with the automatic upload software.

This CM link setting screen 116 has a CM link button 116A to set an anchor linking to the homepage of a commercial sponsoring company, for example, from a CM video initially affixed to the content, and a CM-not-link button 116B not to set a linkage from a CM video, and only when the CM link button 116A is clicked by the content creator, the CPU 10 of the user PC 2 creates CM link data indicating that an anchor is desired to be set to link to a given homepage from a CM video, and stores it once on the HDD 12.

Furthermore, when the content creator clicks the content ID setting button 85F in the pull-down menu 85, the CPU 10 of the user PC 2 displays a content ID setting screen 117 on the display unit 17 as shown in FIG. 20 in accordance with the automatic upload software.

The content ID setting screen 117 has the content ID input area 117A, and when the content creator enters the content ID corresponding to the content and presses the enter key, the CPU 10 of the user PC 2 recognizes the content ID and stores it once on the HDD 12.

In this way, the CPU 10 of the user PC 2 sets various conditions for offering content with the pull-down menu 85 displayed by clicking the option button 81 on the personal cast control screen 75, and newly creates an on-demand type provision schedule control file 120 as shown in FIG. 21 based on the various kinds of condition data (category data, CODEC kind data, providing schedule program, CM desired data, CM link data, and content ID) once recorded on the HDD 12, and the contents of the user information file 25 created in the user registration procedure processing, and stores them once on the HDD 12.

That is to say, the on-demand type provision schedule control file 120 once stored on the HDD 12 comprises an ISP name (***) as an "ISP connection point" used in connecting to the Internet 5, a channel type (my channel) as "ASP channel" at the time when the ASP 32 provides content, a content ID (*) determined by the content creator as "content ID", a CODEC (MPEG 4) as "CODEC" at the time of providing content, an image category (car) as "image genre", the contents (various conditions such as "start at 6:00 February 19") of providing schedule data as "providing schedule", a presence/absence of a CM provision request (with CM) as "CM request", a presence/absence of a linked CM (without CM link) as "CM link", a user ID (kimukimu) as "user ID at the time of user registration, and a password (*****) as "password" at the time of user registration.

Accordingly, the CPU 10 of the user PC 2 display the letters "car" as the image category of the content, in the video genre display area 79 on the on-demand type personal cast control screen 75 (FIG. 13) based on the on-demand type provision schedule control file 120, and displays the letters "start at 6:00 February 19" as the providing schedule of the content, on the providing schedule reservation area 80.

Note that, it has been explained that the CM link and the content ID are set by the user PC 2 with the use of the pull-down menu 85, however, they may be set automatically by the management server 36 of ASP 32.

As to the CM link setting for example, when a link has been designated by the CM client 7, the CM link is made automatically for a CM determined to be provided by the client PC 4.

Also, for example, when an image is uploaded, a content ID is set automatically by the management server 36 of the ASP 32, thus making it possible to manage an image by the management server 36 of the ASP 32 with this ID.

(5-3) Connection Processing to ASP in On-Demand Type

Next, when the content creator confirms the contents of the on-demand type personal cast control screen 75 (FIG. 13) and clicks the connect button 82, the CPU 10 of the user PC 2 starts a routine RT2 shown in FIG. 22 at the starting step in accordance with the automatic upload software, and moves on to step SP11.

In step SP11, the CPU 10 of the user PC 2 logs in to the ASP 32 via the network interface 16 (FIG. 3) over the Internet 5 and through the ISP 31, and accesses the user information database 37 of the ASP 32 to obtain authentication of the user ID, password, and so on, and then moves to step SP12.

Having obtained authentication by the ASP 32 in step SP12, the CPU 10 of the user PC 2 reads out an on-demand type provision schedule control file 120 and the motion picture file of the content from the HDD 12, and transfers the on-demand type provision schedule control file 120 and the motion picture file of the content to the management server 36 from the network interface 16 via the Internet 5, the network interface 35 of the ISP 31, and the network interface 41 of the ASP 32, and proceeds to next step SP13 where the processing is terminated.

In this way, the CPU 10 of the user PC 2 is capable of uploading the on-demand type provision schedule control file 120 and the motion picture file of the content into the ASP 32 in accordance with the automatic upload software.

Upon receipt of the on-demand type provision schedule control file 120 and the motion picture file of the content via the network interface 41, the management server 36 of the ASP 32 registers the on-demand type provision schedule control file 120 in the provision schedule management database 38, and stores the motion picture file of the content in the dedicated memory area of the content server 39 corresponding to the URL that the user PC 2 obtained in the user registration.

In the case where the CM provision request is "with CM" as the contents of the on-demand type provision schedule control file 120, the management server 36 of the ASP 32 creates a motion picture file with CM by affixing a CM video supplied in advance by the CM client 7 and stored in the CM control database 44, to the beginning of the motion picture file of the content, and retains it in the content server 39 once again.

In the meantime, the control server 33 of the ISP 31 charges for an Internet connection charge, which occurs while the user PC 2 uploads the on-demand type provision schedule control file 120 and the motion picture file of the content into the ASP 32, in correspondence with the user ID of the user PC 2, and renews the charge data of the charge management database 34.

Also, the management server 36 of the ASP 32 charges for the service charge of the ASP 32 in correspondence with the user ID of the user PC 2, transmits this charge data to the charge management database 34 via the network interface 41 and the network interface 35 of the ISP 31, to renew the charge data of the charge management database 34.

Incidentally, when the user PC 2 has a contract for a fixed charge service called "as-much-as-you-like course", the control server 36 of the ASP 32 only records in the user information database 37 the connection time from the connection starting time and date to the connection ending time and date, without performing the charge processing and with the service charge fixed.

To confirm the contents of the on-demand type provision schedule control file 120 after the on-demand type provision schedule control file 120 and the motion picture file of the content are uploaded into the ASP 32, what the content creator has to do is just to click the schedule content confirmation button 110 on the on-demand type provision schedule management screen 105 (FIG. 17).

Figure 23:
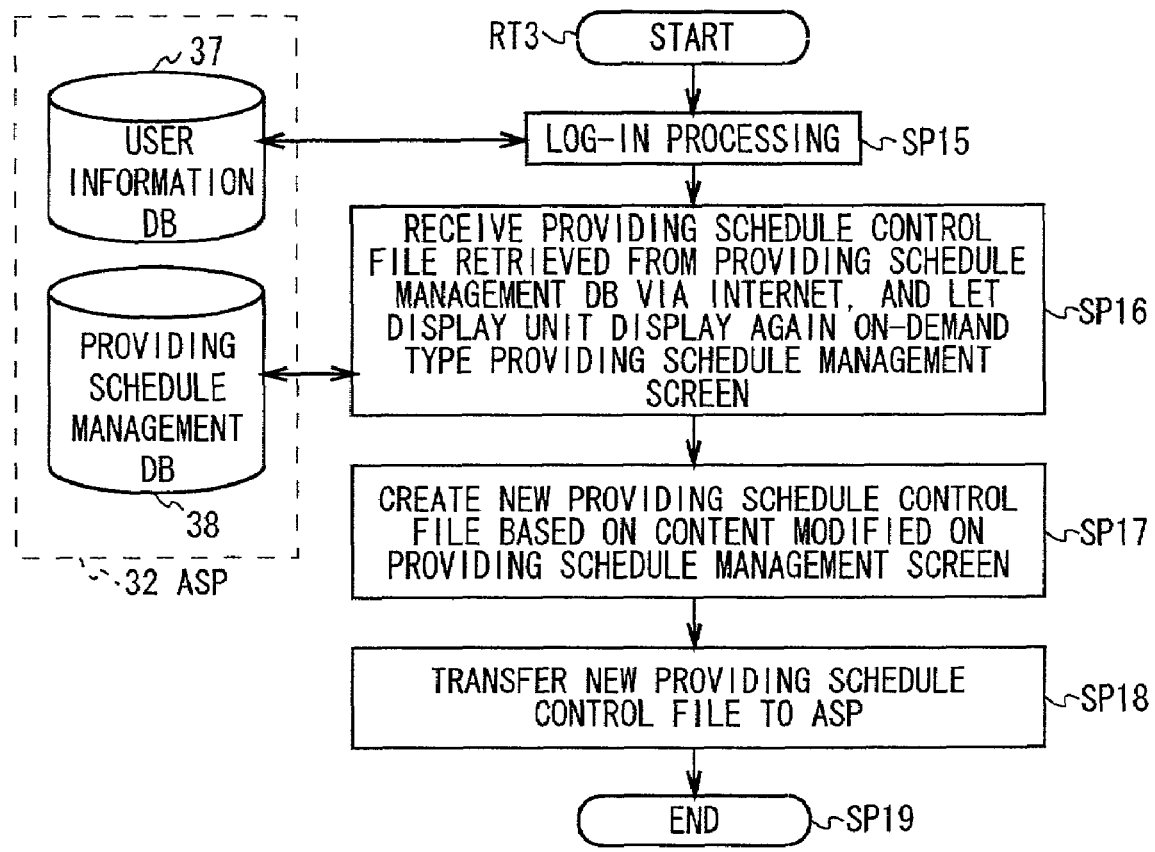
FIG. 23 is a flowchart showing the confirmation and changing processing procedure of a provision schedule.

At this time, the CPU 10 of the user PC 2 starts a routine RT3 shown in FIG. 23 at the start step, and proceeds to step SP15 in accordance with the automatic upload software.

In step SP15, when the content creator clicks the schedule content confirmation button 110, the CPU 10 of the user PC 2 performs the log-in processing to the ASP 32 from the network interface 16 (FIG. 3) via the Internet 5 and ISP 31, to obtain authentication of the user ID, and password, etc., by accessing the user information database 37 of the ASP 32, and then proceeds to next step SP16.

Since the management server 36 of the ASP 32 has obtained authentication of the user ID, and password, etc., the CPU 10 of the user PC 2 is supplied with the on-demand type provision schedule control file 120 from the provision schedule management database 38 in step SP16, and displays the on-demand type provision schedule management screen 105 (FIG. 17) once again on the display unit 17 based on the on-demand type provision schedule control file 120.

The CPU 10 of the user PC 2 displays the on-demand type provision schedule management screen 105 on the display unit 17 in this way, so that the content creator can reconfirm the contents of the on-demand type provision schedule control file 120.

After that, in the case of modifying the contents of the on-demand type provision schedule control file 120, when the content creator clicks the decision button 109 after the providing schedule is modified on the on-demand type provision schedule management screen 105, the CPU 10 of the user PC 2 proceeds to next step SP17.

In step SP17, the CPU 10 of the user PC 2 creates a new providing schedule based on the contents modified on the on-demand type provision schedule management screen 105, to create a new on-demand type provision schedule control file 120 based on this program, and then it proceeds to next step SP18.

When the content creator clicks the renewal button 111 on the on-demand type provision schedule management screen 105, the CPU 10 of the user PC 2 transfers the new on-demand type provision schedule control file 120 to the ASP 32 over the Internet 5, and proceeds to next step SP19 where the processing is terminated.

As a result, the control server 36 of the ASP 32 renews the provision schedule management database 38 based on the new on-demand type provision schedule control file 120, to manage the providing schedule of the content based on this new on-demand type provision schedule control file 120 thereafter.

(5-4) Content Providing Processing in On-Demand Type

Similar to the user PC 2, the client PC 4 also can make user registration to the content provider 3 when receiving content. In this case, the client PC 4 performs the user registration in accordance with the user registration processing procedure of the routine RT1 (FIG. 8), then the control server 36 of the ASP 32 registers a viewer information file in the viewer information database 40 in correspondence with the user ID and password of the client PC 4.

In the case that user registration has not been made, the client PC 4 may access directly, as a visitor, the web site of the personal casting service provided by the ASP 32. The only user-registered client PC 4 is allowed to make a contribution easily to a content creator of content which moves the client, which the client sympathizes with, or which the client feels excellent. Explanation will be given on the contribution later.

Figure 24:
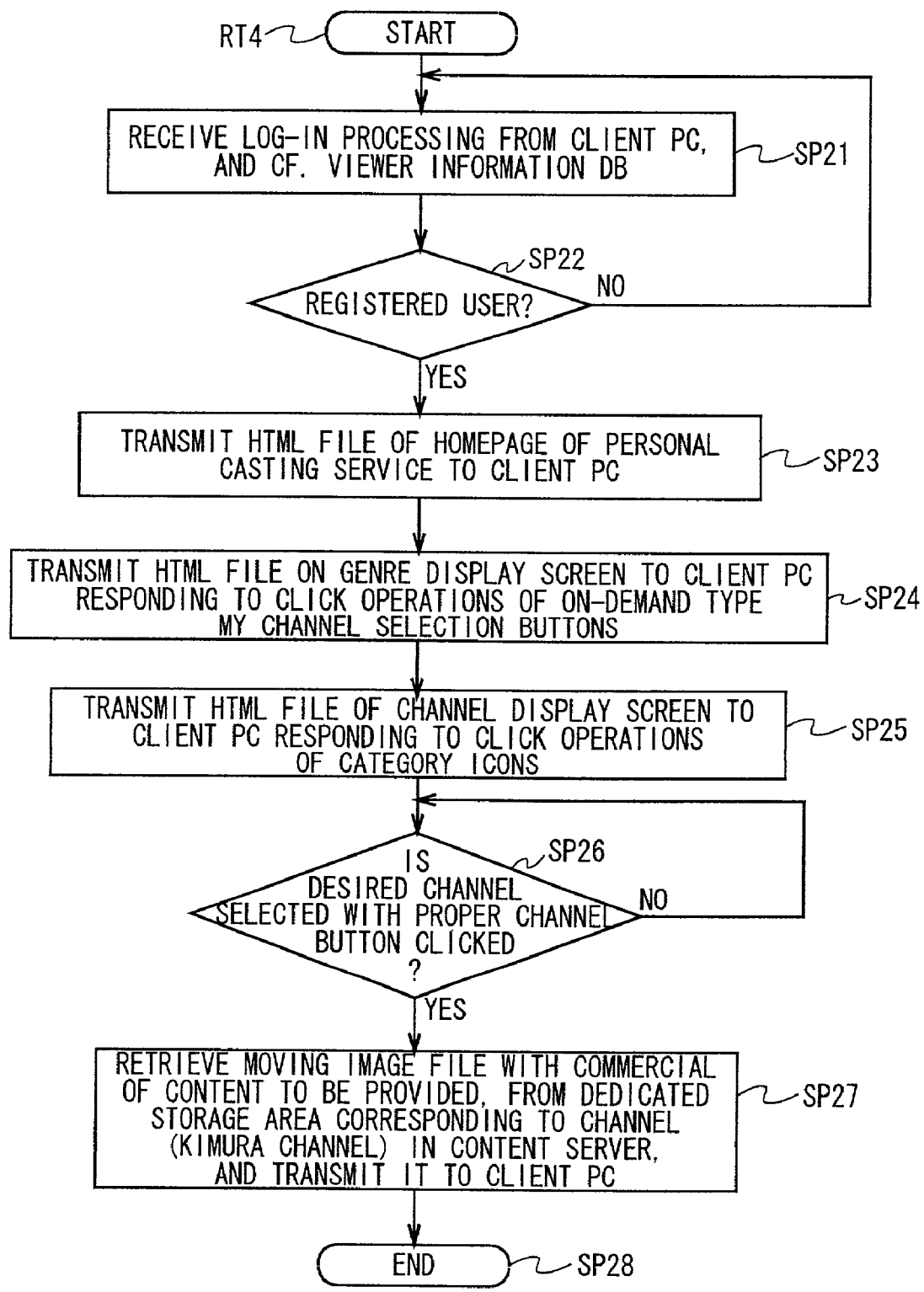
FIG. 24 is a flowchart showing a casting processing procedure in the on-demand type.

In practice, in such a case that content is provided to a user-registered client PC 4 in the on-demand type for example, the management server 36 of the ASP 32 starts a routine RT4 shown in FIG. 24 at the starting step in accordance with a content providing program read from the inside hard disk, and then proceeds to step SP21.

In step SP21, the management server 36 of the ASP 32 is logged in by the client PC 4 and refers to the viewer information file in the viewer information database 40 based on the user ID and password sent from the client PC 4, and then proceeds to next step SP22.

In SP22, the management server 36 of the ASP 32 judges whether the client PC 4 logging in is a legitimate registered user, in reference with the viewer information file in the viewer information database 40 based on the user ID and password.

Obtaining a negative result here means that the user ID and password do not match those registered in the viewer information database 40, then the management server 36 of the ASP 32 returns to step SP21, and lets the client PC 4 perform log-in processing again, to enter the correct user ID and password.

On the other hand, obtaining an affirmative result in step SP22 means that the client PC 4 is a regular registered user, then the management server 36 of the ASP 32 moves to next step SP23.

In step SP23, the management server 36 of the ASP 32 reads the HTML file of a homepage in the personal casting service from the content server 39 in response to the access from the client PC 4, and transmits it to the client PC 4 via the network interface 41 over the Internet 5.

Figure 25:
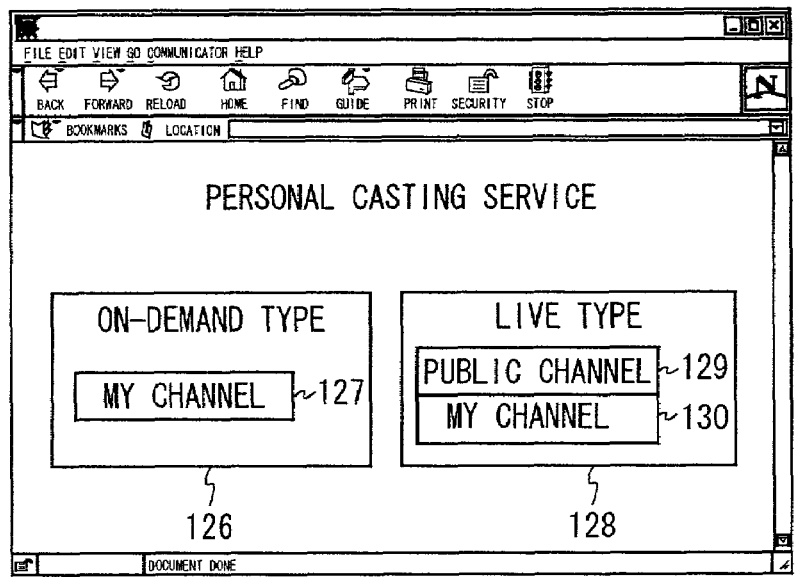
FIG. 25 is a schematic diagram showing a homepage screen in a personal casting service.

The client PC 4 has almost the same structure as the user PC 2 (FIG. 3), and its CPU (not shown in figure) receives the HTML file of the homepage in the personal casting service transmitted from the ASP 32, and displays it on the display unit as a homepage screen 125 (NetScape Communication Corp's netscape navigator screen) as shown in FIG. 25.

This homepage screen 125 displays an on-demand type my channel selection button 127 to receive content on my channel in an on-demand mode selection display area 126, and a live type public channel selection button 129 to receive content of a live video on a public channel and a live type my channel selection button 130 to receive content of a live video on my channel, in a live mode selection display area 128.

When the user clicks the on-demand type my channel selection button 127 on this homepage screen 125, the CPU of the client PC 4 transmits to the management server 36 of the ASP 32 over the Internet 5 a mode selection signal indicating that the on-demand type my channel selection button 127 has been pressed.

In step SP24 the management server 36 retrieves an HTML file constituting a genre table screen for my channel from the content server 39 based on the mode selection signal transmitted from the client PC 4, and transmits it to the client PC 4 via the network interface 41 over the Internet 5.

Figure 26:
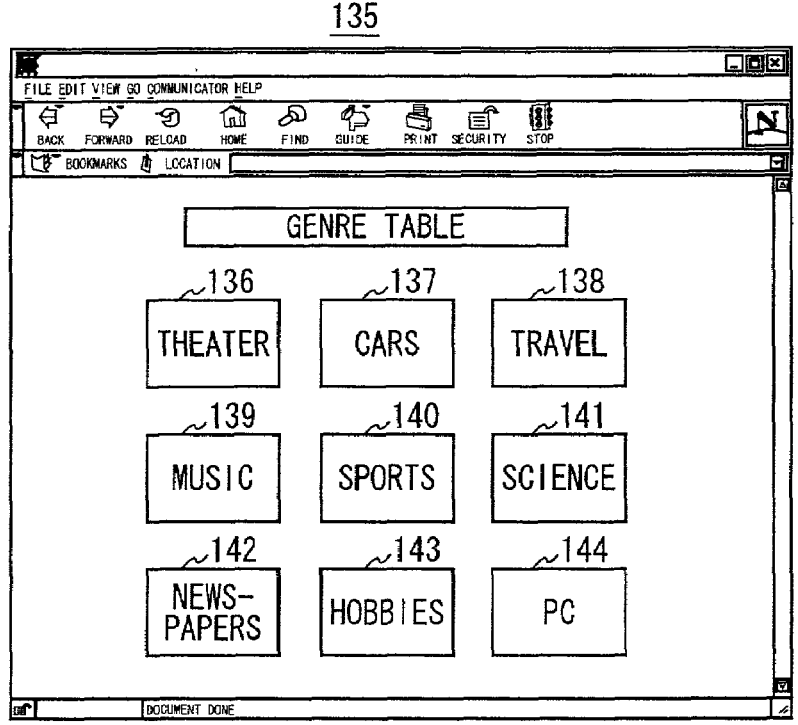
FIG. 26 is a schematic diagram showing the genre table screen for my channel.

Thereby, the CPU of the client PC 4 receives the HTML file of the genre table screen for my channel transferred from the ASP 32, and displays it on the display unit as the genre table screen 135 for my channel as shown in FIG. 26.

This genre table screen 135 for my channel is almost the same as the genre table screen 90 (FIG. 15) for my channel that is used by the content creator in selecting a video genre of content, and displays category icons 136 to 144 assigned to each image category thereon.

When the user of the client PC 4 clicks any one (e.g., "car" category icon 137) out of those category icons 136 to 144 on the genre table screen 135 for my channel, the CPU of the client PC 4 transmits to the management server 36 of the ASP 32 over the Internet 5 a genre selection signal corresponding to the "car" category icon 137.

In step SP25 the management server 36 of the ASP 32 retrieves the HTML file of the channel display screen concerning the image category "car" from the content server 39 based on the genre selection signal transmitted from the client PC 4, and transmits it to the client PC 4 via the network interface 41 over the Internet 5.

Figure 27:
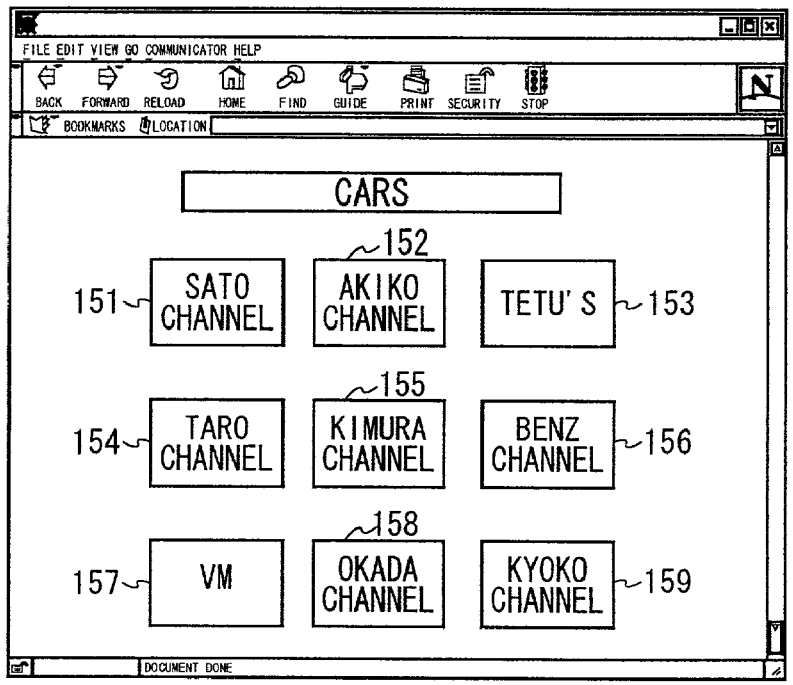
FIG. 27 is a schematic diagram showing a channel display screen regarding a video genre of "car".

After that, the CPU of the client PC 4 receives the HTML file of the channel display screen transmitted from the ASP 32, and displays it on the display unit as a channel display screen 150 regarding the video genre "car" as shown in FIG. 27.

This channel display screen 150 displays channel buttons 151 to 159 with channel names (e.g., Kimura Ch) which was set up in the user information DB table 45 (FIG. 9) at the time when the content creator performed user registration processing. A user can click and select a desired channel button (e.g., Kimura Ch) out of them.

In step SP26, the management server 36 of the ASP 32 judges whether a desired channel button 155 is click-selected by the user of the client PC 4 viewing the channel display screen 150.

In this case, the CPU of the client PC 4 transmits to the management server 36 of the ASP 32 over the Internet 5 a content ID set corresponding to the channel button 155 selected by the user.

Accordingly, the management server 36 of the ASP 32 recognizes that a desired channel button 155 is clicked at the place where the content ID is received, and captures a URL corresponding to the channel button 155 with reference to the on-demand type provision schedule control file 120 stored in the provision schedule management database 38 based on the content ID.

Obtaining a negative result in step SP26 means that none of the channel buttons 151 to 159 displayed on the channel display screen 150 is selected by the user, and then the management server 36 of the ASP 32 waits until any one of the channel buttons 151 to 159 is selected.

On the other hand, obtaining an affirmative result in step SP26 means that the user has clicked a desired channel button 155 out of the channel buttons 155 to 159, then the management server 36 of the ASP 32 proceeds to next step SP27.

Upon receipt of the content ID corresponding to a clicked channel (e.g., Kimura CH) 155 from the client PC 4 over the Internet 5, the management server 36 of the ASP 32 refers to the on-demand type provision schedule control file 120 based on the content ID, and retrieves a motion picture file with a CM (commercial) of a certain kind (MA, MB, or MC) of a video to be provided, from the dedicated memory area in the content server 39 based on the URL corresponding to the content ID, at the timing of the channel button 155 clicked, and transmits it to the client PC 4 over the Internet 5, and then it goes to next step SP28 where the processing is terminated.

In practice, when the user clicks a channel button (e.g., Kimura Ch) 155 on the channel display screen 150 at 10:55 a.m. on February 19 for example, the management server 36 of the ASP 32 refers to the on-demand type provision schedule control file 120 and transmits to the client PC 4 the motion picture file with CM of a movie kind "Sedan" in accordance with the providing schedule on the schedule content display area 108 designated on the on-demand type provision schedule management screen 105 (FIG. 17).

Figure 28:
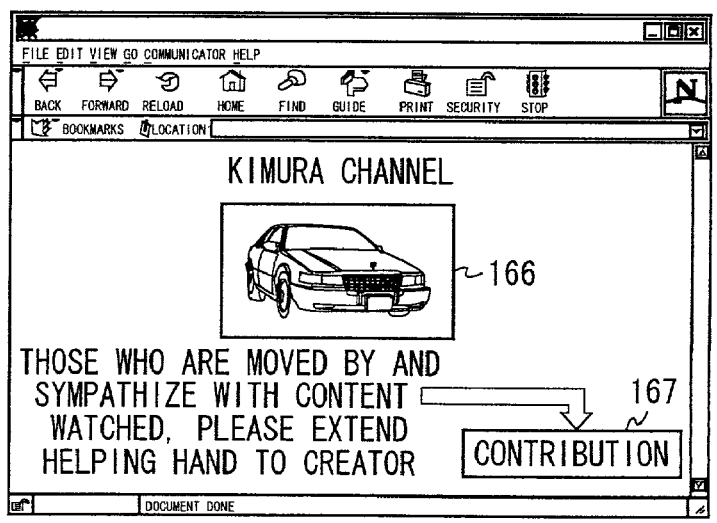
FIG. 28 is a schematic diagram showing a content display screen having contents corresponding to a selected channel button displayed thereon.

Thereby, the client PC 4 displays a content display screen 165 as shown in FIG. 28 on the display unit based on the received motion picture file with CM, and a CM movie is first displayed in a display area 166 appearing in the center of the content display screen 165, and a motion picture of a car "sedan (MC)" is displayed thereafter.

As described above, the management server 36 of the ASP 32 is to transmit to the client PC 4 one kind of a motion picture file with CM to be provided at the timing when a channel button 151 to 159 is clicked by the user of the client PC 4, in accordance with the content of the on-demand type provision schedule control file 120.

Thereby, the management server 36 of the ASP 32 is capable of transmitting content swiftly without delay even when transmitting the same content to a plurality of clients PC4 almost at the same time in response to their requests, as compared with the case where a plurality of content need to be transmitted simultaneously at certain timing, because a narrower bandwidth of a transmission line is used.

Also, at this time the management server 36 of the ASP 32 counts the number of the clicks by the client PC 4 as the access number every time a motion picture file with CM is provided to the client PC 4 in response to the click operation.

In this case, the access times counted is equivalent to the number of people watching the CM video, the management server 36 of the ASP 32 is designed to give points according to the number of access times to the content creator, so that a fair profit returning goes to the content creator who creates a most frequently accessed content. For this reason, the point of the content creator is registered in the user information DB table 45 corresponding to the user ID, and then is stored in the user database 37.

(6) Personal Casting Service in Live Type

Next, concrete explanation will be given on the personal casting service by the live type of a content providing system 1.

(6-1) Schedule Reservation in the Live Type

In the live type, to provide content of a live video in real time, it is not necessary to create the motion picture file of the content and to store the created motion picture file of the content in the content server 39 of the ASP 32 in advance, unlike the on-demand type.

In the live type, however, since content is to be provided on a common public channel (wedding ceremony channel, live music channel, live theater channel, or live event channel), it is necessary to reserve in advance a public channel within a desired time schedule frame.

That is, reserving a public channel within the desired time schedule frame means reserving the dedicated memory area of the content server 39 corresponding to the URL of each public channel within the desired time schedule frame.

In practice, when the ASP 32 provides the content of a live video, it reads and outputs the motion picture file of the live video sent from the user PC 2 while once writing it in the dedicated memory area of the content server 39 designated by the URL for each public channel.

That is, to make a reservation the public channel within a time schedule frame, the CPU 10 of the user PC 2 first displays the capture screen 50 (FIG. 10) on the display unit 17 by starting the image capture software, as is the case of the on-demand type.

Figure 29:
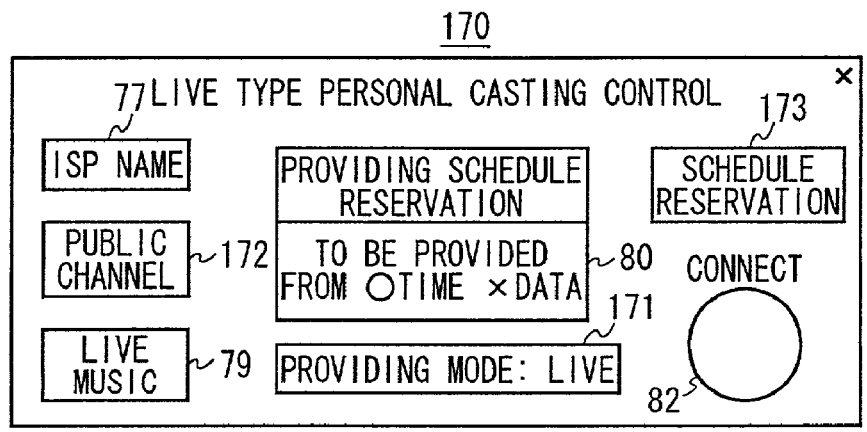
FIG. 29 is a schematic diagram showing a live type personal cast control screen.

And, after the live mode is set in response to the click operation of the movie mode switching button 53 on the capture screen 50, the CPU 10 of the user PC 2 starts the automatic upload software downloaded in advance from the ASP 32 at the time of user registration, and displays a live type personal cast control screen 170 on the display unit 17 as shown in FIG. 29 in which the same reference numerals are applied to parts corresponding to those in FIG. 13.

The live type personal cast control screen 170 displays the letters "LIVE" indicating that the live mode is set currently on the mode display area 171, and displays the letters "PUBLIC CHANNEL" set as default in the live mode on the ASP channel display area 172, and has a schedule reservation button 173, in place of the option button 81 on the on-demand type personal cast control screen 75 (FIG. 13).

In addition, the live type personal cast control screen 170 displays on the video genre display area 79 the name of a public channel (e.g., "LIVE MUSIC") which is determined when the content creator reserves the time schedule frame, out of four types of channels: the wedding ceremony channel; the live music channel; the live theater channel; and the live event channel which are set as public channels.

Furthermore, the live type personal cast control screen 170 displays the providing time and date of the content of a live video reserved by the content creator, in the providing schedule reservation display area 80, like the on-demand type.

Figure 30:
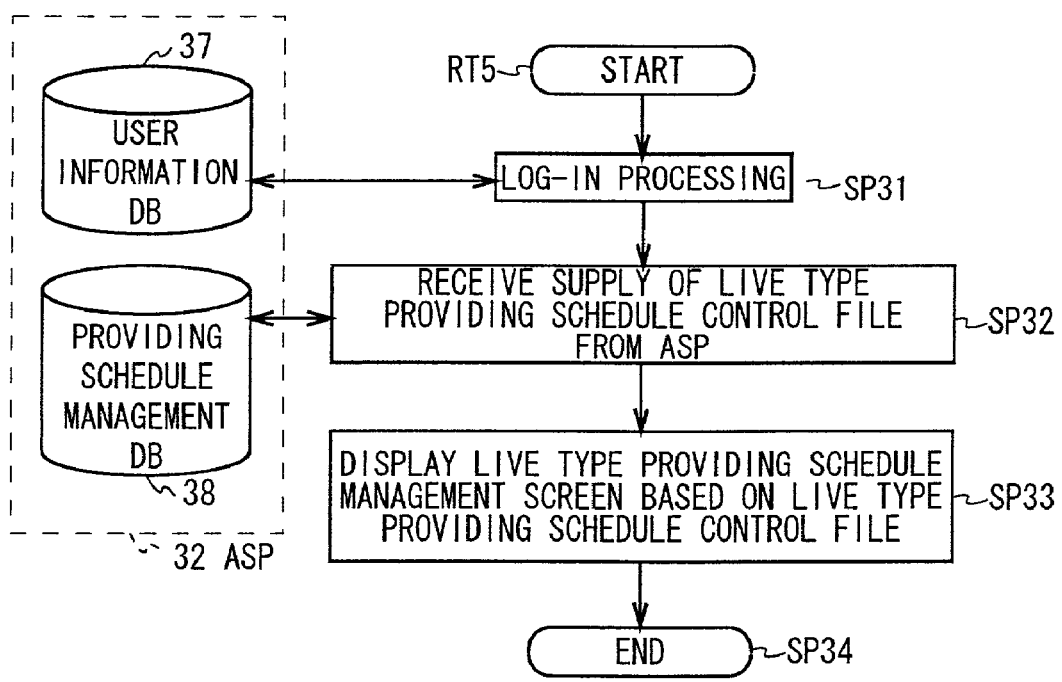
FIG. 30 is a flowchart showing a display processing procedure of a live type provision schedule management screen.

In the live type personal cast control screen 170 described above, when the content creator clicks the schedule reservation button 173, the CPU 10 of the user PC 2 starts the automatic upload software downloaded from the ASP 32, and starts a routine RT5 shown in FIG. 30, at starting step, and proceeds to step SP31.

In step SP31, the CPU 10 of the user PC 2 logs in to the ASP 32 via the network interface 16 (FIG. 3) over the Internet 5 and through the ISP 31, and obtains authentication based on the user ID, password, etc., by accessing the user information database 37 of the ASP 32, then moves on to next step SP32.

In step SP32, the CPU 10 of the user PC 2 receives over the Internet 5 a live type provision schedule control file concerning the reservation state of the public channel which is read out by the management server 36 of the ASP 32 from the provision schedule management database 38, records it on the HDD, and it proceeds to next step SP33.

Figures 31, 32:
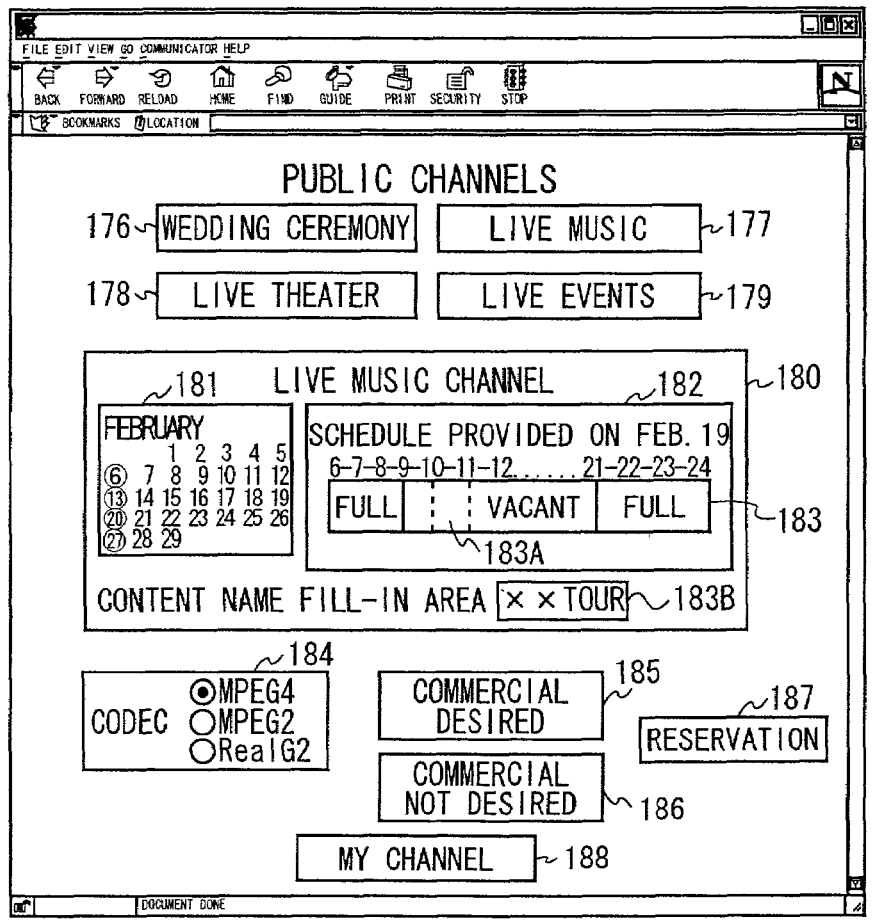
FIG. 31 is a schematic diagram showing a live type provision schedule management screen for public channels.
FIG. 32 is a schematic diagram showing the content of a live type provision schedule control file.
Figure 33:
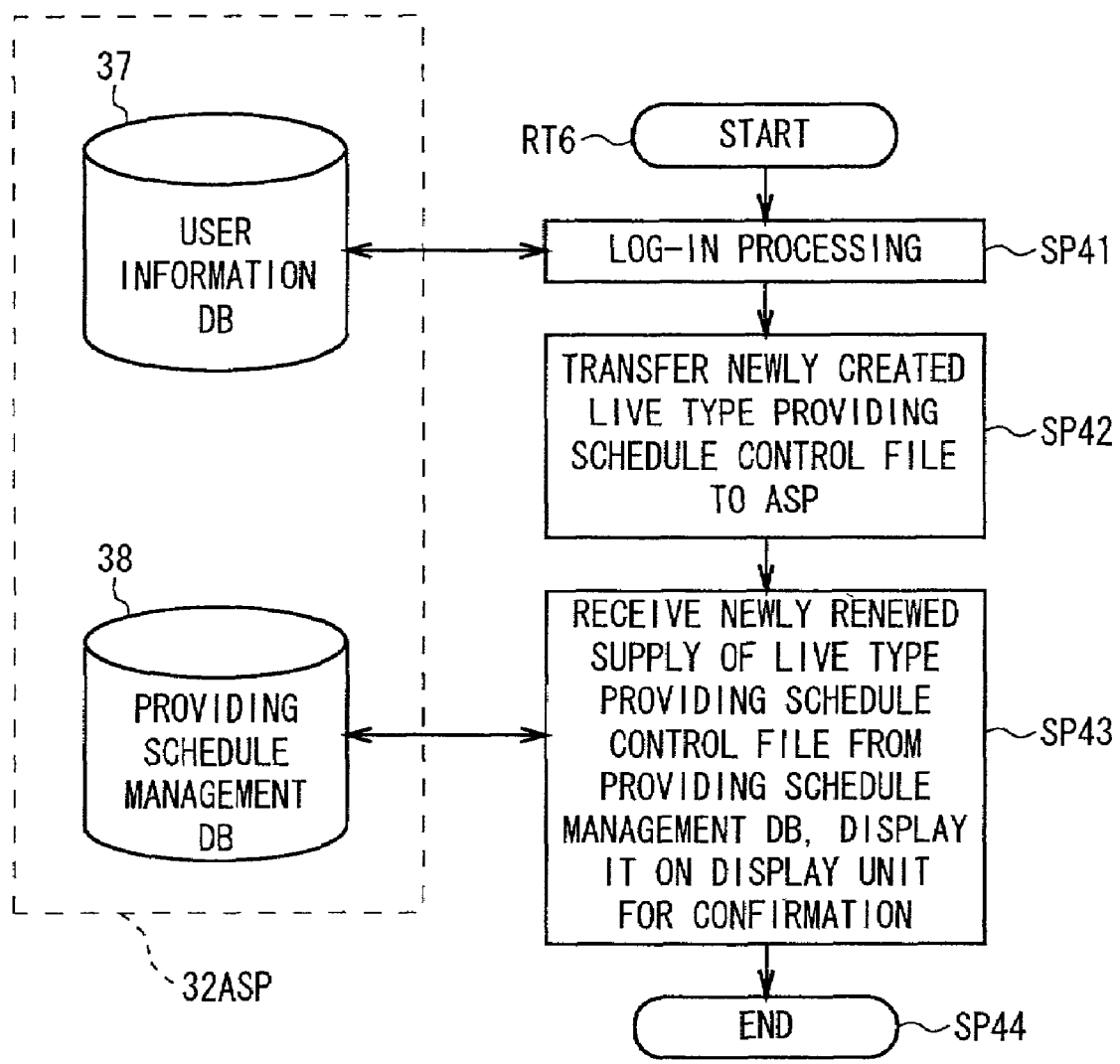
FIG. 33 is a flowchart showing a reservation processing procedure.

In step SP33, the CPU 10 of the user PC 2 displays on the display unit 17 a live type provision schedule management screen 175 for a public channel, as shown in FIG. 31, based on the live type provision schedule control file concerning the reservation state of a public channel supplied from the ASP 32, and then it terminates the processing in next step SP34.

This live type provision schedule management screen 175 has four public channel buttons: a wedding ceremony Ch button 176, a live music Ch button 177; a live theater Ch button 178; and a live event Ch button 179, corresponding to the wedding ceremony channel, the live music channel, the live theater channel, and the live event channel respectively.

When the content creator clicks, for example, the live music Ch button 177 out of the four public channels, the CPU 10 of the user PC 2 displays in a schedule content display area 180 the current reservation state of the "LIVE MUSIC CHANNEL" based on the live type provision schedule control file.

The schedule time plan table 182 in the schedule content display area 180 shows the reservation state of this day as a default, and when the content creator clicks a desired reservation date (e.g., February 19) in the calendar display area 181, the CPU 10 of the user PC 2 displays the reservation state of the desired reservation date (February 19) for the live music channel in the schedule time plan table 182 based on the live type provision schedule control file.

The content creator is to confirm the reservation state on a desired reservation date (February 19) displayed in the schedule time plan table 182 and to appoint a desired starting time (e.g., 10:00) and an ending time (10:59:59) out of the "vacant" time schedule of a time schedule appoint bar 183 with the cursor, whereby determining a time schedule frame 183A for the content of the live video to be provided.

By performing the above processing, the CPU 10 of the user PC 2 recognizes as the reserved time schedule frame data the starting time and the ending time of the time schedule frame 183A specified by the content creator, and additionally writes it in the live type provision schedule control file, displaying "FULL" in the time schedule frame 183A.

When the content creator enters the name (e.g., "xx tour") of the content to be provided in the reserved time schedule frame 183A, that name is automatically added to the live type provision schedule control file in correspondence with a given content ID.

When a check mark is affixed to the MPEG 4, for example, as a CODEC when providing the content of a live video in the CODEC selection display area 184, the CPU 10 of the user PC 2 recognizes the type of a selected CODEC as MPEG 4, adds the recognition result to the live type provision schedule control file as the CODEC type data.

Out of a CM desired button 185 to add a CM video to the beginning of the content and provide it to the client PC 4, and a CM undesired button 186 not to provide a CM video to the client PC 4, when the content creator clicks the CM desired button 185, the CPU 10 of the user PC 2 creates CM desired data to add the CM video to the content of the live video, and added it to the live type provision schedule control file.

By performing various setting to provide the content of the live video on the live music channel as a public channel as described above, creates a new live type provision schedule control file 189 as shown in FIG. 32, and record it once on the HDD 12.

The live type provision schedule control file 189 stores: an ISP name (***) used when connecting to the Internet 5, as an "ISP connection destination"; a channel type (public channel) used when the ASP provides the content of a live video, as an "ASP channel"; the title (xx tour) of the content as the "content name"; a CODEC (MPEG 4) in provision as "CODEC"; a type of a public channel (live music channel) selected by the content creator according to content of a live video as a "public channel"; a time and date (various conditions such as a providing schedule from 10:00 on February 19) as "providing schedule"; a presence/absence of CM provision request (with CM) as "CM request"; a user ID (kimkim) decided in the user registration, as the "user ID"; and a password (***) decided in the user registration as the "password".

When the content creator clicks the reservation button 187 on the live type provision schedule management screen 175, the CPU 10 of the user PC 2 starts a routine RT6 at starting step, and moves on to step SP41 in accordance with the automatic upload software.

In step SP41, the CPU 10 of the user PC 2 logs in to the ASP 32 with the network interface 16 (FIG. 3) over the Internet 5 and through the ISP 31, and obtains authentication based on the user ID, password, etc., by accessing the user information database 37 of the ASP 32, and then it proceeds to next step SP42.

In step SP42, having obtained authentication from the ASP 32, the CPU 10 of the user PC 2 transfers a newly created live type provision schedule control file 189 to the management server 36 of the ASP 32 over the Internet 5, and proceeds to next step SP43.

Then, the management server 36 of the ASP 32 renews the provision schedule management database 38 with the use of the live type provision schedule control file 189 transferred from the user PC 2, and subsequently reads out the live type provision schedule control file 189 again from the provision schedule management database 38, and sends it back to the user PC 2.

At this time, the management server 36 of the ASP 32 charges, corresponding to the user ID, as a service charge, for a reservation fee for newly performing reservation processing to provide the content of live video to the user PC 2, and renews the user information DB table 45 in the user information database 37.

In step SP43, the CPU 10 of the user PC 2 receives the renewed live type provision schedule control file 189 with the provision schedule management database 38 renewed, and displays on the display unit 17 the live type provision schedule management screen 175 again based on the live type provision schedule control file 189 for confirmation, and it proceeds to next step SP44 where the processing is terminated.

Note that the live type provision schedule management screen 175 displayed at this time displays the time schedule frame 183A having the letters "FULL" displayed thereon, in a specific color, for the content creator's confirmation, whereby the content creator can easily recognize the schedule of the content reserved by himself or herself.

By the way, as a result of confirming the reservation state shown in the schedule content display area 180 on the live type provision schedule management screen 175 (FIG. 31) for a public channel, in the case where "FULL" is written in a desired time schedule frame of providing the content of the live video, on the time schedule appoint bar 183 in the schedule time plan table 182, the content of the live video can not be provided on that public channel.

Figures 34, 35:
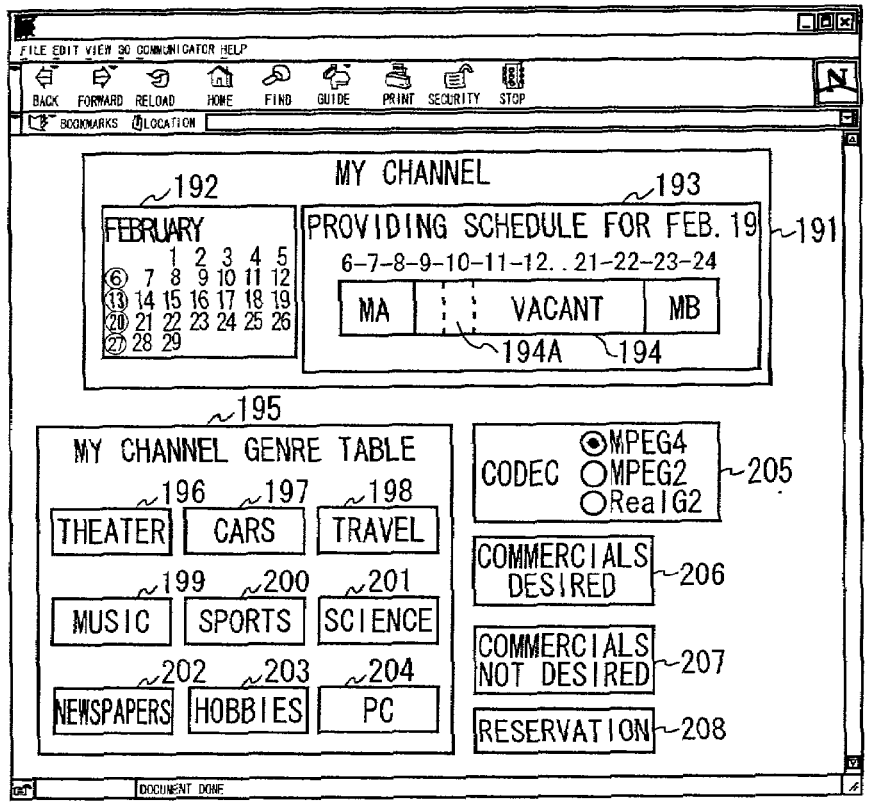
FIG. 34 is a schematic diagram showing a live type provision schedule management screen for my channel.
FIG. 35 is a schematic diagram showing the contents of a live type provision schedule control file for my channel.

When the content creator clicks the my channel button 188 provided at the lower part of the live type provision schedule management screen 175 in this situation, the CPU 10 of the user PC 2 receives an on-demand type schedule control file 120 of the provision schedule management database 38 from the management server 36 of the ASP 32, and displays a live type provision schedule management screen 190 for my channel as shown in FIG. 34 based on the on-demand type provision schedule control file 120.

The live type provision schedule management screen 190 for this my channel is capable of making a reservation for providing the content of a live video utilizing a "vacant" time, other than the reserved time schedule frames (time schedule frames indicated by MA and MB) of providing content in the on-demand type, on the time schedule appoint bar 194, and has a my channel schedule content display area 191, a my channel genre table area 195, a CODEC selection area 205, a CM desired button 206, a CM not desired button 207, and a reservation button 208.

In this case, too, when the content creator clicks a desired reservation date (e.g., February 19) in the calendar display area 192 in the my channel schedule content display area 191, the CPU 10 of the user PC 2 displays the reservation state of a desired reservation date (February 19) for my channel on the schedule time plan table 193 based on the on-demand type provision schedule control file 120.

Accordingly, the content creator can confirm the reservation state displayed on the schedule time plan table 193, and designate a desired starting time (e.g., 10:00) and an ending time (10:59:59) with the cursor in the "vacant" time schedule on the time schedule appoint bar 194, to determine a time schedule frame 194A in which the content of a live video is provided on my channel.

Thereby, the CPU 10 of the user PC 2 recognizes as the reserved time schedule frame data, the starting time and the ending time shown on the time schedule frame 194A determined by the content creator, concurrently displaying the letters "FULL" in the time schedule frame 194A, and stores the reserved time schedule frame data once on the HDD 12.

Next, when the category (music) icon 199 corresponding to the video genre of a live video is clicked out of the category icons 196 to 204 displayed in the my channel genre display area 195, the CPU 10 of the user PC 2 recognizes the category of the selected video genre as "music", records the recognition result once on the HDD 12 as the category data.

At this time, the CPU 10 of the user PC 2 indicates the letters "music" in the time schedule frame 194A on the time schedule appoint bar 194, replacing the letters "FULL".

Subsequently, when a check mark is put on the MPEG4, for example, as a CODEC in providing the client PC 4 with the content of a live video on the CODEC selection display area 205, the CPU 10 of the user PC 2 recognizes the selected CODEC type as MPEG4, and stores the recognition result once on the HDD 12 as the CODEC type data.

Out of the CM desired button 206 to add a CM video to the beginning of the content and provide it to a client PC 4, and the CM undesired button 207 to provide the content without a CM video to a client PC 4, when the content creator clicks the CM desired button 206, the CPU 10 of the user PC 2 also creates CM desired data indicating that a CM video is desired to be affixed to the content of the live video, and stores it once on the HDD 12.

After performing various settings to provide a live video of live music as content on my channel as described above, when the content creator clicks the reservation button 208, the CPU 10 of the user PC 2 creates a new live type provision schedule control file 210 for my channel as shown in FIG. 35, and transfers it to the management server 36 of the ASP 32 over the Internet 5 to register it in the provision schedule management database 38.

By the way, for a plurality of content creators who make a reservation for providing the content of a live video on my channel, the management server 36 of the ASP 32 has a limitation on the number (e.g., up to 10 pieces) of content of live videos which can be provided in the same time schedule frame.

When the management server 36 of the ASP 32 detects based on the providing schedule program read out of the internal hard disk that the number of content has reached the maximum in a time schedule frame desired by a content creator, it does not accept a live type provision schedule control file 210 for my channel which is sent from the user PC 2 thereafter, and reads out image data of a reservation unable message display screen stored in advance in the provision schedule management database 38, and transmits it to the user PC 2 over the Internet 5.

Figures 36, 37:
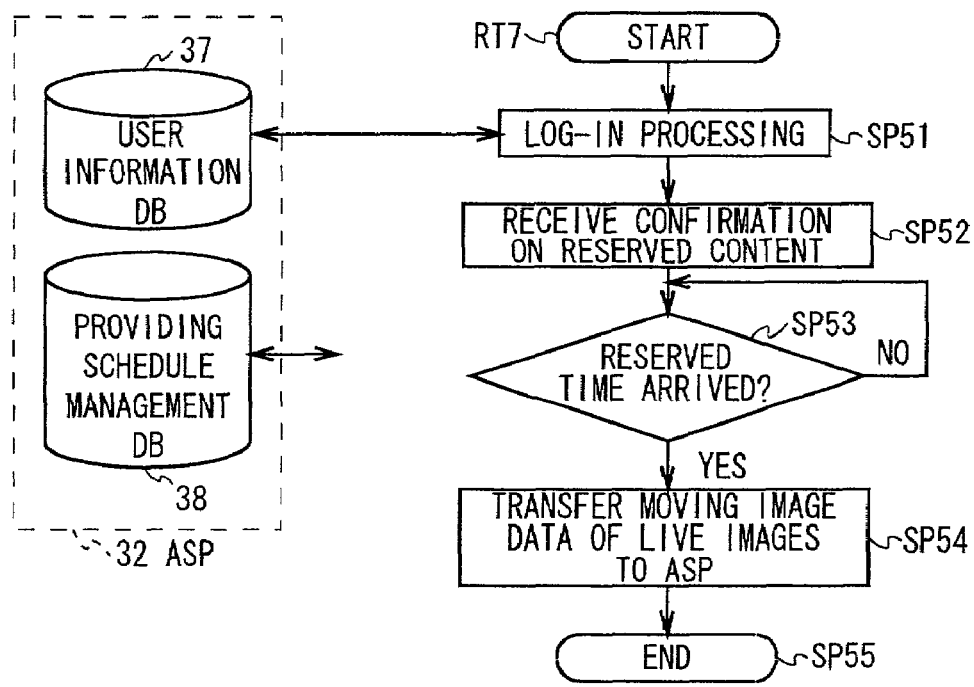
FIG. 36 is a schematic diagram showing a reservation unable message display screen.
FIG. 37 is a flowchart showing a processing procedure of connection to an ASP in the live type.

The CPU 10 of the user PC 2 displays on the display unit 17 a reservation unable message display screen 212 as shown in FIG. 36 based on the image data of the reservation unable message display screen, to notify the content creator of the fact that "the desired time schedule frame is already fully booked, in which to provide the content of a live video in real time".

Therefore, the management server 36 of the ASP 32 can provide the content of a live video to the client PC 4 without fail in the real-time, without a tie-up or delay in providing the content due to possible problems on processing performance and the bandwidth of a line, because the upper limit of the number of content allowed to be provided simultaneously can never be exceeded, thus preventing the quality of the content of a live video from being deteriorated.

As described above, to provide the content of a live video in real time at a desired time on a desired reserved date, the CPU 10 of the user PC 2 can selects any one out of two methods of; providing content on a public channel; and providing content on my channel when all the public channels are already booked.

Accordingly, when the content creator of the user PC 2 wants to provide a live video of his or her amateur band in real time, he or she can select a method to provide it on my channel, or when he or she want to provide a live video of a famous professional artist, he or she can select a method of providing it on a public channel.

As described above, the content providing service system 1 is designed such that either the on-demand type or the live type may be selected as a content providing mode, taking the content or a user who watches and listens to the content into consideration.

(6-2) Connection Processing to ASP in the Live Type

After finishing the date and time reservation processing for providing the content of a live video, the CPU 10 of the user PC 2 next displays the live type personal cast control screen 170 (FIG. 29) on the display unit 17 again.

At this time the content creator recognizes the contents of the reservation for providing the content of the live video by viewing the live type personal cast control screen 170, and then starts recording using the digital video camera 18 (FIG. 3) at the photographing site when the reserved starting time approaches, and clicks the connection button 82 to provide the content of the live video in real time.

Then, the CPU 10 of the user PC 2 starts a routine RT7 shown in FIG. 37 in accordance with the automatic upload software at starting step, and proceeds to step SP51.

In step SP51 the CPU 10 of the user PC 2 logs in to the ASP 32 via the network interface 16, the Internet 5 and ISP 31, and accesses the user information database 37 in the ASP 32 to obtain authentication based on the user ID and password, etc., then moves on to next step SP52.

In step SP52 the CPU 10 of the user PC 2 controls the management server 36 of the ASP 32 to confirm the content of the live type provision schedule control file 189 (FIG. 32) stored in the provision schedule management database 38 based on the user ID and password, and then it moves on to next step SP53.

Thus, the management server 36 of the ASP 32 confirms the contents of the live type provision schedule control file 189 in the provision schedule management database 38, so that the reservation state regarding the content of the live video to be provided can be confirmed using the user PC 2.

In step SP53 the CPU 10 of the user PC 2 is given an instruction command to "Transmit content of live video" from the management server 36 of the ASP 32 at the reserved starting time, to recognize using the instruction command whether the reserved start time has come.

Obtaining a negative result here means that the instruction command has not been given from the management server 36, and the CPU 10 stands by until an instruction command is given from the management server 36 of the ASP 32.

On the other hand, if an affirmative result is obtained in step SP53, which means that the instruction command has been given from the management server 36 of the ASP 32, and the CPU 10 judges that the start time has come, and proceeds to step SP54.

In step SP54 the CPU 10 of the user PC 2 starts a transferring process to transfer the content of the live video being recorded, with the instruction command given from the management server 36 of the ASP 32 as a trigger, to the management server 36 of the ASP 32 in real time over the Internet 5, and terminates the processing in next step SP55.

Thus, the management server 36 of the ASP 32 records the content of the live video transferred from the user PC 2 in the exclusive memory area in the content server 39 assigned to the public channel, and at the same time stream-reproduces it, to provide it to a client PC 4 who made a request, in real time.

Note that, at this time the control server 33 of the ISP 31 charges for the Internet connection charges occurring while the user PC 2 is transferring the content of the live video to the ASP 32 over the Internet 5, in correspondence with the user ID of the user PC 2, and renews the charge data in the charge management database 34.

Meanwhile, the management server 36 of the ASP 32 charges for the service charge of the ASP 32, in correspondence with the user ID of he user PC 2, transmits the charge data to the charge management database 34 via the network interface 41 and the network interface 35 of the ISP 31, to renew the charge data of the charge management database 34.

In this connection, in the case that the user PC 2 has a fixed rate service contract called "as-much-as-you-like course", the management server 36 of the ASP 32 records only the connection date and time from the connection starting date and time till the connection ending date and time with the user information DB table 45 in the user information database 37, and does not perform the charging processing, as the service charge is fixed.

(6-3) Providing Processing of Content in Live Type

Similarly to the case of receiving content in the on-demand type, the client PC 4 can makes the user registration to receive the content of a live video in the live type. In this case, the user registration procedure is to be made in accordance with the user registration processing shown by the routine RT1 (FIG. 8), wherein the management server 36 of the ASP 32 carries out the registration of a viewer information file into the viewer information database 40, in correspondence with the user ID and password of the client PC 4.

When the user registration is not made, the client PC 4 may directly access, as a visitor, the Web site of the personal casting service provided by the ASP 32. The only those clients PC 4 who made the user registration are allowed to make a contribution easily to the content creator of content which they are moved by, sympathize with, or feels excellent.

Figure 38:
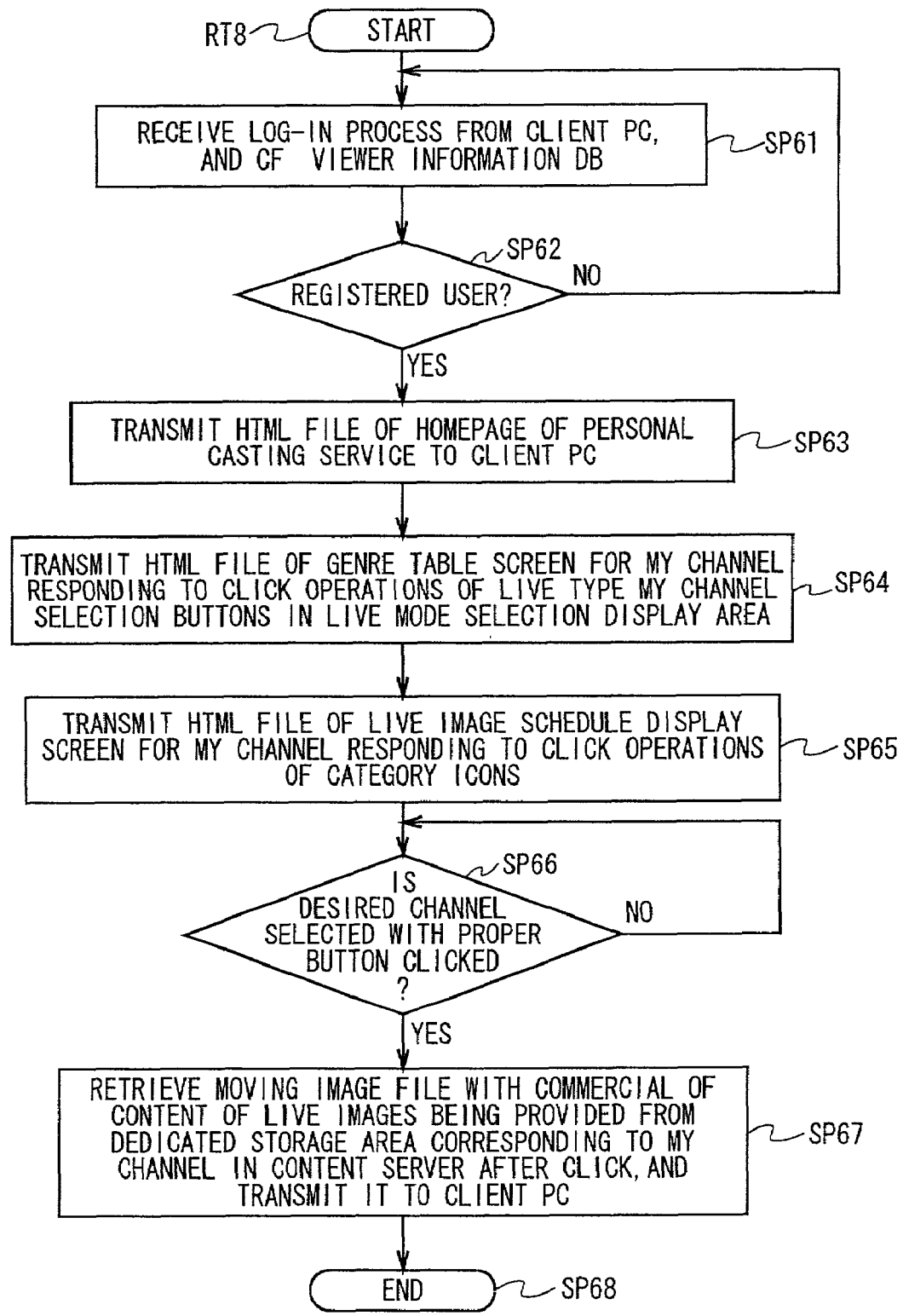
FIG. 38 is a flowchart showing a casting processing procedure conducted using my channel in the live type.

In practice, when the content of a live video is provided to the client PC 4 having conducted the user registration on my channel in the live type for example, the management server 36 of the ASP 32 starts a routine RT8 shown in FIG. 38 at starting step, in accordance with a content providing program read from the internal hard disk, and moves on to step SP61.

In step SP61 the management server 36 of the ASP 32 logged in by the client PC 4 refers the viewer information file in the viewer information database 40 based on the user ID and password transmitted from the client PC 4, and moves on to next step SP62.

In step SP62 the management server 36 of the ASP 32 judges whether the client PC 4 logging in is a registered regular user, in reference with the viewer information file in the viewer information database 40 based on the user ID and password.

A negative result here, if obtained, indicates that the user ID and password do not match those registered in the viewer information database 40, and then the management server 36 of the ASP 32 returns to step SP61, to prompting the client PC4 to reenter the correct user ID and password so as to perform the login processing.

If an affirmative result is obtained in step SP62, which means that the client PC 4 is a registered regular user, and the management server 36 of the ASP 32 proceeds to next step SP63.

In step SP63 the management server 36 of the ASP 32 reads out the HTML file of the homepage of the personal casting service from the content server 39 in response to the access by the client PC 4, and transfers it to the client PC 4 via the network interface 41 over the Internet 5.

At this stage the client PC 4 receives at its CPU the HTML file of the homepage of the personal casting service transmitted from the ASP 32, and displays it on the display unit as a homepage screen 125 (FIG. 25).

When the user clicks the live type my channel selection button 130 in the live mode selection display area 128 on this homepage screen 125, the CPU of the client PC 4 transmits a mode selection signal indicating the selection of the live type my channel selection button 130 to the management server 36 of the ASP 32 over the Internet 5.

In step SP64 the management server 36 of the ASP 32 reads out the HTML file forming a genre display screen for my channel from the content server 39 based on the mode selection signal transmitted from the client PC 4, and transmits it from its network interface 41 to the client PC 4 over the Internet 5.

Thus, the CPU of the client PC 4 receives the HTML file of the genre display screen for my channel transmitted from the ASP 32, and displays it on the display unit as a genre display screen 135 (FIG. 26) for my channel.

When the user of the client PC 4 clicks any one (e.g., the "music" category icon 139) of the category icons 136 to 144 on this genre display screen 135 for my channel, the CPU of the client PC 4 transmits a genre selection signal corresponding to the "music" category icon 139 to the management server 36 of the ASP 32 over the Internet 5.

In step SP65 the management server 36 of the ASP 32 retrieves the HTML file forming the live video schedule display screen regarding the image category "music" from the content server 39 based on the genre selection signal transferred form the client PC 4, and transmits it from its network interface 41 to the client PC 4 over the Internet 5.

Figure 39:
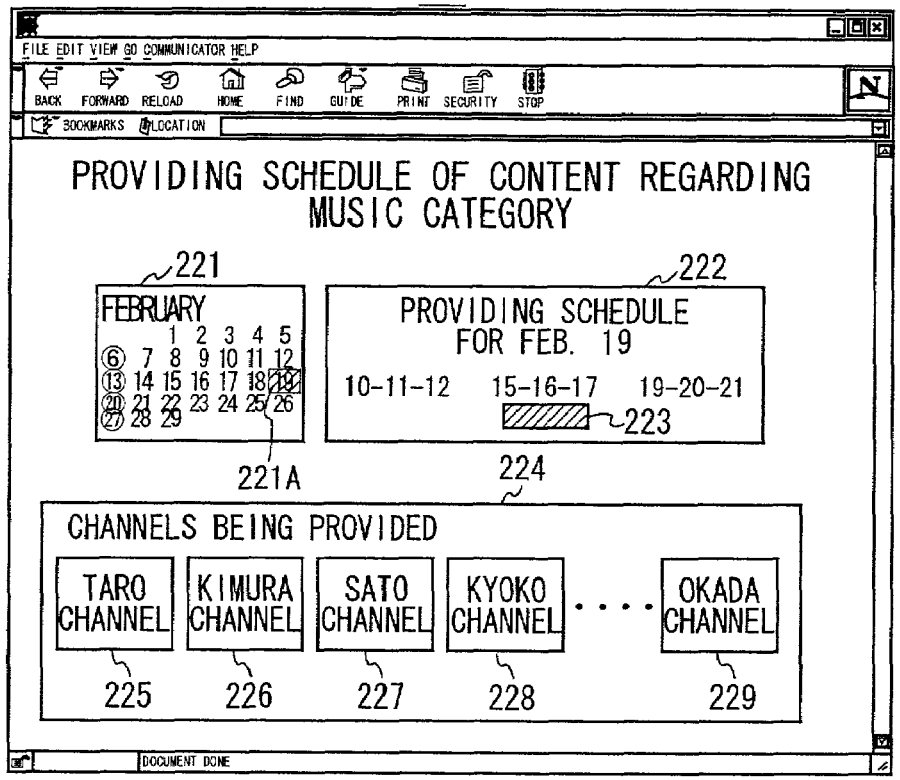
FIG. 39 is a schematic diagram showing a live video schedule display screen for my channel.

Thus, the CPU of the client PC 4 receives the HTML file forming the live video schedule display screen transferred from the ASP 32, and displays it on the display unit as a live video schedule display screen 220 for my channel as shown in FIG. 39.

The live video schedule display screen 220 for my channel has a calendar display area 221 showing dates, a schedule content display area 222 showing a providing schedule to provide the content of a live video on my channel, and a channel type display area 224 showing the channel name currently being provided on my channel.

The present date (e.g., February 19) is displayed in a shaded frame 221A on the calendar display area 221, so that the user of the client PC 4 can easily acknowledge the present date.

The schedule content display area 222 has a time schedule frame (e.g., a period from 15:00 to 16:59:59) for the content of live videos that the ASP 32 can provide at the present time (e.g., 15:10), and it shows the content of the live videos which can be provided at the present time on my channels corresponding to plural types (up to 10 Ch) of channel buttons 225 to 229 displayed in the channel type display area 224.

In step SP66 the management server 36 of the ASP 32 judges whether a desired channel button ("Kimura" channel)

226, for example, is selected by the user of the client PC 4 watching the live video schedule display screen 220 for my channel.

In this case, the CPU of the client PC 4 recognizes a URL set corresponding to the selected channel button 226, and a channel selection signal indicating the URL is transmitted to the management server 36 of the ASP 32 over the Internet 5, so that the management server 36 of the ASP 32 can recognize that the desired channel button 226 was clicked when the channel selection signal was received.

A negative result at this step SP66, if obtained, indicates that none of the channel buttons 225 to 229 displayed in the channel type display area 224 on the live video schedule display screen 220 is selected, and then the management server 36 of the ASP 32 stands by until any one of the channel buttons 225 to 229 is selected.

If an affirmative result is obtained in step SP66, on the other hand, it means that a user-desired channel button 226 has been clicked for selection out of the channel buttons 225 to 229, and then the management server 36 of the ASP 32 proceeds to next step SP67.

In step SP67 the management server 36 of the ASP 32 stream-reproduces motion picture data with CM of a live video to be provided at the time of clicking from the dedicated memory area (corresponding to the "Kimura" channel) in the content server 39, and transmits it to the client PC 4 over the Internet 5, and it proceeds to next step SP68 where the processing is terminated.

Figure 40:
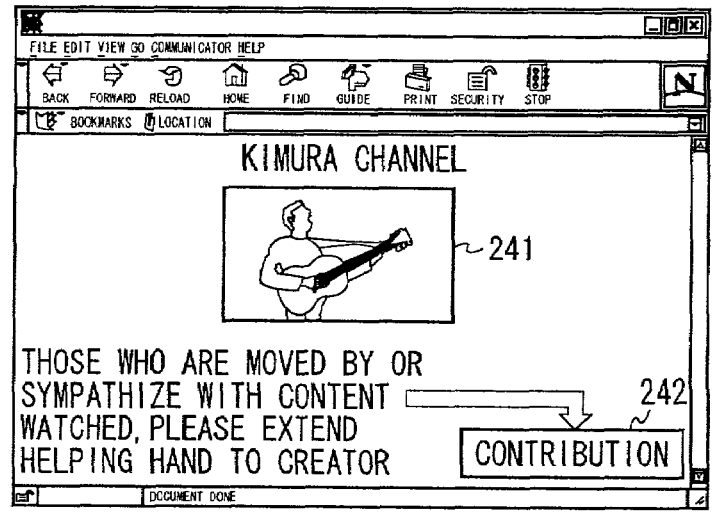
FIG. 40 is a schematic diagram showing a content display screen showing contents of a live video corresponding to a selected channel button.

Thus, the CPU of the client PC 4 displays the content display screen 240 of the live video as shown in FIG. 40 on the display unit based on the motion picture data with CM of the content transferred from the ASP 32, in which the CM video is firstly displayed in a motion picture display area 241 located in the center of the content display screen 240 followed by a motion picture showing the live music.

The content of the live video is transmitted to the client PC 4, therefore the management server 36 of the ASP 32 can not provide the content from the beginning unlike the on-demand type, so that the content of the live video starts to be reproduced by streaming at the moment of the clicking.

Even in this case, however, when the CM providing request is set to "with CM" by the content creator of the user PC 2, the management server 36 of the ASP 32 transmits the CM video to the client PC 4 without fail before providing the content of the live video.

Accordingly, the client PC 4 can not watch and listen to the content of the live video immediately after clicking the user-desired channel button 226, but the content of the live video can be watched and listened to only after reproducing the CM video first.

In this way, even when providing the content of the live video to the client PC 4, the management server 36 of the ASP 32 is designed to force the user of the client PC 4 to watch and listen to the CM video regardless of the user's will.

At this time the control server 33 of the ISP 31 charges for the Internet connection charge occurring while the user PC 2 is transmitting the motion picture data of the content of the live video to the ASP 32 over the Internet 5, in correspondence with the user ID of the user PC 2, resulting in the renewal of the charge data in the charge management database 34.

At the same time while the motion picture data of the content of the live video to be supplied from the user PC 2 over the Internet 5 is reproduced by streaming through the content server 39, the management server 36 of the ASP charges for the service charge in correspondence with the user ID of the user PC 2, registers the charge data in the user information DB table 45 in the user information database 37, and simultaneously records it in the charge management database 34 via the network interface 41 and the network interface 35 of the ISP 31.

In the case that the user PC 2 has a fixed rate service contract called "as-much-as-you-like course," the management server 36 of the ASP 32 records only the connection period from the connection starting date and time till the connection ending date and time in the user information DB table 45 in the user information database 37, and does not charge for anything, as the service charge is fixed.

Figure 41:
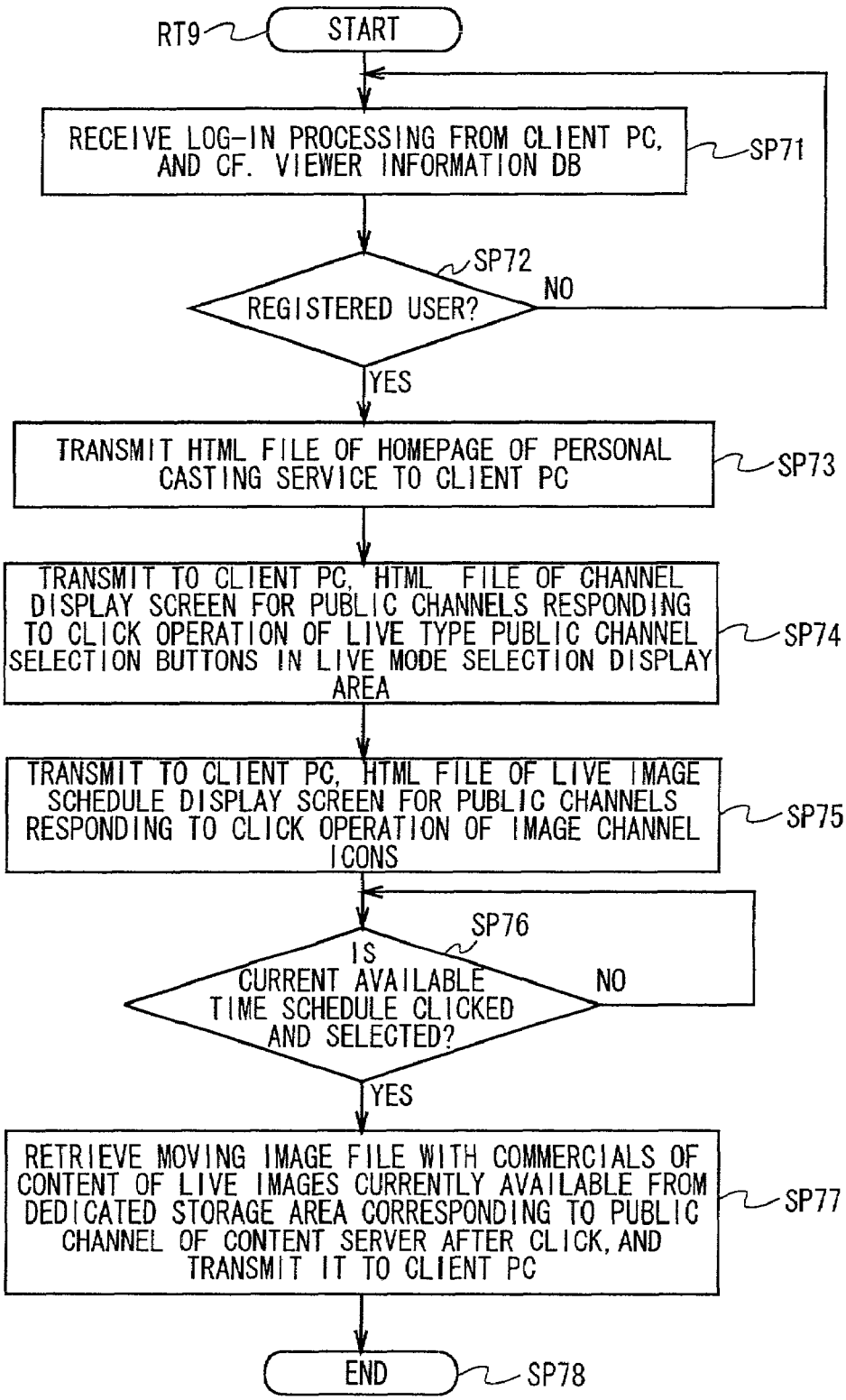
FIG. 41 is a flowchart showing a casting processing procedure conducted using a public channel in the live type.

On the other hand, when the content of a live video is provided to a user-registered client PC 4 on a public channel for example, the management server 36 of the ASP 32 enters into a routine RT9 shown in FIG. 41 at the starting step, proceeding to step SP71, in accordance with a content providing program read from the internal hard disk.

Steps SP71 to SP73 is similar to steps SP61 to SP63 of the routine RT8 where the content of the live video is provided on my channel, wherein the management server 36 of the ASP 32 transfers the HTML file of the homepage of the personal casting service to the client PC 4 via the network interface 41 over the Internet 5.

Thus, the client PC 4 receives the HTML file of the personal casting service transmitted from the ASP 32, and displays it on the display unit 17 as the homepage screen 125 (FIG. 25).

When the user clicks the live type public channel selection button 129 in the live mode selection display area 128 on this homepage screen 125, the CPU of the client PC 4 transmits a mode selection signal indicating the live type public channel selection button 129 to the management server 36 of the ASP 32 over the Internet 5.

In step SP74 the management server 36 of the ASP 32 reads out the HTML forming the channel display screen for public channels from the content server 39 in response to the mode selection signal transmitted from the client PC 4, and transmits it to the client PC 4 from its network interface 41 over the Internet 5.

Figure 42:
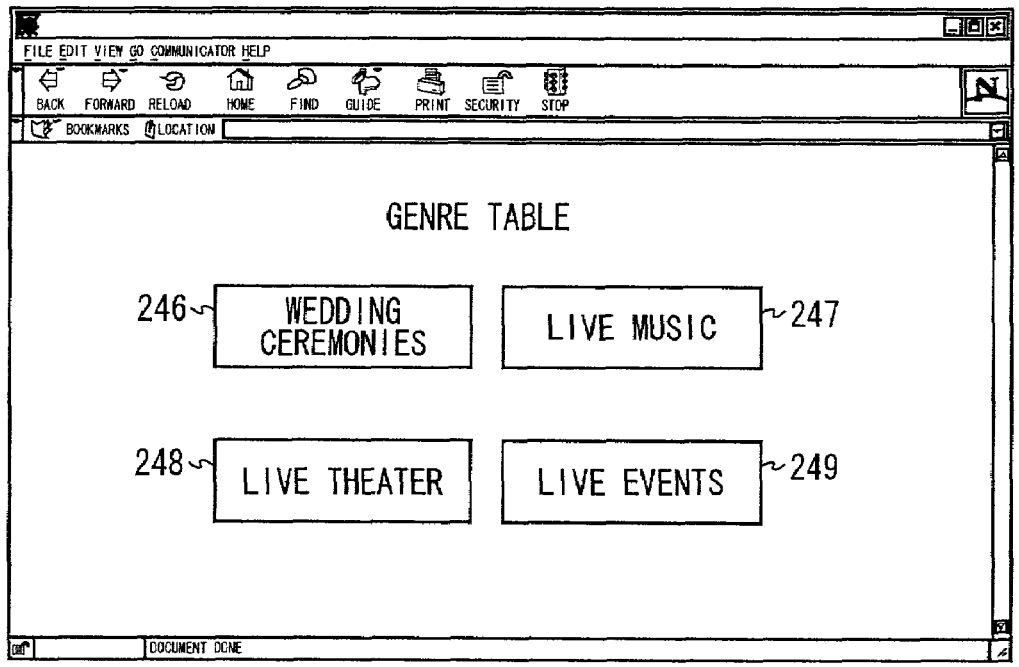
FIG. 42 is a schematic diagram showing a channel display screen for public channels.

Thus, the CPU of the client PC 4 receives the HTML file of the channel display screen for the public channel transferred from the ASP 32, and displays it on the display unit as a channel display screen 245 for the public channels as shown in FIG. 42.

When the user of the client PC 4 clicks any one (e.g., the "live music" channel icon 247) out of video channel icons 246 to 249 on this channel display screen for the public channels 245, the CPU of the client PC 4 transmits a channel selection signal corresponding to the "live music" channel icon 2347 to the management server 36 of the ASP 32 over the Internet 5.

In step SP75 the management server 36 of the ASP 32 retrieves the HTML file forming the live video schedule display screen for the public channels regarding the "live music" channel from the content server 39 based on the channel selection signal transferred form the client PC 4, and transmits it from its network interface 41 to the client PC 4 over the Internet 5.

Figure 43:
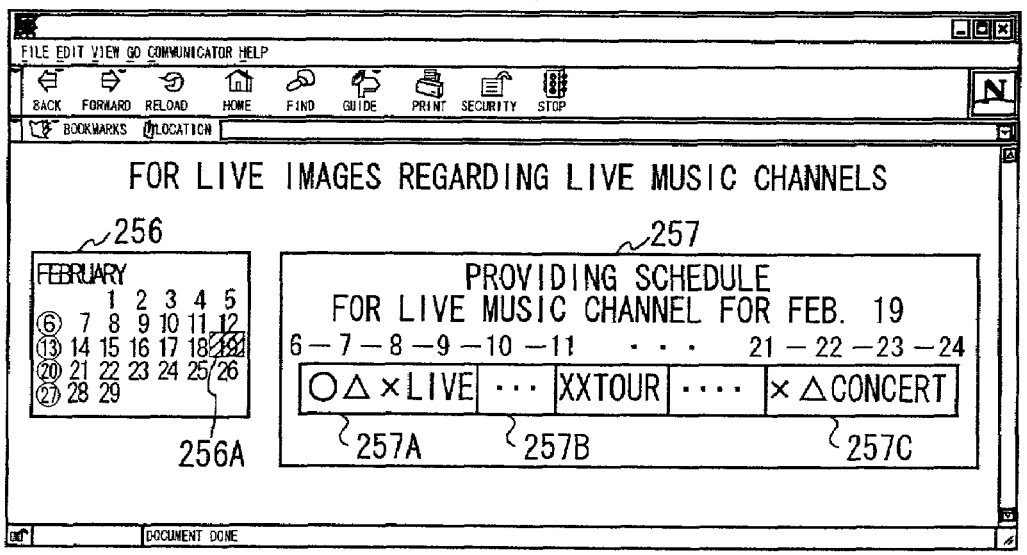
FIG. 43 is a schematic diagram showing a live video schedule display screen for public channels.

Thus, the PC 4 receives the HTML file forming the live video schedule display screen for the public channels transferred from the ASP 32, and displays it on the display unit as the live video schedule display screen 255 for public channels 255 as shown in FIG. 43.

The live video schedule display screen for the public channels 255 has a calendar display area 256 showing dates, and a schedule content display area 257 showing a providing schedule for providing the content of the live video regarding the selected "live music" channel.

This calendar display area 256 shows the present date (e.g., February 19) is displayed in a shaded frame 256A, so that the user of the client PC 4 can easily recognize the present date.

In addition, the schedule content display area 257 shows the titles of the content of live videos to be provided by the ASP 32 on February 19. In this case, it means the content of "○Δ live" is to be provided in a first time schedule frame 257A from 6:00:00 to 8:59:59, the content of "xx tour" in a second time schedule frame 257B from 10:00:00 to 10:59:59, and the content of "×Δ concert" in a third time schedule frame from 21:00:00 to 23:59:59.

Further, for example, at the present time (e.g., 10:09), the live video schedule display screen 255 for the public channels shows the second time schedule frame 257B including the present time in a different color from the first time schedule frame 257A and the third time schedule frame 257C in the schedule content display area 257, so that the user of the client PC 4 can easily recognize that the content of "xx tour" can be watched and listened in real time at the moment.

In step SP76 the management server 36 of the ASP 32 judges whether the second time schedule frame 257B available at the moment (e.g., 10:09) is clicked for selection by the user of the client PC 4 watching the live video schedule display screen 255 for the public channels.

In this case, the CPU of the client PC 4 recognizes a URL set corresponding to the "live music" channel of the public channels when the second time schedule frame 257B is selected, and a channel selection signal indicating the URL is transmitted to the management server 36 of the ASP 32 over the Internet 5, so that the management server 36 of the ASP 32 recognizes that the second time schedule frame 257B was selected when the channel selection signal is received.

A negative result in this step SP76, if obtained, indicates that the second time schedule frame 257B available at the present time on the schedule content display area 257 is not selected, and then the management server 36 of the ASP 32 stands by until the second time schedule frame 257B is selected.

If an affirmative result is obtained in step SP76, on the other hand, it means that the second time schedule frame 257B has been selected on the schedule content display area 257, and then the management server 36 of the ASP 32 proceeds to next step SP77.

In step SP77 the management server 36 of the ASP 32 starts to reproduce by streaming the motion picture data ("xx tour") with CM of a live video to be provided on the "live music" channel at the time of clicking, from the dedicated memory area corresponding to the "live music" channel in the content server 39, and transmits it to the client PC 4 over the Internet 5, and it proceeds to next step SP78 where the processing is terminated.

Figures 44, 45:
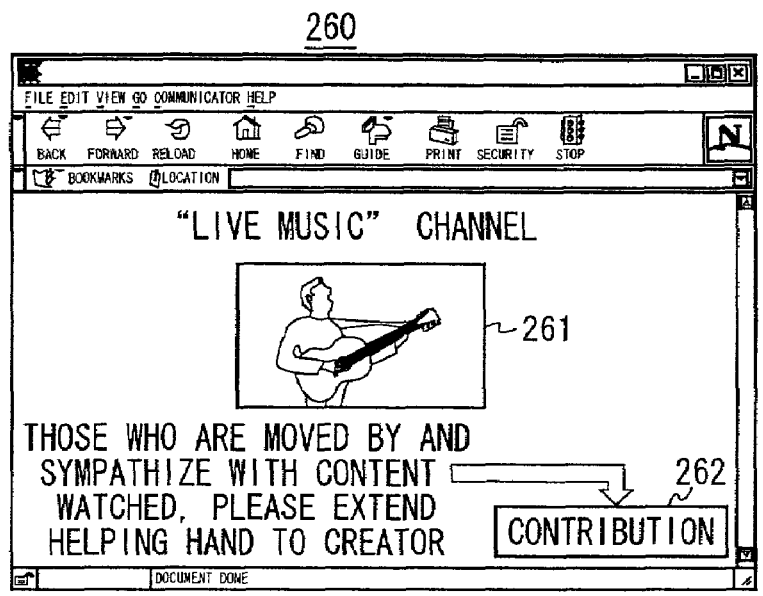
FIG. 44 is a schematic diagram showing a content display screen having contents of a live video selected on the live music channel displayed thereon.
FIG. 45 is a schematic diagram showing a contribution amount selection screen.

Thus, the CPU of the client PC 4 displays a content display screen 260 of the live video as shown in FIG. 44 on the display unit based on the motion picture data with CM ("xx tour") of the live video transferred from the ASP 32, and displays the live video ("xx tour") corresponding to the second time schedule frame 257B selected on the "live music" channel in the movie display area 261 located in the center of the content display screen 260.

In this case, too, the content of the live video starts to be provided, reproduced by streaming, at the moment of clicking the second time schedule frame 257B, and when the CM provision request of the content is set to "with CM", the CM video is first provided to the client PC 4 from the moment of the clicking, followed by the content of the live video.

Thus, the management server 36 of the ASP 32 is to force the user of the client PC 4 to watch and listen to the CM video regardless of his or her will even when providing the content of the live video to the client PC 4 on a public channel.

At this time while the user PC 2 transmits the motion picture data of the content of the live video to the ASP 32 over the Internet 5, the control server 33 of the ISP 31 charges for the Internet connection charge in correspondence with the user ID of the user PC 2, and renews the charge data of the charge management database 34.

At the same time while the motion picture data of the content of the live video to be supplied from the user PC 2 over the Internet 5 is reproduced by streaming through the content server 39, the management server 36 of the ASP charges for the service charge in correspondence with the user ID of the user PC 2, registers the charge data in the user information DB table 45 in the user information database 37, and simultaneously records it in the charge management database 34 via the network interface 41 and the network interface 35 of the ISP 31.

However, in the case that the user PC 2 has a fixed rate service contract called "as-much-as-you-like course, the management server 36 of the ASP 32 records only the connection time from the connection starting date and time till the connection ending date and time with the user information DB table 45 in the user information database 37, and does not charge for anything, as the service charge is fixed.

(7) Contribution Processing by Client PC

The user of the client PC 4 is allowed to make a contribution easily to a content creator if he or she is moved by or sympathizes with content provided, or if he or she feels that a content is excellent.

When a user viewing content clicks a contribution button 167, 242, or 262 placed respectively on the content display screen 165 (FIG. 28) of the on-demand type displayed on the display unit based on a motion picture file with CM of the content downloaded from the ASP32, or on the content display screen 240 (FIG. 40) or content display screen 260 (FIG. 44) in the live type displayed based on a motion picture with CM of a content of a live video on the display unit, the CPU of the client PC 4 has a contribution amount selection screen 270 as shown in FIG. 45 displayed next to the contribution buttons 167, 242, and 262 in accordance with a contribution program read out from the internal hard disk (not shown in figure).

On this contribution amount selection screen 270 has contribution selection buttons 271 to 276 corresponding to the various amounts of contributions, and the user of the client PC 4 can click a desired contribution selection button out of the contribution amount buttons 271 to 276 freely corresponding to an amount he or she wants to contribute.

Accordingly, when the user clicks the contribution selection button 272 to make a contribution of ¥1,000 for example, the CPU of the client PC 4 creates contribution data of the amount corresponding to the selected contribution selection button 272, and transmits it to the management server 36 of the ASP 32 over the Internet 5.

The management server 36 of the ASP 32 converts the contribution data transmitted from the client PC 4 into points on a basis of a given conversion rate, and retrieves a user information DB table 45 corresponding to the content ID from the user information database 37, to renew the accumulated number of points on the user information DB table 45 by adding the points equivalent to the contribution data.

The CPU of the client PC 4 creates charge data corresponding to the contribution data, and transmits it to the management server 36 of the ASP 32 over the Internet 5. Thus, the management server 36 of the ASP 32 records the charge data for the contribution amount in a viewer information file in the viewer information database 40, together with the service charge for the ASP32 the client PC 4 used.

At the same time the ISP 31, too, charges for the Internet connection charge while the client PC 4 receives content from the ASP 31 over the Internet 5, and records the amount data in the viewer information file in the viewer information database 40 as well as in the amount management database 34.

Meantime, in the case where a visitor other than registered users makes a contribution to the content creator, when the visitor clicks the contribution buttons 167, 242, or 262, the CPU of the client PC 4 displays a contribution amount selection screen 270 (FIG. 45) next to the contribution buttons 167, 242, or 262 and also displays an input screen (not shown) for a credit card number and other information, with which the visitor makes a contribution, to let the visitor to enter a credit card number.

Consequently, the CPU of the client PC 4 transmits the credit card number data and the contribution data of an amount corresponding to a contribution selection button to the management server 36 of the ASP 32 over the Internet 5, and renews the number of accumulated points on the user information DB table 45 by adding the points corresponding to the contribution data.

The management server 36 of the ASP 32 transmits the contribution data equivalent to the amount the visitor contributes to the charge management database of a credit card company based on the credit card number data, to request the credit card company to perform charge processing for the contribution by the visitor.

Figure 46:
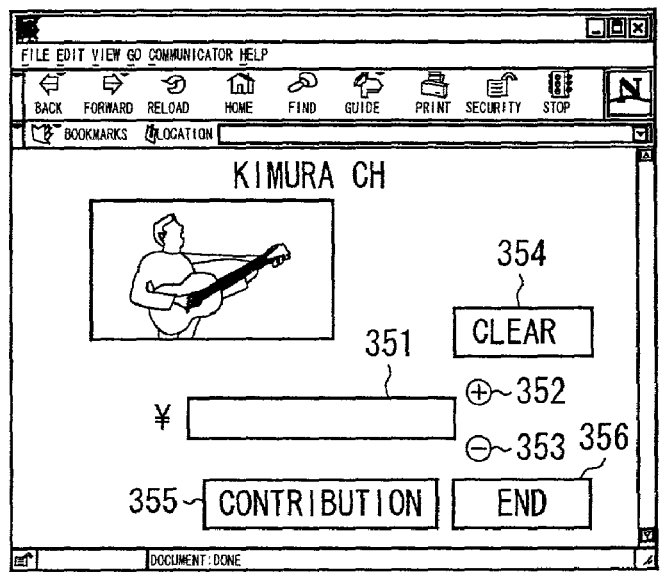
FIG. 46 is a schematic diagram showing a content display screen on which a contribution amount can be directly inputted.

Note that, in addition to the above-described contribution processing, in the case where the CPU of the client PC4 displays the content display screen 350 shown in FIG. 46, for example, as content provided by the content server 39 of the ASP on the display unit, the user can enter a desired amount of contribution in the contribution amount input area 351 on the content display screen 350, and also can change the contribution amount of the contribution amount inputting area 351 higher or lower on a fixed minimum amount basis by clicking the up-button 352 or the down-button 353 provided next to the contribution amount inputting area 351.

This content display screen 350 is capable of entering the amount more than a fixed minimum amount in the contribution amount input area 351, and this fixed minimum amount is a minimum value (¥100 if one point is equivalent to ¥100) which can be converted into points for point returning to a content creator.

Therefore, if the user wants to change the amount after the user directly enter it in the contribution amount input area 351, he or she can change the contribution amount on a fixed minimum amount basis by only clicking the up-button 352 or the down-button 353. In addition, when the user wants to reenter the contribution amount from the beginning, he or she clears the entered amount in the contribution amount input area 351 by just clicking the clear button 354.

Figure 47:
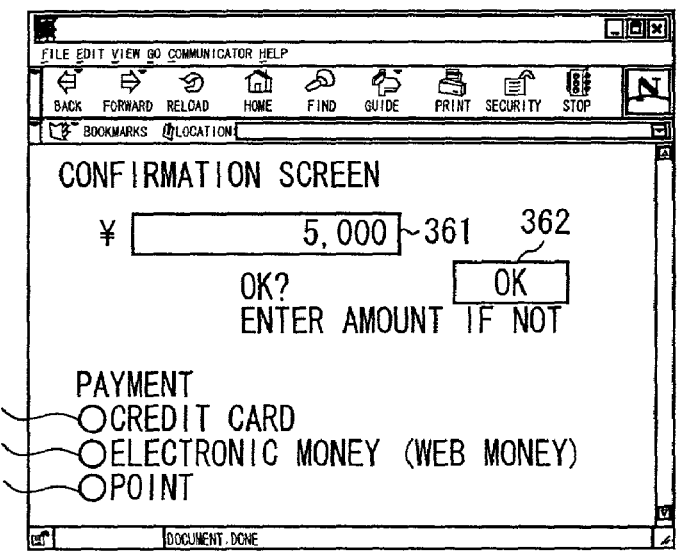
FIG. 47 is a schematic diagram showing a contribution confirmation screen.

Then, when the user clicks the contribution button 355, the CPU of the client PC 4 displays the contribution confirmation screen 360 as shown in FIG. 47, in place of the content display screen 350.

In this connection, when the user clicks the finish button 356, the CPU of the client PC 4 determines that the user does not make a contribution and compulsory clears the content display screen 350.

The contribution confirmation screen 360 shows the contribution amount which has been entered in the contribution amount inputting area 351 on the content display screen 350, in the amount confirmation area 361, and if the user wants to change the amount, he or she can directly enter the desired amount in the amount confirmation area 361.

Further, on the contribution confirmation screen 360, the user can select how to pay the contribution amount by selecting any one out of a check box for credit card 363, a check box for electronic money 364, and a check box for point 365. When the user is a registered user on the personal casting service and has points, he or she can make a contribution using the points.

Figure 48:
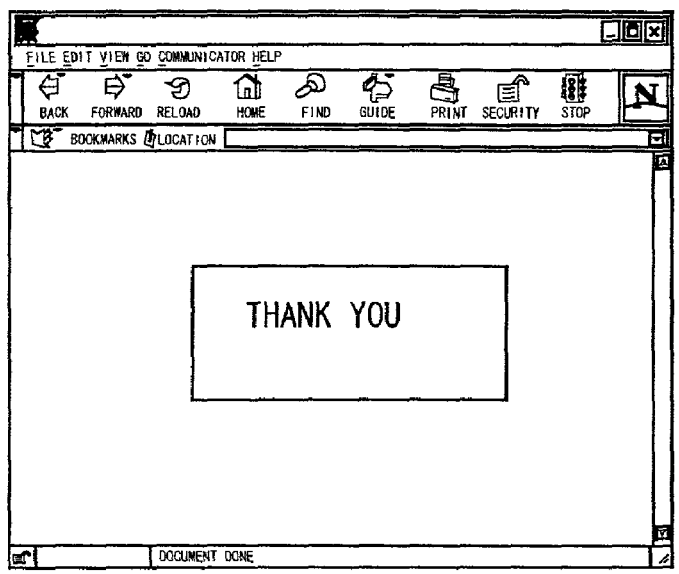
FIG. 48 is a schematic diagram showing a contribution processing finish screen.

When the user clicks the OK button 362 after determining the contribution amount and payment method on the contribution confirmation screen 360, the CPU of the client PC 4 judges using the management server 36 of the ASP 32 whether he or she is a registered user, if he or she is a registered user, the CPU of the client PC 4 displays the contribution processing finish screen 370 as shown in FIG. 48 by just one-clicking the OK button 362, and terminates the contribution processing by the registered user.

Figure 49:
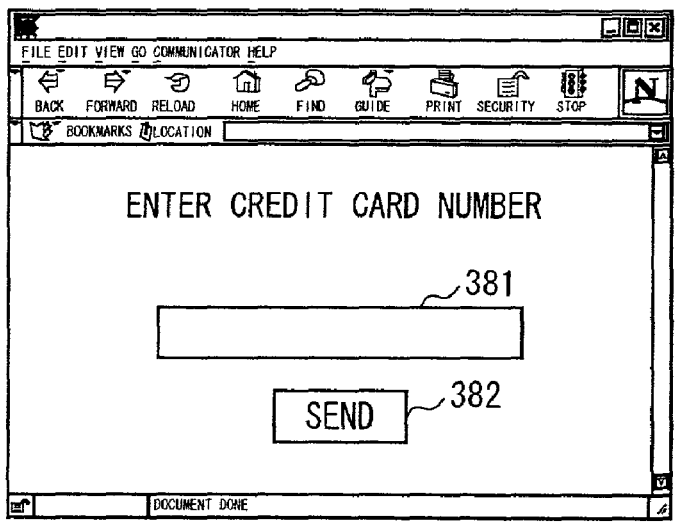
FIG. 49 is a schematic diagram showing a credit card number input screen.

In addition, if the CPU of the client PC 4 recognizes that he or she is not a registered user as a result of judging by means of the management server 36 of the ASP 32 whether he or she is a registered user, it displays the credit card number inputting screen 380 as shown in FIG. 49 to let the user enter the credit card number in the credit card number input area 381 and transmits the credit card number and the contribution data equivalent to the contribution amount to the management server 36 of the ASP 32 by just one-clicking the transmission button 382, so that a unregistered user can make a contribution.

After that, when the CPU of the client PC 4 confirms that transmission is made without fail, via the management server 36 of the ASP 32, displays the contribution processing finish screen 370 (FIG. 48) and terminates the contribution processing by a unregistered user.

(8) Monthly Point Settlement Processing

Figure 50:
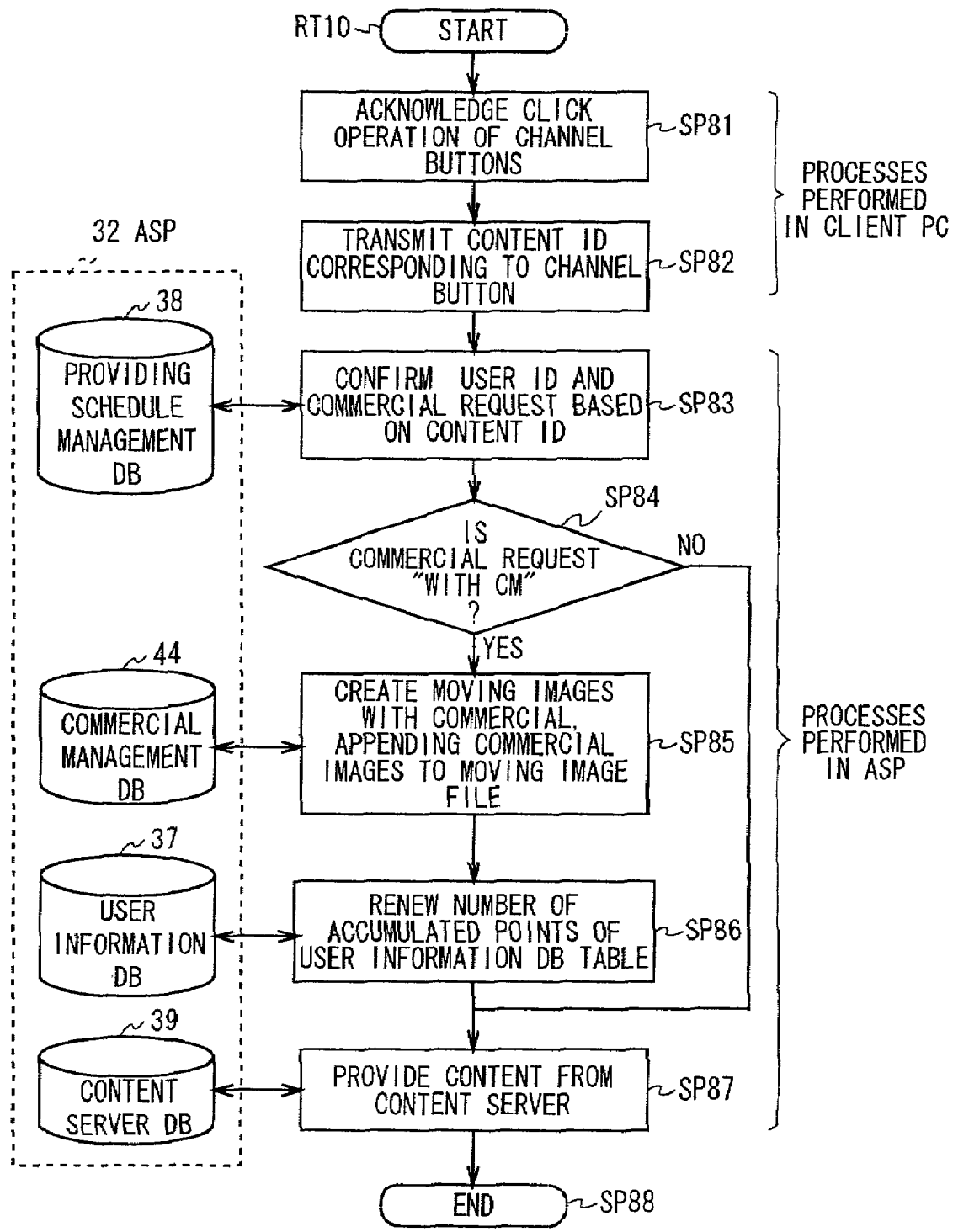
FIG. 50 is a flowchart showing the providing processing procedure of content with CM video.

Lastly, explanation will be given on the monthly points settlement processing by which profit returning is made to a content creator, according to the accumulated points in the user information DB table 45 calculated every month. But before this explanation, the providing process procedure of content with CM video to be provided to a client PC 4 will be explained, starting a routine RT10 shown in FIG. 50 with starting step, and it moves on to step SP81.

In step SP81 the CPU of a client PC 4 recognizes that a desired channel button 155 has been clicked by a user on the channel display screen 150 (FIG. 27), and then it proceeds to next step SP82.

In step SP82 the CPU of the client PC 4 transmits a content ID corresponding to the selected channel button 155 to the management server 36 of the ASP 32 over the Internet 5, and it proceeds to next step SP83.

In step SP83 the management server 36 of the ASP 32 starts a content providing program read out from the internal hard disk, and retrieves the on-demand type schedule control file 120 from the provision schedule management database 38 based on the content ID transmitted from the client PC 4 for example, and after confirming the user ID and the contents of a CM request, it moves on next step SP84.

In step SP84, after confirming the on-demand type provision schedule control file 120, the management server 36 of the ASP 32 judges whether the CM request is set to "with CM".

A negative results, if obtained, means that the CM request is "without CM" and the content without CM video is provided to the client PC 4. At this time, the management server 36 of the ASP 32 proceeds to step SP87 to provide the motion picture file of the content without CM video, and terminates the processing in next step SP88.

On the contrary, if an affirmative result is obtained in step SP84, it means that the CM request is set to "with CM" and the content with CM video is provided to the client PC 4, and then the management server 36 of the ASP 32 proceeds to next step SP85.

In step SP85 the management server 36 of the ASP 32 creates the content of a motion picture file with CM by adding a CM video stored in the CM management database 44 to the beginning of the motion picture file stored in the content server 39, and once stores it in the content server 39, and then moves on to next step SP86.

In step SP86 the management server 36 of the ASP 32 renews the accumulated points on the user information DB table file 45 in the user information database 37 by adding the points occurred when the content of the motion picture file with CM is provided to the client PC 4, and proceeds to next step SP87.

In step SP87 the management server 36 of the ASP 32 reads out the content of a motion picture file with CM from the content server 39 when the CM request is "with CM", provides it to the client PC 4 over the Internet 5, and proceeds to next step SP88 where the processing is terminated.

In the content providing system 1, when the management server 36 of the ASP 32 reads out the content of the motion picture file with CM from the content server 39 with the CM request set to "with CM" and provides it to the client PC 4 as described above, points are generated, and the accumulated points on the user information DB table 45 is renewed accordingly.

Figure 51:
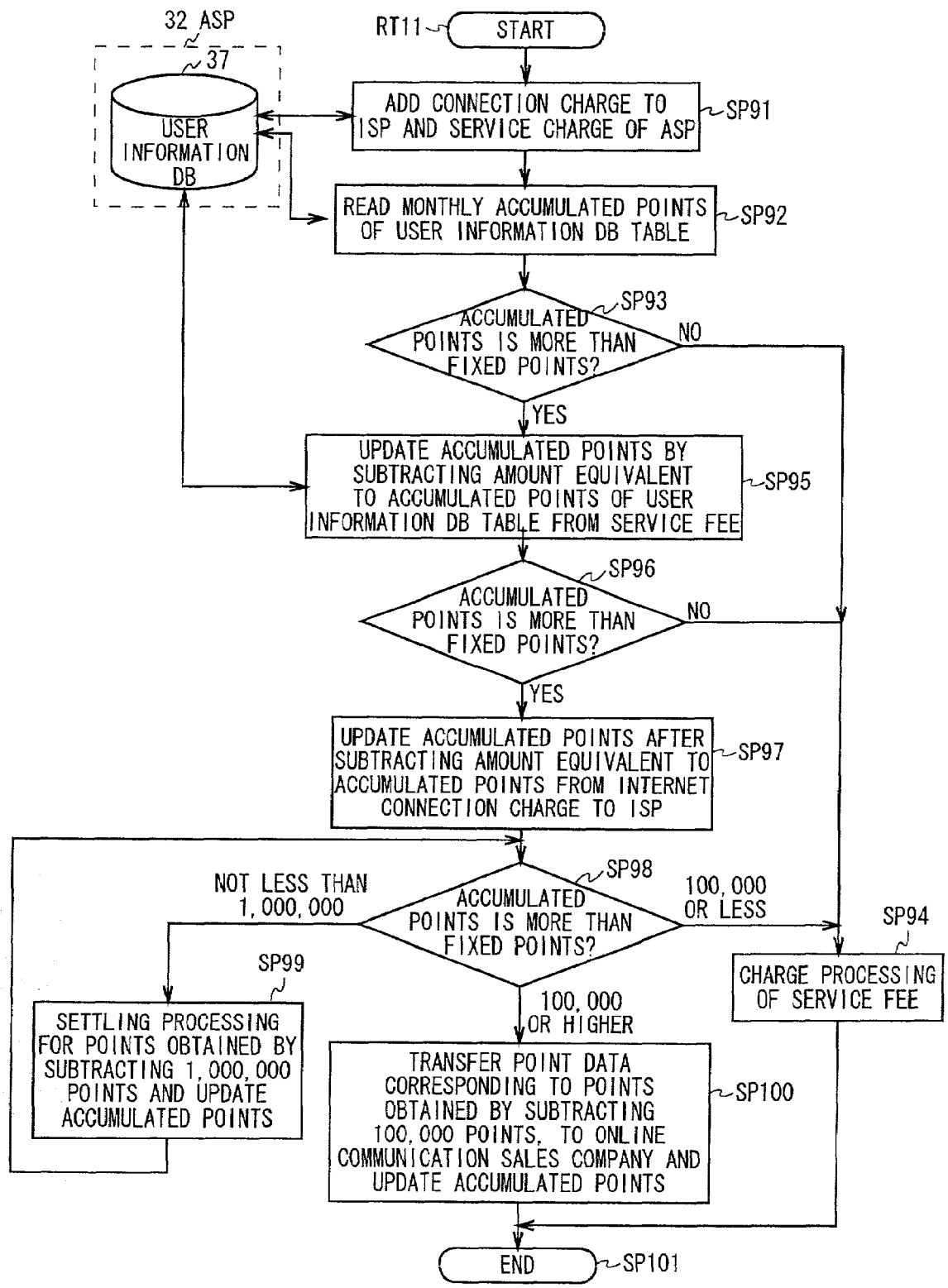
FIG. 51 is a flowchart showing a profit returning processing procedure.

Next, in the content providing system 1, the monthly points settlement processing procedure will be explained for the case of performing profit returning processing to a content creator, according to the accumulated points on the user information DB table 45 calculated every month. A routine RT11 shown in FIG. 51 starts in the starting step, and it proceeds to step SP91.

In step SP91 the management server 36 of the ASP 32 renews the user information DB table 45 by adding the Internet connection charge to the ISP 31 and the service charge of the ASP 32 by the user PC 2 (when the "as-much-as-you-like course" is set, the service use charge remains fixed), in accordance with the profit returning program read out of the internal hard disk, and proceeds to next step SP92.

In step SP92 the management server 36 of the ASP 32 reads out the accumulated points on a monthly basis, referring to the user information DB table 45 stored in the user information database 37, and proceeds to next step SP93.

In step SP93 the management server 36 of the ASP 32 judges whether the accumulated points left over is higher than given points.

A negative result here, if obtained, means that the accumulated points left over is less than given points, then the management server 36 of the ASP 32 moves on to next step SP94.

In step SP94, since the accumulated points left over is less than given points, the management server 36 of the ASP 32 performs billing processing of the service charge at the present time to a user PC 2 without conducting the profit returning processing according to the accumulated points, and proceeds to next step SP101 where the processing is terminated.

Whereas, if an affirmative result is obtained in step SP93, it means that the monthly accumulated points left over is higher than the given points, and then the management server 36 of the ASP 32 proceeds to next step SP95 to perform the profit returning processing according to the accumulated points.

In step SP95 the management server 36 of the ASP 32 subtracts the amount equivalent to the accumulated points in the user information DB table 45 from the amount of the service charge of the ASP 32, and renews the user information AB table 45 by subtracting the subtracted points for service charge from the accumulated points on the user information DB table 45, and then proceeds to next step SP96.

Thus, the service charge charged via a credit card company from the APS32 is subtracted or set off, so the content creator of a user PC 2 is to receive profit returning according to the accumulated points.

In step SP96 the management server 36 of the ASP 32 judges whether the accumulated points left over is higher than the given points after the profit is given back by being subtracted from the service charge of the ASP32.

A negative result here, if obtained, means that the accumulated points left over is less than the given points, then the management server 36 of the ASP 32 moves on to next step SP94 to perform the billing processing for the service charge, and terminates the processing in next step SP101.

On the other hand, if an affirmative result is obtained in step SP96, it means that the accumulated points left over is higher than the given points, then the management server 36 of the ASP 32 proceeds to next step SP97.

In step SP97 the management server 36 of the ASP 32 subtracts the amount equivalent to the accumulated points from the Internet connection charge to the ISP 31 from the user PC 2, and renews the user information DB table 45 by subtracting the subtracted points equivalent to the Internet connection charge from the accumulated points of the user information DB table 45, and then proceeds to next step SP98.

Thus, the Internet connection charge charged through the credit card company is subtracted or set off, so that the content creator of the user PC 2 is to receive profit returning according to the accumulated points, following the service use charge of the ASP 32.

In step SP98 the management server 36 of the ASP 32 judges whether the accumulated points are still left over at this moment, and if the accumulated points left over are one million or higher, the management server 36 of the ASP 32 moves on to next step SP99.

In step SP99 the management server 36 of the ASP 32 instructs the credit card company to subtract the accumulated points over one million from the settlement data through the credit card company, and then renews the accumulated points by subtracting the accumulated points over one million from the accumulated points on the user information DB table 45, then it goes back to step SP98.

Whereas, if the accumulated points left over is one million points or less and one hundred thousand points or higher in step SP98, the management server 36 of the ASP 32 proceeds to next step SP100.

In step SP100 the management server 36 of the ASP 32 transfers point data equivalent to the points obtained by subtracting one hundred thousand points from the accumulated points, to an online communication sales company 6 over the Internet 5, and renews the accumulated points by subtracting that one-hundred-thousand-point-subtracted points from the accumulated points on the user information DB table 45, and terminates the processing in next step SP101.

In this case, the online communication sales device of the online communication sales company 6 recognizes personal information including the address and e-mail address of a content creator based on the contents of the user information DB table 45, which is transferred from the ASP 32 in the user registration, and delivers a predetermined item according to the one-hundred-thousand-subtracted points to the content creator of the user PC 2, for the profit returning processing.

Furthermore, when the accumulated points left over one hundred thousand or less in step SP98, the management server 36 of the ASP 32 moves to step SP94 to perform the billing processing for the service charge, and terminates the processing in next step SP101.

(9) Operation and Effect in this Embodiment

In the aforementioned configuration, when the user viewing content clicks the contribution button 167, 242, or 262 displayed on the content display screen 165 (FIG. 28) in the on-demand type displayed based on the motion picture file with CM of the content downloaded from the ASP 32, on the content display screen 240 (FIG. 40) or the content display screen 260 (FIG. 44) in the live type displayed based on the motion picture file with CM of the content of a live video, the client PC 4 displays the contribution amount selection screen 270 (FIG. 45) next to the contribution button 167, 242, 262.

Then, when the user of the client PC 4 clicks a contribution amount selection button equivalent to a desired amount for contribution out of the contribution selection buttons 271 to 276, the CPU of the client PC 4 creates the contribution data corresponding to the selected contribution amount selection button, and transmits it to the management server 36 of the ASP 32 over the Internet 5.

The management server 36 of the ASP 32 converts the contribution data transmitted from the client PC 4 into points at a given conversion rate, and renews the accumulated points in the user information DB table 45 corresponding to the content ID by adding the points based on the contribution data.

Thus, the client PC 4 transmits the contribution data to the management server 36 of the ASP 32, and renews the accumulated points by adding the points, which are obtained by converting the contribution data by the management server 36, to the accumulated points on the user information DB table 45 corresponding to the content ID, thereby the contribution can be easily made to the content creator, in the form of the contribution data transmitted over the Internet 5.

At this time the CPU of the client PC 4 creates charge data according to the contribution data, and transmits it to the management server 36 of the ASP 32 over the Internet 5. Then, the management server 36 of the ASP 32 records the charge data transmitted from the client PC 4 with the viewer information file in the viewer information database 40, and then performs the charge processing to the user of the client PC 4.

According to the aforementioned configuration, the client PC 4 creates contribution data based on a given amount obtained by clicking a contribution button, and transmits it to the management server 36 of the ASP 32 over the Internet 5, thereby making it possible to easily make a contribution to a content creator in the form of points according to the contribution data via the management service 36 on the online.

(10) Second Embodiment

Figure 52:
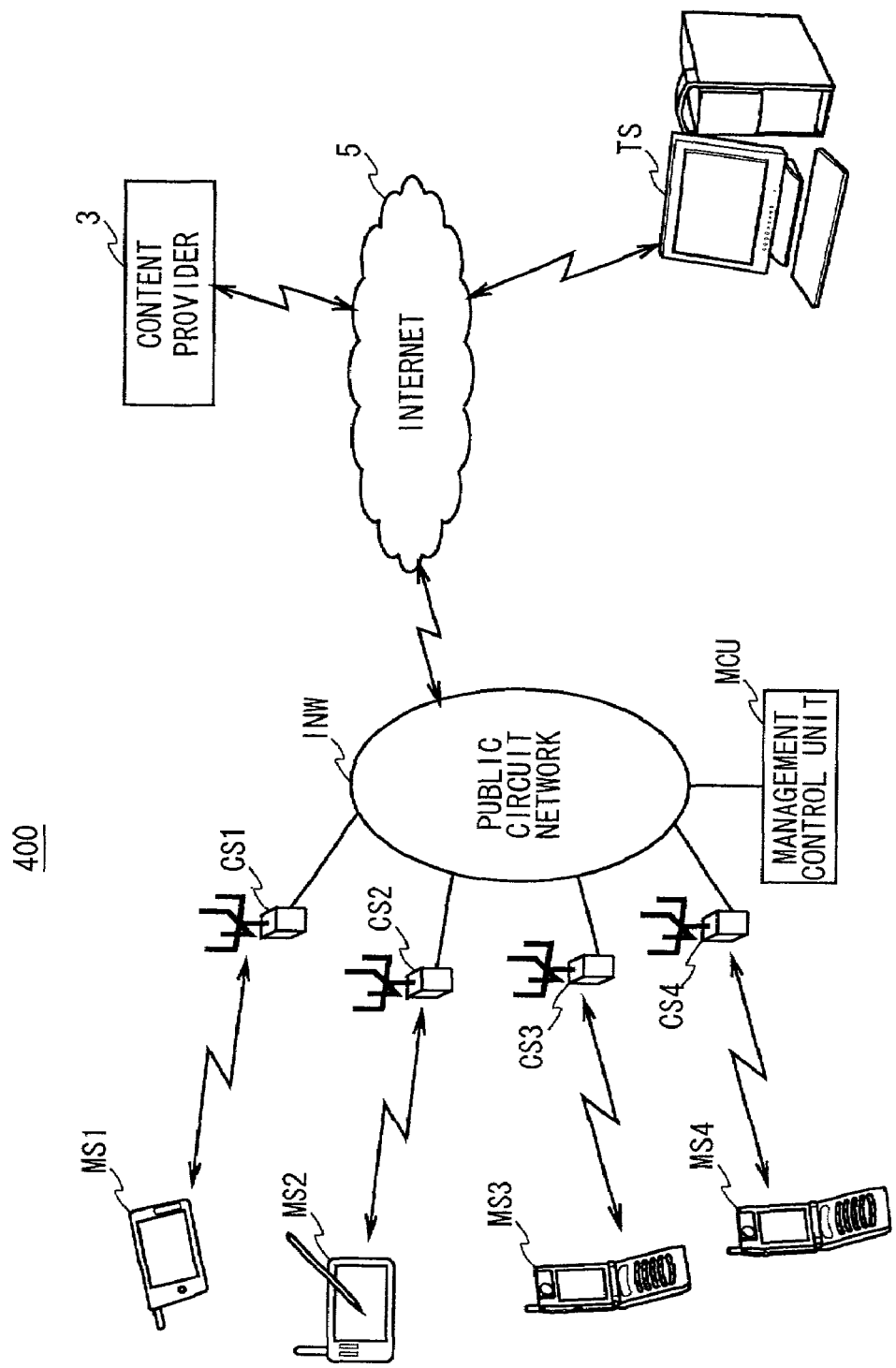
FIG. 52 is a schematic diagram showing the overall structure of a network system according to a second embodiment.

In FIG. 52, a reference numeral 400 shows a network system in the second embodiment of this invention which realizes the e-commerce utilizing the Internet, in which base stations CS1 to CS4 as fixed radio stations are set in different areas which are obtained by dividing a providing area for a communications service into a desire size, and the base stations CS1 to CS4 are connected by radio to portable information terminals MS1 and MS2 as mobile radio stations and camera-integrated digital portable telephones MS3 and MS4.

The base stations CS1 to CS4 are connected by radio by a code division multiple connection method called the W-CDMA (Wideband-Code Division Multiple Access) to the portable information terminals MS1 and MS2 and the camera-integrated digital portable telephones MS3 and MS4, and a huge amount of data can be transmitted at a high data transmission rate of 2 [Mbps] at maximum using the frequency bandwidth of 2 [GHz].

As described above, the portable information terminals MS1 and MS2 and the camera-integrated digital portable telephones MS3 and MS4 can transmit a huge amount of data at a high rate by the W-CDMA method, so that a variety of data communications including the transmission/reception of e-mails, the viewing of simple homepages, the transmission/reception of pictures as well as audio communication can be carried out.

In addition, the base stations CS1 to CS4 are connected to the public circuit network INW with a wired circuit, and the public circuit network INW is connected to many subscribers' wired terminals, computer networks, local networks, content servers TS and content providers 3 described in the first embodiment, over the Internet 5.

This content server TS provides content of, for example, a simple homepage as a file of the compact HTML (Hyper Text Markup Language) form in response to requests from the subscriber wired terminals, the portable information terminals MS1, MS2 and the camera-integrated digital portable telephones MS3, MS4.

In this connection, the portable information terminals MS1, MS2 and the camera-integrated digital portable telephones MS3, MS4 communicate with the base stations CS1 to CS4 by a simple transport protocol of 2 [Mbps], and the base stations CS1 to S4 communicate with the content server TS and the content provider 3 by the TCP/IP protocol over the Internet 5.

Note that, the management control unit MCU is connected to the subscribers' wired terminals, the portable information terminals MS1, MS2, and the camera-integrated digital portable telephones MS3, MS4 via the public circuit network INW, and performs the authentication processing and the charge processing to the subscribers' wired terminals, the portable information terminals MS1, MS2, and the camera-integrated digital portable telephones MS3, MS4.

(11) Appearance Structure of Camera-Integrated Digital Portable Telephone

Figure 53:
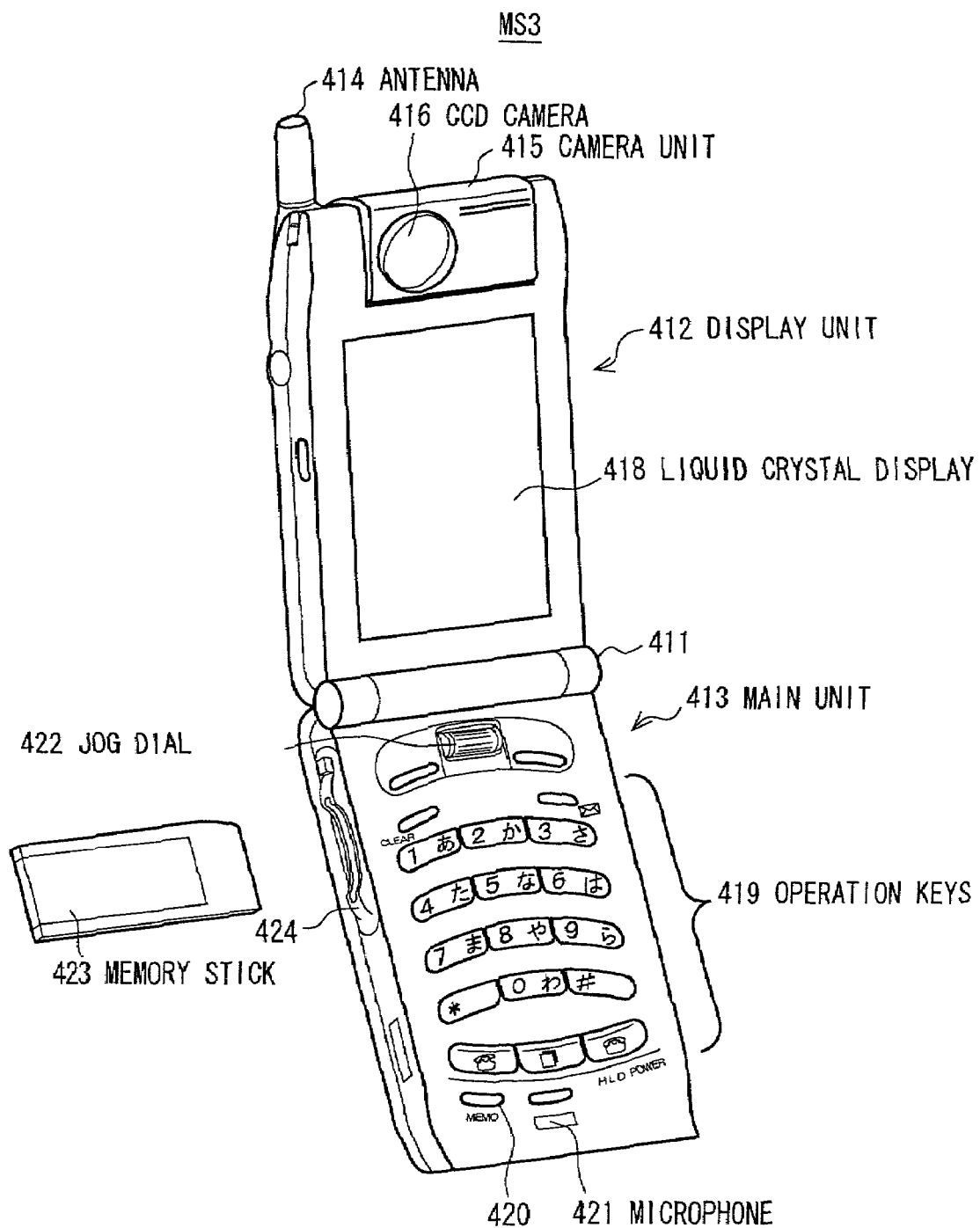
FIG. 53 is a schematic perspective diagram showing the external structure of a camera-integrated digital portable telephone.

Next, the appearance structure of the camera-integrated digital portable telephone MS3 will be explained. As shown in FIG. 53, the camera-integrated digital portable telephone MS3 can be divided into a display unit 412 and a main unit 413 bordering a central hinge 411, and can be closed at the hinge 411.

In the display unit 412, an antenna 411 for transmission/reception is attached to the upper-left part so as to be drawn and contained, and is used to transmit/receive radio waves to/from the base station CS3.

In addition, in the display unit 412, a camera unit 415 which can be rotated within a angle of approximately 180 degrees is provided at the upper-centered part, to photograph a desired object using a CCD camera 416 of the camera unit 415.

Figure 54:
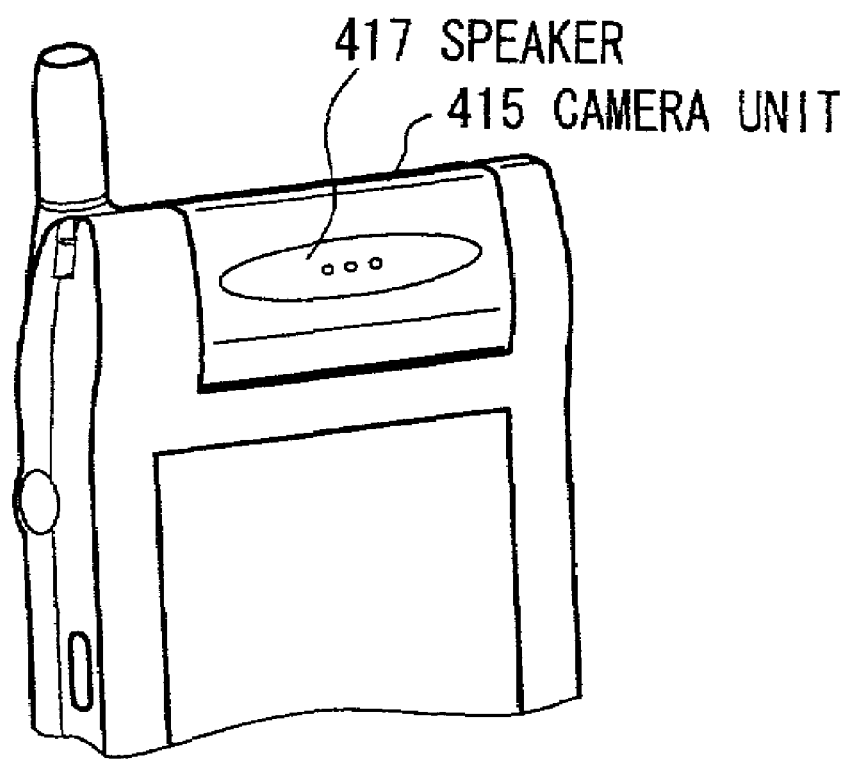
FIG. 54 is a schematic perspective diagram showing a display unit of the time when the camera is rotated.

Here, in the display unit 412, when a user rotates and positions the camera unit 415 by approximately 180 degrees, a speaker provided in the center on the back side of the camera unit 415 is positioned on the front side as shown in FIG. 54, in order to switch to an ordinary audio communication status.

Further, the display unit 412 has a liquid crystal display 418 on its front surface, to display an e-mail, a simple homepage, and various pictures photographed by the CCD camera 416, as well as the reception quality of radio waves, the battery level, the names and telephone numbers listed in the telephone directory and an outgoing-call history.

On the other hand, the main unit 413 has operation keys 419 including numeral keys of "0" to "9", a call key, a redial key, an end and power key, a clear key, and an e-mail key, on its front surface, so that various commands can be entered using the operation keys 419.

In addition, the main unit 413 has a memo button 420 and a microphone 421 under the operation keys 419, to record voice of a chatting mate using the memo button 420 and also to collect voice of a user in chatting using the microphone 421.

Furthermore, in the main unit 413, a jog dial 422 that can be rotated is provided above the operation keys 419, slightly projecting from the front surface of the main unit, and by rotating the jog dial 422, a telephone directory list or an e-mail can be scrolled, pages of a simple homepage can be turn, and images can be forwarded on the liquid crystal display 418.

For example, when the user rotates the jog dial 422 to select a desired telephone number from the telephone directory list displayed on the liquid crystal display 418 and presses the jog dial 422 toward the inside of the main unit 413, the main unit 413 determines the telephone number and calls the telephone number automatically.

Note that, the main unit 413 has a battery pack, not shown, on its back side, and when the end and power key is in an ON state, power is supplied from the battery pack to each circuit to activate.

By the way, in the main unit 413, a Memory Stick slot 424 for insertion of a Memory Stick (trademark of Sony Corp.) that can be inserted and removed therein/therefrom is provided at the upper part on the left surface of the main unit 413, and voice of the chatting mate, e-mails, simple homepages, and images photographed by the CCD camera 416 can be recorded on the Memory Stick 423 by pressing the memo button 420.

This Memory Stick 423 is a kind of flash memory card invented by Sony Cooperation, the applicant of this invention. This Memory Stick 423 is a small and thin plastic case of length 21.5×width 50×thickness 2.8 [mm] containing a flash memory element which is a kind of an EEPROM (Electrically Erasable and Programmable Read Only Memory) that is a non-volatile memory and is capable of electrically rewriting and erasing. And various data including images, audio and music can be recorded and read out via 10-pin terminals.

Further, the Memory Stick 423 adopts an original serial protocol by which a used apparatus can cope with a change in specification of a built-in flash memory, such as extension of memory, and realize a high speed performance: the maximum recording speed of 1.5 [MB/S] and the maximum reading speed of 2.45 [MB/S]. And also it has an erroneous-deletion preventing switch and keeps a high reliability.

Thereby, since such a Memory Stick 423 can be inserted or removed into/from the camera-integrated digital portable telephone MS3, data can be shared among other electronic devices using the Memory Stick 423.

(12) Circuit Structure of Camera-Integrated Digital Portable Telephone

Figure 55:
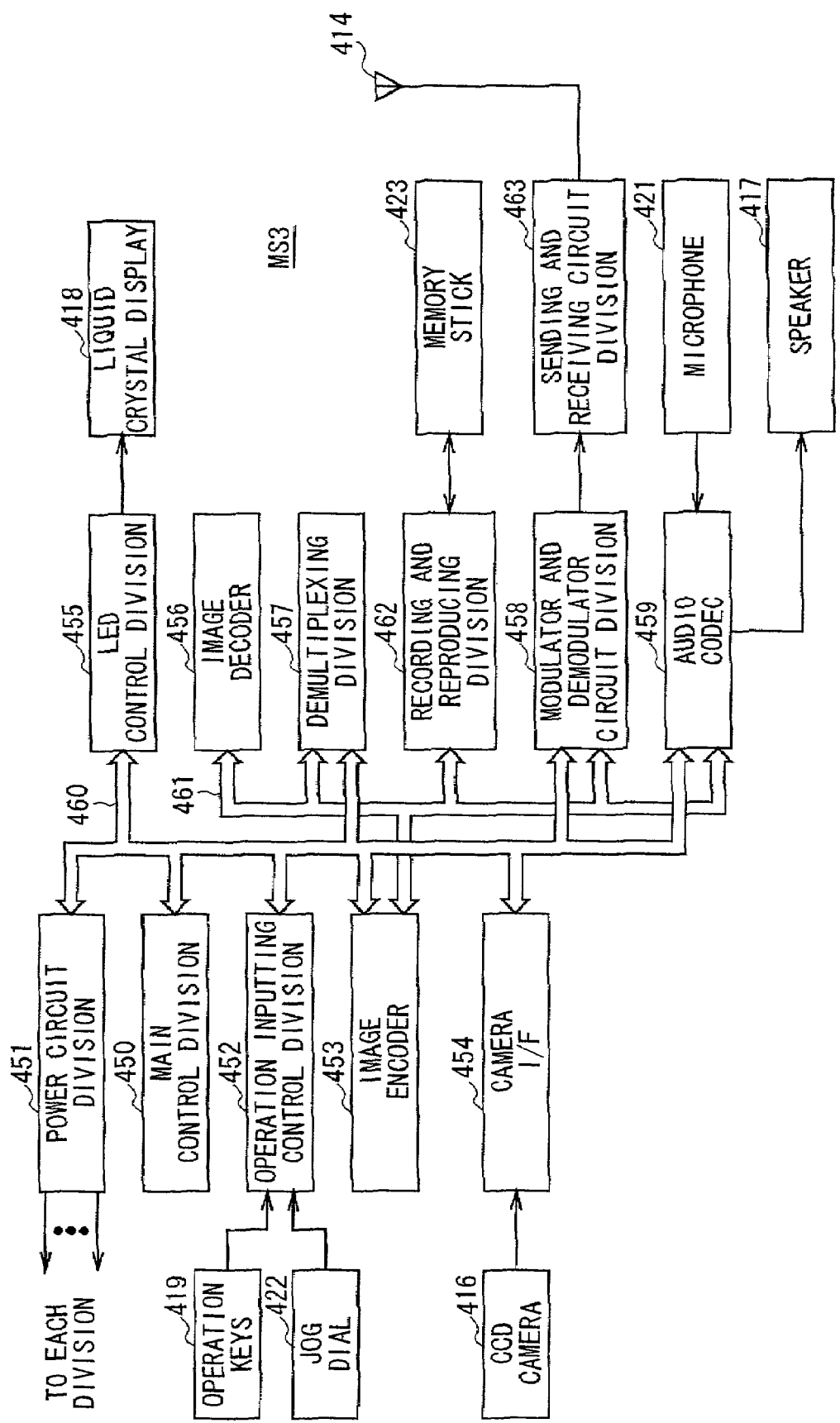
FIG. 55 is a block diagram showing the circuit structure of the camera-integrated digital portable telephone.

As shown in FIG. 55, the camera-integrated digital portable telephone MS3 has the main control division 450 for centrally controlling the display division 412 and the main unit 413 connected to a power circuit division 451, an operation input control division 452, an image encoder 453, a camera interface division 454, a LCD (liquid crystal display) control division 455, an image decoder 456, a demultiplexing division 457, a recording and reproducing division 462, a modulator and demodulator circuit division 458 and an audio CODEC 459 with a main bus 460, and also the image encoder 453, the image decoder 456, the demultiplexing division 457, the modulator and demodulator circuit division 458 and the audio CODEC 459 are connected to each other with a synchronous bus 461.

When the end and power key is turned on by the user, the power circuit division 451 starts up the camera-integrated digital portable telephone MS3 in an operable state by supplying power from the battery pack to each division.

Under control of main control division 450 comprised of the CPU, ROM, RAM and so on, the camera-integrated digital portable telephone MS3 converts an audio signal collected with the microphone 421 in an audio communication mode, into digital audio data through the audio CODEC 459 and performs a spread spectrum process on it at the modulator and demodulator circuit division 458, and performs digital-to-analog conversion and frequency conversion processes at the sending and receiving circuit division 462, and then sends it via the antenna 414.

In addition, the camera-integrated digital portable telephone MS3 amplifies a received signal received by the antenna 414 in the audio communication mode and performs the frequency conversion and analog-to-digital conversion processes, performs the de-spread spectrum process at the modulator and demodulator circuit division 458 and converts it into an analog audio signal at the audio CODEC 459, and then outputs it from the speaker 417.

Furthermore, in the case of sending an electronic mail in the data communication mode, the camera-integrated digital portable telephone MS3 sends text data of the electronic mail inputted by operating the control keys 419 and the jog dial 422 to the main control division 450 via the operation input control division 452.

The main control division 450 performs the spread spectrum process on the text data at the modulator and demodulator circuit division 458 and performs the digital-to-analog conversion and frequency conversion processes on it at the sending and receiving circuit division 462, and then sends it to the base station CS3 (FIG. 52) via the antenna 414.

On the other hand, in the case of receiving an electronic mail in the data communication mode, the camera-integrated digital portable telephone MS3 performs the de-spread spectrum process on the received signal, which is received from the base station CS3 via the antenna 414, at the modulator and demodulator circuit division 458 to restore the original text data, and then displays it as the electronic mail on the liquid crystal display 418 via the LCD control division 455.

It is also possible thereafter for the camera-integrated digital portable telephone MS3 to record the received electronic mail on the Memory Stick 423 via the recording and reproducing division 462 by the user's operation.

On the other hand, in the case of sending image data in the data communication mode, the camera-integrated digital portable telephone MS3 supplies the image data photographed by the CCD camera 416 to the image encoder 453 via the camera interface division 454.

In this connection, in the case where the image data is not to be sent, it is also possible for the camera-integrated digital portable telephone MS3 to directly display the image data photographed by the CCD camera 416 on the liquid crystal display 418 via the camera interface division 454 and the LCD control division 455.

The image encoder 453 converts the image data supplied from the CCD camera 416 into coded image data by compression-coding by a predetermined encoding method such as the MPEG (moving picture experts group 2 or MPEG4, and sends the resultant to the demultiplexing division 457.

At this time, the camera-integrated digital portable telephone MS3 simultaneously sends the audio collected with the microphone 421 during photographing by the CCD camera 416 as digital audio data to the demultiplexing division 457 via the audio CODEC 459.

The demultiplexing division 457 multiplexes the coded image data supplied from the image encoder 453 and the audio data supplied from the audio CODEC 459 by a predetermined method, and performs the spread spectrum process on the resultant multiplexed data at the modulator and demodulator circuit division 458 and performs the digital-to-analog conversion and frequency conversion processes on it at the sending and receiving circuit division 462, and then sends the resultant via the antenna 414.

On the other hand, in the case of receiving image data such as a simple homepage in the data communication mode, the camera-integrated digital portable telephone MS3 performs the de-spread spectrum process on the received signal received from the base station CS3 via the antenna 414 at the modulator and demodulator circuit division 458 and sends the resultant multiplexed data to the demultiplexing division 457.

The demultiplexing division 457 demultiplexes the multiplexed data to divide it into coded image data and audio data, and supplies the coded image data to the image decoder 456 and also supplies the audio data to the audio CODEC 459 through the synchronous bus 461.

The image decoder 456 generates reproduction image data by decoding the coded image data by a decoding method corresponding to the predetermined encoding method such as MPEG2 or MPEG4, and displays it as, for instance, an image linked to the simple homepage on the liquid crystal display 418 via the LCD control division 455.

At this time, the audio CODEC 459 converts the audio data into analog audio data, and then outputs it as, for instance, sounds linked to the simple homepage via the speaker 417.

Also in this case, just as in the case of the electronic mail, the camera-integrated digital portable telephone MS3 can record the image data of the received simple homepage on the Memory Stick 423 via the recording and reproducing division 462 by the user's operation.

In addition to the above configuration, in the camera-integrated digital portable telephone MS3, the ROM of the main control division 450 stores an application program to utilize the personal casting service and a contribution program to make a contribution, as in the case of the first embodiment, so as to receive content in the on-demand type or in the live-type from the content provider 3 (FIG. 2) accessed therefrom over the Internet, and displays the content display screen 350 (FIG. 46), for example.

The user clicks the contribution button 355 only once after entering a desired amount in the contribution amount input area 351 while viewing the content display screen 350, the camera-integrated digital portable telephone MS3 transmits the contribution data equivalent to the amount to the management server 36 of the ASP 32 and also transmits the charge data equivalent to the contribution data to the management server 36 of the ASP 32 to execute the contribution processing.

Note that, the camera-integrated digital portable telephone MS3 may display the contribution confirmation screen 360 when the contribution button 355 is clicked, and may transmit the contribution data equivalent to the amount to the management server 36 of the ASP 32 when the "OK" button 362 is clicked after the contribution amount is confirmed on the contribution confirmation screen 360.

That is, the camera-integrated digital portable telephone MS3 can execute the contribution processing for content, as in the case of the client PC4 in the first embodiment, and can work as a mobile terminal to receive content not only inside but also outside and then easily execute the contribution processing for the content over the network.

Here, the processing by the management server 36 of the ASP 32 is similar to the case of the first embodiment, and is executed in such a manner that the contribution data transmitted from the camera-integrated digital portable telephone MS3 is converted into points at a fixed conversion rate, the user information DB table 45 corresponding the content ID is retrieved from the user information database 37, and the accumulated points of the user information DB table 45 is updated by adding the points equivalent to the contribution data.

In addition, the management server 36 of the ASP 32 executes the charge processing in such a manner that the charge data equivalent to the contribution data transmitted from the camera-integrated digital portable telephone MS3 is recorded in the viewer information file of the viewer information database 40 together with the service charge of the ASP 32 of the camera-integrated digital portable telephone MS3.

As described above, in the network system 400, as in the case of the first embodiment, the camera-integrated digital portable telephone MS3 receives content from the content provider 3, and the contribution data for the content is indirectly transmitted via the content display screen 350 displayed on the camera-integrated digital portable telephone MS3, thus a user easily make a contribution to a content creator using the camera-integrated digital portable telephone MS3.

(13) Other Embodiments

The foregoing first and second embodiments have described the case where the contribution data is created according to the amount which is selected on the contribution amount selection screen 270 by clicking the contribution button, and transmitted to the management server 36 of the ASP 32. However, the present invention is not limited to it, and contribution data can be created according to an amount entered by a user of the client PC 4 or the camera-integrated digital portable telephone MS3 and transmitted to the management server 36 of the ASP 3. In this case, similar effect to the foregoing embodiments can be obtained.

Further, the foregoing first and second embodiments have described the case where the contribution program is installed in the client PC 4 or the camera-integrated digital portable telephone MS3 in advance to create and transmit the contribution data to the management server 36 of the ASP 32. However, the present invention is not limited to it and the contribution program can be installed by reproducing a program storing medium being a package medium, such as a CD-ROM (Compact Disc-Read only Memory) and a DVD (Digital Video Disc), storing the contribution program. Also, the contribution program may can be installed by reproducing a program storing medium such as a semi-conductive memory or a magneto-optical disc, capable of storing the contribution program temporarily or permanently.

A wired or radio communication medium such as a local area network and a digital satellite broadcast can be also used as a means for storing the contribution program into this program storage medium. Also, a variety of communication interfaces such as a router or a modem can be involved in the storing process.

Furthermore, the aforementioned first and second embodiments have described the case where the client PC 4 and the camera-integrated digital portable telephone MS3 are used as devices which receive content provided by the management server 36 of the ASP 32. However, the present invention is not limited to it, and portable information terminals MS1, MS2 and the like can be used as long as they can be connected over the Internet 5.

Furthermore, the foregoing first and second embodiments have described the case where the contribution is made for content in the on-demand type or in the live-type which is displayed on the on-demand content display screen 165 (FIG. 28), on the live content display screen 240 (FIG. 40), or on the live content display screen 260 (FIG. 44). This invention, however, is not limited to this and a contribution can be made for a general homepage, that is, a design, planning, operability, or quality of provided information of the homepage, for a personal expression like literal content such as news, a poem, a novel, a description article, a critical essay or a comment, or still picture content such as a picture, a illustration, a drawings, or a computer graphic.

Furthermore, the aforementioned first and second embodiments have described the case where the contribution buttons are provided to make a contribution to a content creator. However, the present invention is not limited to it, and a celebration button can be provided so as to send a tip in the form of contribution data to the content creator when the content of a wedding ceremony is provided in a live video. In addition, a variety of contributions such as an offertory, money offering to a deceased person, and money for congratulation on giving a birth, some celebrations, constructing a new home, moving out, entering school, graduating school, that is, tips, can be made according to provided content.

Furthermore, the aforementioned first and second embodiments have described the case where the Internet 5 is used as a network, however, the present invention is not limited to it, but a variety of wired or radio networks can be used.

INDUSTRIAL APPLICABILITY

The contribution processing device, the contribution processing method, the contribution accepting device, the contribution accepting method, the program storage medium, and the contribution processing system according to the present invention are applied in a content providing system which is constructed by connecting content servers for providing content to clients who receives the content, over the network.

The invention claimed is:

1. A contribution processing device comprising:
a registering unit configured to register user information of a content provider with a user information database, the information including at least information of a credit card of the content provider;
authenticating unit configured to authenticate said user information;
a receiving unit configured to receive, when said authenticating unit authenticates said user information, personal content data which were personally created by said content provider and display data for displaying a user contribution icon including a contribution button configured to be selected to indicate that a contribution is to be given to the content provider of the personal content data associated with said user contribution icon and given in consideration for sharing by the content provider of the personal content data over a network from a predetermined server;
a display control unit configured to control a display screen, said display screen configured to display the contribution icon and the personal content data, simultaneously;
a contribution acceptance unit configured to provide an indication of an acceptance of the contribution from a registered user without a subsequent request for information regarding how payment is going to be made;
a contribution data creating unit configured to create contribution data that corresponds to a given amount of the contribution after the contribution icon is selected on said content display screen; and
a transmitting unit configured to instruct a credit card company of said credit card of said content provider to make a settlement based on said contribution data created by said contribution data creating unit.

2. The contribution processing device according to claim 1, wherein
said contribution data creating unit is configured to displays a contribution amount selection screen showing a plurality of amounts on said display means in response to the selection of said contribution button, and to create said contribution data corresponding to said amount selected on said contribution amount selection screen.

3. The contribution processing device according to claim 1, wherein
said contribution data creating unit is configured to create said contribution data equivalent to an amount which is directly entered in a contribution amount input area corresponding to said contribution button when the contribution button is selected.

4. The contribution processing device according to claim 1, wherein
said contribution data creating data unit is configured to change an amount directly entered in a contribution amount input area corresponding to said contribution button by the amount more than a fixed minimum amount, according to user's operations when the contribution button is selected, and to create said contribution data equivalent to the changed amount.

5. The contribution processing device according to claim 1,
wherein said contribution data is added to user information corresponding to the content provider, and a service charge for supplying said content is charged to said user information.

6. The contribution processing device according to claim 1, wherein
said predetermined server comprises the contribution managing device.

7. The contribution processing device according to claim 1, wherein
said amount of contribution includes electronic money.

8. The contribution processing device according to claim 1, wherein
said amount of contribution includes points if a contributor of the contribution comprises said registered user on a service, and
the content provider provides the content to other apparatus including the contribution managing device via the service.

9. A contribution processing method, comprising:
registering user information of a content provider with a user information database, the information including at least information of a credit card of the content provider;
authenticating said user information;
receiving, when said user information is authenticated, over a network from a predetermined server personal content data which were personally created by the content provider and display data for displaying a user contribution icon including a contribution button configured to be selected to indicate that a contribution is to be given to the content provider of the personal content data associated with said user contribution icon, and given in consideration for sharing by the content provider of the personal content data over a network from a predetermined server;
displaying a display screen displaying the contribution icon and the personal content data, simultaneously;
providing an indication of an acceptance of the contribution from a registered user without a subsequent request for information regarding how payment is going to be made;
creating contribution data that corresponds to a given amount of the contribution after the contribution icon is selected on said content display screen; and
instructing a credit card company of said credit card of said content provider to make a settlement based on said created contribution data.

10. The contribution processing method according to claim 9, wherein said creating comprises:
displaying a contribution amount selection screen which displays a plurality of amounts in response to the selection of said contribution button; and
creating said contribution data equivalent to said amount selected on said contribution amount selection screen.

11. The contribution processing method according to claim 9, wherein said creating comprises:
creating said contribution data equivalent to an amount which is directly entered in a contribution amount input area corresponding to said contribution button when the contribution button is selected.

12. The contribution processing method according to claim 9, wherein said creating comprises:
changing an amount directly entered in a contribution amount input area corresponding to said contribution button by the amount more than a fixed minimum amount, according to user's operations when the contribution button is selected; and
creating said contribution data equivalent to the changed amount.

13. The contribution processing method according to claim 9,
wherein said contribution data is added to user information corresponding to the content provider, and a service charge for supplying said content is charged to said user information.

14. A program storage medium to make an information processing device execute a program stored on said program storage medium,
wherein said program performs the function of:
registering user information of a content provider with a user information database, the information including at least information of a credit card of the content provider;
authenticating said user information;
receiving, when said user information is authenticated, over a network from a predetermined server personal content data which were personally created by the content provider and display data for displaying a user contribution icon including a contribution button configured to be selected to indicate that a contribution is to be given to the content provider of the personal content data associated with said user contribution icon~ and given in consideration for sharing by the content provider of the personal content data over a network from a predetermined server;
displaying a display screen displaying the contribution icon and the personal content data, simultaneously;
providing an indication of an acceptance of the contribution from a registered user without a subsequent request for information regarding how payment is going to be made;
creating contribution data that corresponds to a given amount of the contribution after the contribution icon is selected on said content display screen; and
instructing a credit card company of said credit card of said content provider to make a settlement based on said created contribution data.

15. The program storage medium according to claim 14, wherein said creating comprises:
displaying a contribution amount selection screen which displays a plurality of amounts in response to the selection of said contribution button; and
creating said contribution data equivalent to said amount selected on said contribution amount selection screen.

16. The program storage medium according to claim 14, wherein said creating comprises:
creating said contribution data equivalent to an amount which is directly entered in a contribution amount input area corresponding to said contribution button when the contribution button is selected.

17. The program storage medium according to claim 14, wherein said creating comprises:
changing an amount directly entered in a contribution amount input area corresponding to said contribution button by the amount more than a fixed minimum amount, according to user's operations when the contribution button is selected; and creating said contribution data equivalent to the changed amount.

18. A contribution processing system comprising:

a computer-based apparatus configured to register user information of a content provider with a user information database, the information including at least information of a credit card of the content provider, authenticate said user information, and transmit, when said user information is authenticated, over a network personal content data which were personally created by a content provider and display data for displaying a user contribution icon including a contribution button configured to be selected to indicate that a contribution is to be given to the content provider of the personal content data associated with said user contribution icon and given in consideration for sharing by the content provider of the personal content data over a network from a predetermined server;

said apparatus including, a contribution amount identification mechanism permitting a contribution amount identified at a user terminal to be selected or entered not lower than a fixed minimum amount, a display manager configured to provide display information to the user terminal for confirmation of the contribution amount, said display information simultaneously displaying the contribution icon and the personal content data a contribution acceptance unit configured to provide an indication of an acceptance of the contribution from a registered user without a subsequent request for information regarding how payment is going to be made; and a contribution processor configured to apportion said contribution amount to include a service charge, send an acknowledgement to the user terminal for the contribution amount, and instruct a credit card company of said credit card of said content provider to make a settlement based on said created contribution amount.

\* \* \* \* \*